US012795090B2

(12) United States Patent
Xiu et al.

(10) Patent No.: US 12,795,090 B2
(45) Date of Patent: Nov. 10, 2026

(54) METHOD AND APPARATUS FOR ADAPTIVE MOTION COMPENSATED FILTERING

(71) Applicant: BEIJING DAJIA INTERNET INFORMATION TECHNOLOGY CO., LTD., Beijing (CN)

(72) Inventors: Xiaoyu Xiu, San Diego, CA (US); Ning Yan, San Diego, CA (US); Changyue Ma, San Diego, CA (US); Che-Wei Kuo, San Diego, CA (US); Hong-Jheng Jhu, San Diego, CA (US); Wei Chen, San Diego, CA (US); Xianglin Wang, San Diego, CA (US); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 19/057,810

(22) Filed: Feb. 19, 2025

(65) Prior Publication Data

US 2025/0193389 A1 Jun. 12, 2025

Related U.S. Application Data

(63) Continuation of application No. PCT/US2024/014325, filed on Feb. 2, 2024, and a (Continued)

(51) Int. Cl.

*H04N 19/80* (2014.01)
*H04N 19/117* (2014.01)

(Continued)

(52) U.S. Cl.

CPC ......... *H04N 19/117* (2014.11); *H04N 19/159* (2014.11); *H04N 19/176* (2014.11)

(58) Field of Classification Search

CPC ... H04N 19/117; H04N 19/159; H04N 19/176
See application file for complete search history.

(56) References Cited

U.S. PATENT DOCUMENTS

| | | | |
|---|---|---|---|
| 2011/0228854 A1 | 9/2011 | Shin et al. | |
| 2018/0309987 A1 | 10/2018 | Kim et al. | |

(Continued)

FOREIGN PATENT DOCUMENTS

| | | |
|---|---|---|
| EP | 3709648 A1 | 9/2020 |
| WO | 2019143602 A1 | 7/2019 |

OTHER PUBLICATIONS

International Search Report issued in PCT Application No. PCT/US2023/030739 dated Dec. 18, 2023, (2p).

(Continued)

*Primary Examiner* — Patrick E Demosky
(74) *Attorney, Agent, or Firm* — Arch & Lake LLP; Hao Tan; Shen Wang

(57) ABSTRACT

Methods for video decoding and encoding, apparatuses and non-transitory computer-readable storage media thereof are provided. In one method for video decoding, a decoder may obtain a plurality of prediction blocks based on a current inter coding block; obtain a current template of the current inter coding block, wherein the current template comprises a plurality of reconstructed samples neighboring to the current inter coding block; obtain a plurality of template predictions of the current template respectively corresponding to the plurality of prediction blocks of the current inter coding block; obtain at least one filter based on the plurality of template predictions and the current template; and obtain a filtered block based on the at least one filter and the plurality of prediction blocks.

20 Claims, 29 Drawing Sheets

Related U.S. Application Data continuation of application No. PCT/US2023/030739, filed on Aug. 21, 2023.

(60) Provisional application No. 63/443,044, filed on Feb. 2, 2023, provisional application No. 63/399,641, filed on Aug. 19, 2022.

(51) Int. Cl.
*H04N 19/159* (2014.01)
*H04N 19/176* (2014.01)

(56) References Cited

U.S. PATENT DOCUMENTS

| | | | | |
|---|---|---|---|---|
| 2019/0182482 | A1* | 6/2019 | Vanam | H04N 19/176 |
| 2020/0007864 | A1 | 1/2020 | Li et al. | |
| 2020/0336738 | A1* | 10/2020 | Xiu | H04N 19/105 |
| 2021/0051345 | A1 | 2/2021 | Tsai et al. | |
| 2021/0352277 | A1 | 11/2021 | Filippov et al. | |
| 2021/0352309 | A1 | 11/2021 | Liu et al. | |
| 2022/0272323 | A1 | 8/2022 | Li et al. | |
| 2022/0272326 | A1 | 8/2022 | Xiu et al. | |

OTHER PUBLICATIONS

International Search Report issued in PCT Application No. PCT/US2024/014325 dated Jun. 17, 2024, (3p).

InterDigital Inc, Saurav Bandyopadhyay, et al., "CE10-related: Local illumination compensation simplifications", Joint Video Experts Team (JVET) of ITU-T SG 16 WP 3 and ISO/IEC JTC 1/SC 29/WG 11, Document: JVET-M0224-v2, 13th Meeting: Marrakech, MA, Jan. 9-18, 2019, (6p).

Extended European Search Report of EP Application No. 23855543.7 dated Jul. 10, 2026, (12pp.).

Anonymous, "Coordinate descent," Wikipedia, Apr. 21, 2022, (7pp.).

* cited by examiner

METHOD AND APPARATUS FOR ADAPTIVE MOTION COMPENSATED FILTERING

CROSS-REFERENCE TO RELATED APPLICATION

The present application is a continuation of International Application No. PCT/US2023/030739 and International Application No. PCT/US2024/014325. International Application No. PCT/US2023/030739 was filed on Aug. 21, 2023 and claimed priority to U.S. Provisional Application No. 63/399,641 which was filed on Aug. 19, 2022. International Application No. PCT/US2024/014325 was filed on Feb. 2, 2024 and claimed priority to U.S. Provisional Application No. 63/443,044 which was filed on Feb. 2, 2023. The entirety of all of the afore-mentioned patent applications are incorporated herein by references for all purposes.

FIELD

The present disclosure is related to video coding and compression, and in particular but not limited to, methods and apparatus to improve the coding/decoding efficiency of the inter coding blocks.

BACKGROUND

Various video coding techniques may be used to compress video data. Video coding is performed according to one or more video coding standards. For example, video coding standards include versatile video coding (VVC), high-efficiency video coding (H.265/HEVC), advanced video coding (H.264/AVC), moving picture expert group (MPEG) coding, or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality.

The first version of the VVC standard was finalized in July 2020, which offers approximately 50% bit-rate saving or equivalent perceptual quality compared to the prior generation video coding standard HEVC. Although the VVC standard provides significant coding improvements than its predecessor, there is evidence that superior coding efficiency can be achieved with additional coding tools. Recently, Joint Video Exploration Team (JVET) under the collaboration of ITU-T VECG and ISO/IEC MPEG started the exploration of advanced technologies that can enable substantial enhancement of coding efficiency over VVC. In April 2021, one software codebase, called Enhanced Compression Model (ECM) was established for future video coding exploration work. The ECM reference software was based on VVC Test Model (VTM) that was developed by JVET for the VVC, with several existing modules (e.g., intra/inter prediction, transform, in-loop filter and so forth) are further extended and/or improved. In future, any new coding tool beyond the VVC standard need to be integrated into the ECM platform, and tested using JVET common test conditions (CTCs).

SUMMARY

The present disclosure provides examples of techniques relating to improving the coding/decoding efficiency of the inter coding blocks.

According to a first aspect of the present disclosure, there is provided a method for video decoding of an inter coding block. In the method, a decoder may obtain a plurality of prediction blocks based on a current inter coding block; obtain a current template of the current inter coding block, wherein the current template includes a plurality of reconstructed samples neighboring to the current inter coding block; obtain a plurality of template predictions of the current template respectively corresponding to the plurality of prediction blocks of the current inter coding block; obtain at least one filter based on the plurality of template predictions and the current template; and obtain a filtered block based on the at least one filter and the plurality of prediction blocks.

In some examples, the decoder may obtain one filter based on the plurality of template predictions and the current template; and obtain a filtered block based on the one filter and one of the plurality of prediction blocks, wherein decoder may calculate a target template based on the current template and a previously filtered template prediction; obtain coefficients for a current filter by minimizing differences between a current template prediction and the target template; and calculate a current filtered template prediction by applying the current filter to the current template prediction.

In some examples, the decoder may determine an adjacent or non-adjacent neighboring block of the current inter coding block, wherein the adjacent or non-adjacent neighboring block comprises a plurality of reconstruction samples adjacent or non-adjacent neighboring to the current inter coding block; obtain prediction samples of the adjacent or non-adjacent neighboring block based on motion vectors of the adjacent or non-adjacent neighboring block; obtain a filter based on the prediction samples and the plurality of reconstruction samples of the adjacent or non-adjacent neighboring block; obtain a current prediction block based on the current inter coding block and motion vectors of the current inter coding block; and obtain a filtered prediction block by applying the filter to the current prediction block as prediction samples of the current inter coding block.

In some examples, the decoder may obtain a current filter based on a candidate filter list, wherein the candidate filter list comprises at least one previous filter determined from at least one previously-coded inter coding block; and obtain the filtered prediction block by applying the current filter to the current prediction block of the current inter coding block.

According to a second aspect of the present disclosure, there is provided a method for video encoding of an inter coding block. In the method, an encoder may obtain a plurality of prediction blocks based on a current inter coding block; obtain a current template of the current inter coding block, wherein the current template includes a plurality of reconstructed samples neighboring to the current inter coding block; obtain a plurality of template predictions of the current template respectively corresponding to the plurality of prediction blocks of the current inter coding block; obtain at least one filter based on the plurality of template predictions and the current template; and obtain a filtered block based on the at least one filter and the plurality of prediction blocks.

In some examples, the encoder may obtain one filter based on the plurality of template predictions and the current template; and obtain a filtered block based on the one filter and one of the plurality of prediction blocks, wherein encoder may calculate a target template based on the current template and a previously filtered template prediction; obtain coefficients for a current filter by minimizing differences between a current template prediction and the target template; and calculate a current filtered template prediction by applying the current filter to the current template prediction.

In some examples, the encoder may determine an adjacent or non-adjacent neighboring block of the current inter coding block, wherein the adjacent or non-adjacent neighboring block comprises a plurality of reconstruction samples adjacent or non-adjacent neighboring to the current inter coding block; obtain prediction samples of the adjacent or non-adjacent neighboring block based on motion vectors of the adjacent or non-adjacent neighboring block; obtain a filter based on the prediction samples and the plurality of reconstruction samples of the adjacent or non-adjacent neighboring block; obtain a current prediction block based on the current inter coding block and motion vectors of the current inter coding block; and obtain a filtered prediction block by applying the filter to the current prediction block as prediction samples of the current inter coding block.

In some examples, the encoder may obtain a current filter based on a candidate filter list, wherein the candidate filter list comprises at least one previous filter determined from at least one previously-coded inter coding block; and obtain the filtered prediction block by applying the current filter to the current prediction block of the current inter coding block.

According to a third aspect of the present disclosure, there is provided an apparatus for video decoding. The apparatus may include one or more processors and a memory coupled to the one or more processors and configured to store instructions executable by the one or more processors. Furthermore, the one or more processors, upon execution of the instructions, are configured to perform the method according to the first aspect.

According to a fourth aspect of the present disclosure, there is provided an apparatus for video encoding. The apparatus may include one or more processors and a memory coupled to the one or more processors and configured to store instructions executable by the one or more processors. Furthermore, the one or more processors, upon execution of the instructions, are configured to perform the method according to the second aspect.

According to a fifth aspect of the present disclosure, there is provided a non-transitory computer-readable storage medium for storing a bitstream to be decoded by the method according to the first aspect.

According to a sixth aspect of the present disclosure, there is provided a non-transitory computer-readable storage medium for storing a bitstream generated by the method according to the second aspect.

According to a seventh aspect of the present disclosure, there is provided a method for storing a bitstream generated by the method according to the second aspect.

BRIEF DESCRIPTION OF THE DRAWINGS

A more particular description of the examples of the present disclosure will be rendered by reference to specific examples illustrated in the appended drawings. Given that these drawings depict only some examples and are not therefore considered to be limiting in scope, the examples will be described and explained with additional specificity and details through the use of the accompanying drawings.

DETAILED DESCRIPTION

Figure 1A:
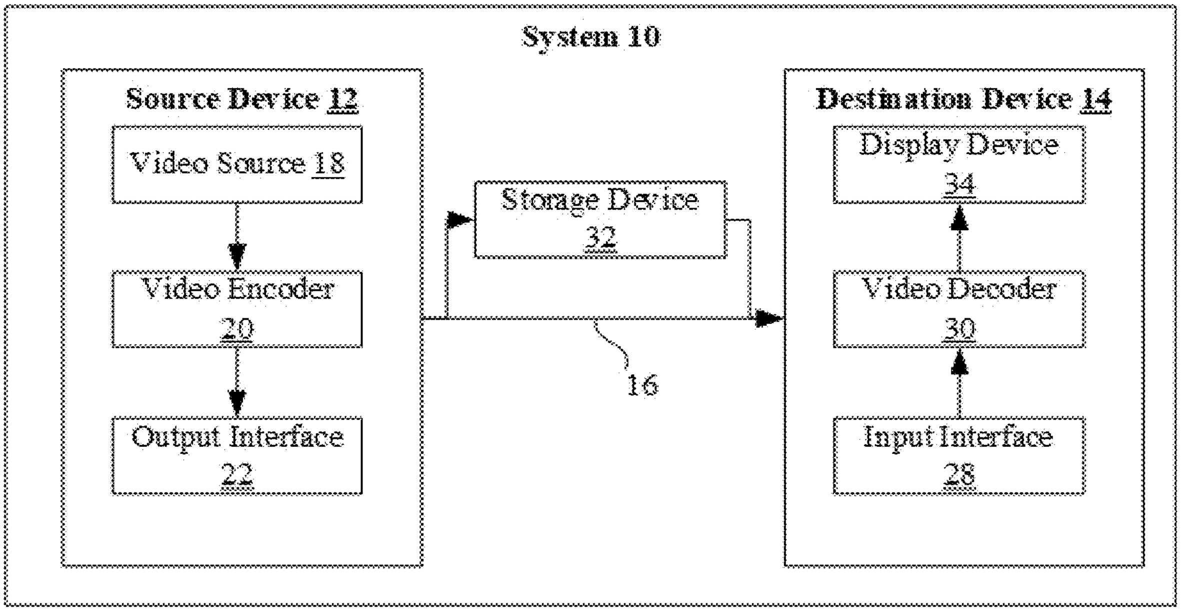
FIG. 1A is a block diagram illustrating a system for encoding and decoding video blocks in accordance with some examples of the present disclosure.

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used. For example, it will be apparent to one of ordinary skill in the art that the subject matter presented herein can be implemented on many types of electronic devices with digital video capabilities.

Terms used in the disclosure are only adopted for the purpose of describing specific embodiments and not intended to limit the disclosure. "A/an," "said," and "the" in a singular form in the disclosure and the appended claims are also intended to include a plural form, unless other meanings are clearly denoted throughout the disclosure. It is also to be understood that term "and/or" used in the disclosure refers to and includes one or any or all possible combinations of multiple associated items that are listed.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

Throughout the disclosure, the terms "first," "second," "third," etc. are all used as nomenclature only for references to relevant elements, e.g., devices, components, compositions, steps, etc., without implying any spatial or chronological orders, unless expressly specified otherwise. For example, a "first device" and a "second device" may refer to two separately formed devices, or two parts, components, or operational states of a same device, and may be named arbitrarily.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

As used herein, the term "if" or "when" may be understood to mean "upon" or "in response to" depending on the context. These terms, if appear in a claim, may not indicate that the relevant limitations or features are conditional or optional. For example, a method may include steps of: i) when or if condition X is present, function or action X' is performed, and ii) when or if condition Y is present, function or action Y' is performed. The method may be implemented with both the capability of performing function or action X', and the capability of performing function or action Y'. Thus, the functions X' and Y' may both be performed, at different times, on multiple executions of the method.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

FIG. 1A is a block diagram illustrating an exemplary system 10 for encoding and decoding video blocks in parallel in accordance with some implementations of the present disclosure. As shown in FIG. 1A, the system 10 includes a source device 12 that generates and encodes video data to be decoded at a later time by a destination device 14. The source device 12 and the destination device 14 may include any of a wide variety of electronic devices, including cloud servers, server computers, desktop or laptop computers, tablet computers, smart phones, set-top boxes, digital televisions, cameras, display devices, digital media players, video gaming consoles, video streaming device, or the like. In some implementations, the source device 12 and the destination device 14 are equipped with wireless communication capabilities.

In some implementations, the destination device 14 may receive the encoded video data to be decoded via a link 16. The link 16 may include any type of communication medium or device capable of moving the encoded video data from the source device 12 to the destination device 14. In one example, the link 16 may include a communication medium to enable the source device 12 to transmit the encoded video data directly to the destination device 14 in real time. The encoded video data may be modulated according to a communication standard, such as a wireless communication protocol, and transmitted to the destination device 14. The communication medium may include any wireless or wired communication medium, such as a Radio Frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

In some other implementations, the encoded video data may be transmitted from an output interface 22 to a storage device 32. Subsequently, the encoded video data in the storage device 32 may be accessed by the destination device 14 via an input interface 28. The storage device 32 may include any of a variety of distributed or locally accessed data storage media such as a hard drive, Blu-ray discs, Digital Versatile Disks (DVDs), Compact Disc Read-Only Memories (CD-ROMs), flash memory, volatile or non-volatile memory, or any other suitable digital storage media for storing the encoded video data. In a further example, the storage device 32 may correspond to a file server or another intermediate storage device that may hold the encoded video data generated by the source device 12. The destination device 14 may access the stored video data from the storage device 32 via streaming or downloading. The file server may be any type of computer capable of storing the encoded video data and transmitting the encoded video data to the destination device 14. Exemplary file servers include a web server (e.g., for a website), a File Transfer Protocol (FTP) server, Network Attached Storage (NAS) devices, or a local disk drive. The destination device 14 may access the encoded video data through any standard data connection, including a wireless channel (e.g., a Wireless Fidelity (Wi-Fi) connection), a wired connection (e.g., Digital Subscriber Line (DSL), cable modem, etc.), or a combination of both that is suitable for accessing encoded video data stored on a file server. The transmission of the encoded video data from the storage device 32 may be a streaming transmission, a download transmission, or a combination of both.

As shown in FIG. 1A, the source device 12 includes a video source 18, a video encoder 20 and the output interface 22. The video source 18 may include a source such as a video capturing device, e.g., a video camera, a video archive containing previously captured video, a video feeding interface to receive video from a video content provider, and/or a computer graphics system for generating computer graphics data as the source video, or a combination of such sources. As one example, if the video source 18 is a video camera of a security surveillance system, the source device 12 and the destination device 14 may form camera phones or video phones. However, the implementations described in the present application may be applicable to video coding in general, and may be applied to wireless and/or wired applications.

The captured, pre-captured, or computer-generated video may be encoded by the video encoder 20. The encoded video data may be transmitted directly to the destination device 14 via the output interface 22 of the source device 12. The encoded video data may also (or alternatively) be stored onto the storage device 32 for later access by the destination device 14 or other devices, for decoding and/or playback. The output interface 22 may further include a modem and/or a transmitter.

The destination device 14 includes the input interface 28, a video decoder 30, and a display device 34. The input interface 28 may include a receiver and/or a modem and receive the encoded video data over the link 16. The encoded video data communicated over the link 16, or provided on the storage device 32, may include a variety of syntax elements generated by the video encoder 20 for use by the video decoder 30 in decoding the video data. Such syntax elements may be included within the encoded video data transmitted on a communication medium, stored on a storage medium, or stored on a file server.

In some implementations, the destination device 14 may include the display device 34, which can be an integrated display device and an external display device that is configured to communicate with the destination device 14. The display device 34 displays the decoded video data to a user, and may include any of a variety of display devices such as a Liquid Crystal Display (LCD), a plasma display, an Organic Light Emitting Diode (OLED) display, or another type of display device.

The video encoder 20 and the video decoder 30 may operate according to proprietary or industry standards, such as VVC, HEVC, MPEG-4, Part 10, AVC, or extensions of such standards. It should be understood that the present application is not limited to a specific video encoding/decoding standard and may be applicable to other video encoding/decoding standards. It is generally contemplated that the video encoder 20 of the source device 12 may be configured to encode video data according to any of these current or future standards. Similarly, it is also generally contemplated that the video decoder 30 of the destination device 14 may be configured to decode video data according to any of these current or future standards.

The video encoder 20 and the video decoder 30 each may be implemented as any of a variety of suitable encoder and/or decoder circuitry, such as one or more microprocessors, Digital Signal Processors (DSPs), Application Specific Integrated Circuits (ASICs), Field Programmable Gate Arrays (FPGAs), discrete logic, software, hardware, firmware or any combinations thereof. When implemented partially in software, an electronic device may store instructions for the software in a suitable, non-transitory computer-readable medium and execute the instructions in hardware using one or more processors to perform the video encoding/decoding operations disclosed in the present disclosure. Each of the video encoder 20 and the video decoder 30 may be included in one or more encoders or decoders, either of which may be integrated as part of a combined encoder/decoder (CODEC) in a respective device.

In some implementations, at least a part of components of the source device 12 (for example, the video source 18, the video encoder 20 or components included in the video encoder 20 as described below with reference to FIG. 2, and the output interface 22) and/or at least a part of components of the destination device 14 (for example, the input interface 28, the video decoder 30 or components included in the video decoder 30 as described below with reference to FIG. 3, and the display device 34) may operate in a cloud computing service network which may provide software, platforms, and/or infrastructure, such as Software as a Service (SaaS), Platform as a Service (PaaS), or Infrastructure as a Service (IaaS). In some implementations, one or more components in the source device 12 and/or the destination device 14 which are not included in the cloud computing service network may be provided in one or more client devices, and the one or more client devices may communicate with server computers in the cloud computing service network through a wireless communication network (for example, a cellular communication network, a short-range wireless communication network, or a global navigation satellite system (GNSS) communication network) or a wired communication network (e.g., a local area network (LAN) communication network or a power line communication (PLC) network). In an example, at least a part of operations described herein may be implemented as cloud-based services provided by one or more server computers which are implemented by the at least a part of the components of the source device 12 and/or the at least a part of the components of the destination device 14 in the cloud computing service network; and one or more other operations described herein may be implemented by the one or more client devices. In some implementations, the cloud computing service network may be a private cloud, a public cloud, or a hybrid cloud. The terms such as "cloud," "cloud computing," "cloud-based" etc. herein may be used interchangeably as appropriate without departing from the scope of the present disclosure. It should be understood that the present disclosure is not limited to being implemented in the cloud computing service network described above. Instead, the present disclosure may also be implemented in any other type of computing environments currently known or developed in the future.

Figure 1B:
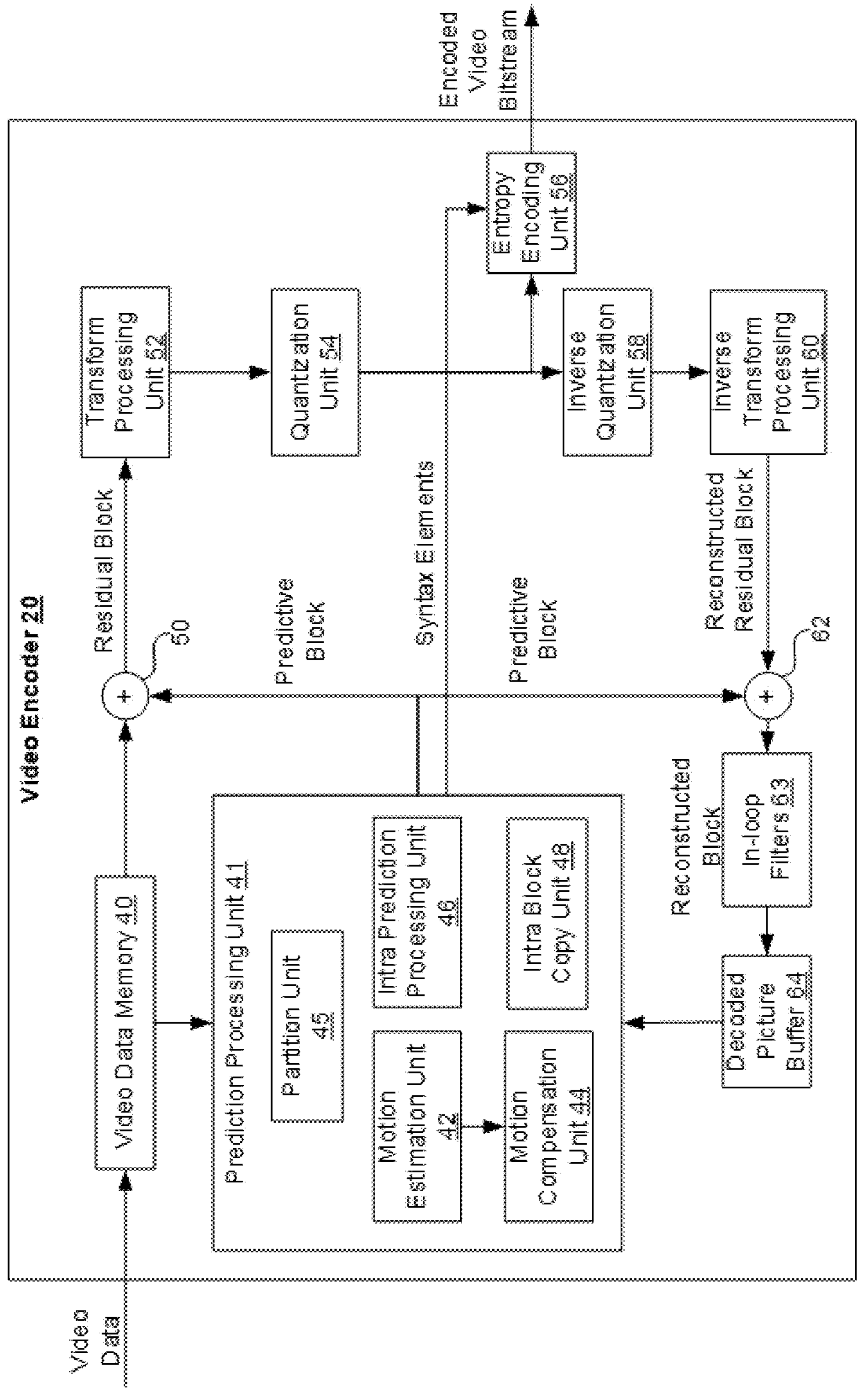
FIG. 1B is a block diagram of an encoder in accordance with some examples of the present disclosure.

Like HEVC, VVC is built upon the block-based hybrid video coding framework. FIG. 1B is a block diagram illustrating a block-based video encoder in accordance with some implementations of the present disclosure. In the encoder 100, the input video signal is processed block by block, called coding units (CUs). The encoder 100 may be the video encoder 20 as shown in FIG. 1A. In VTM-1.0, a CU can be up to 128×128 pixels. However, different from the HEVC which partitions blocks only based on quad-trees, in VVC, one coding tree unit (CTU) is split into CUs to adapt to varying local characteristics based on quad/binary/ternary-tree. Additionally, the concept of multiple partition unit type in the HEVC is removed, i.e., the separation of CU, prediction unit (PU) and transform unit (TU) does not exist in the VVC anymore; instead, each CU is always used as the basic unit for both prediction and transform without further partitions. In the multi-type tree structure, one CTU is firstly partitioned by a quad-tree structure. Then, each quad-tree leaf node can be further partitioned by a binary and ternary tree structure.

Figure 3A:
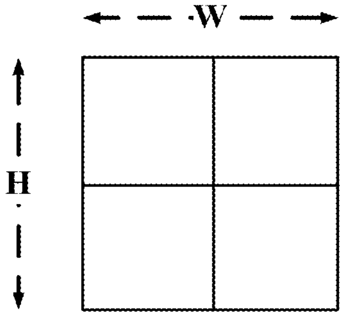
FIG. 3A is a diagram illustrating block partitions in a multi-type tree structure in accordance with some examples of the present disclosure.
Figure 3B:
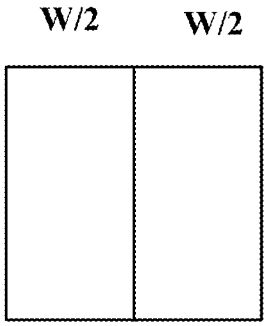
FIG. 3B is a diagram illustrating block partitions in a multi-type tree structure in accordance with some examples of the present disclosure.
Figure 3C:
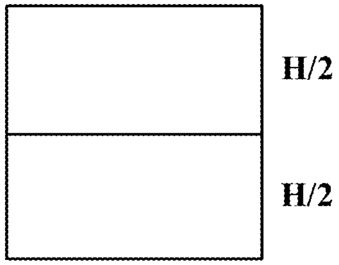
FIG. 3C is a diagram illustrating block partitions in a multi-type tree structure in accordance with some examples of the present disclosure.
Figure 3D:
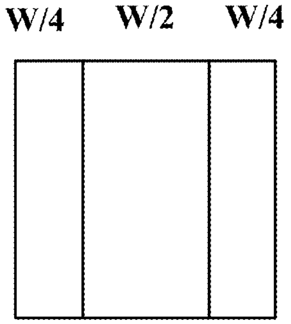
FIG. 3D is a diagram illustrating block partitions in a multi-type tree structure in accordance with some examples of the present disclosure.
Figure 3E:
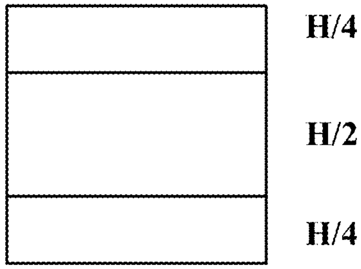
FIG. 3E is a diagram illustrating block partitions in a multi-type tree structure in accordance with some examples of the present disclosure.

FIGS. 3A-3E are schematic diagrams illustrating multi-type tree splitting modes in accordance with some implementations of the present disclosure. FIGS. 3A-3E respectively show five splitting types including quaternary partitioning (FIG. 3A), vertical binary partitioning (FIG. 3B), horizontal binary partitioning (FIG. 3C), vertical ternary partitioning (FIG. 3D), and horizontal ternary partitioning (FIG. 3E).

For each given video block, spatial prediction and/or temporal prediction may be performed. Spatial prediction (or "intra prediction") uses pixels from the samples of already coded neighboring blocks (which are called reference samples) in the same video picture/slice to predict the current video block. Spatial prediction reduces spatial redundancy inherent in the video signal. Temporal prediction (also referred to as "inter prediction" or "motion compensated prediction") uses reconstructed pixels from the already coded video pictures to predict the current video block. Temporal prediction reduces temporal redundancy inherent in the video signal. Temporal prediction signal for a given CU is usually signaled by one or more motion vectors (MVs) which indicate the amount and the direction of motion between the current CU and its temporal reference. Also, if multiple reference pictures are supported, one reference picture index is additionally sent, which is used to identify from which reference picture in the reference picture store the temporal prediction signal comes.

After spatial and/or temporal prediction, an intra/inter mode decision circuitry 121 in the encoder 100 chooses the best prediction mode, for example based on the rate-distortion optimization method. The block predictor 120 is then subtracted from the current video block; and the resulting prediction residual is de-correlated using the transform circuitry 102 and the quantization circuitry 104. The resulting quantized residual coefficients are inverse quantized by the inverse quantization circuitry 116 and inverse transformed by the inverse transform circuitry 118 to form the reconstructed residual, which is then added back to the prediction block to form the reconstructed signal of the CU. Further, in-loop filtering 115, such as a deblocking filter, a sample adaptive offset (SAO), and/or an adaptive in-loop filter (ALF) may be applied on the reconstructed CU before it is put in the reference picture store of the picture buffer 117 and used to code future video blocks. To form the output video bitstream 114, coding mode (inter or intra), prediction mode information, motion information, and quantized residual coefficients are all sent to the entropy coding unit 106 to be further compressed and packed to form the bit-stream.

For example, a deblocking filter is available in AVC, HEVC as well as the now-current version of VVC. In HEVC, an additional in-loop filter called SAO is defined to further improve coding efficiency. In the now-current version of the VVC standard, yet another in-loop filter called ALF is being actively investigated, and it has a good chance of being included in the final standard.

These in-loop filter operations are optional. Performing these operations helps to improve coding efficiency and visual quality. They may also be turned off as a decision rendered by the encoder 100 to save computational complexity.

It should be noted that intra prediction is usually based on unfiltered reconstructed pixels, while inter prediction is based on filtered reconstructed pixels if these filter options are turned on by the encoder 100.

Figure 2A:
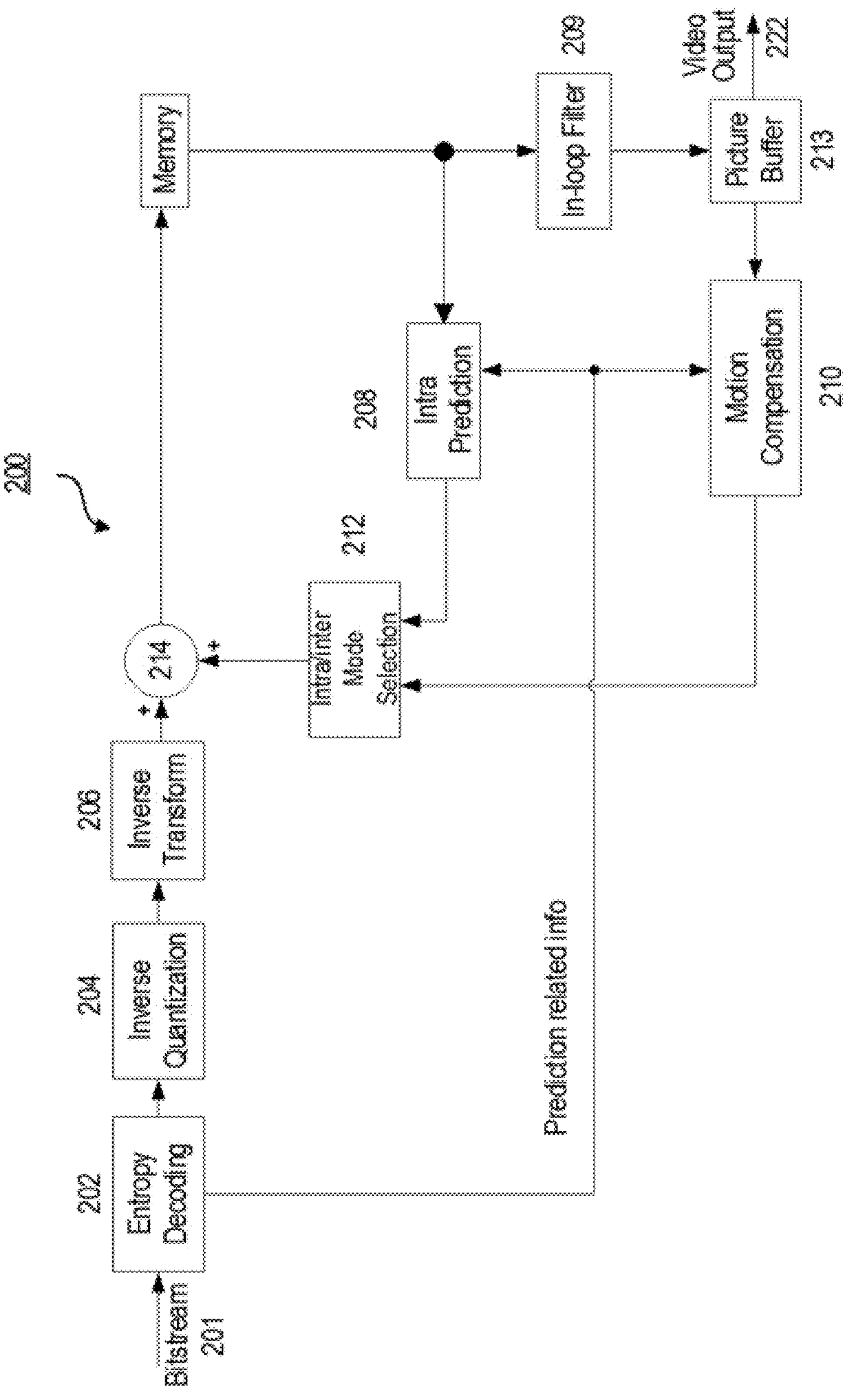
FIG. 2A is a block diagram of a decoder in accordance with some examples of the present disclosure.

FIG. 2A is a block diagram illustrating a block-based video decoder 200 which may be used in conjunction with many video coding standards. This decoder 200 is similar to the reconstruction-related section residing in the encoder 100 of FIG. 1B. The block-based video decoder 200 may be the video decoder 30 as shown in FIG. 1A. In the decoder 200, an incoming video bitstream 201 is first decoded through an Entropy Decoding 202 to derive quantized coefficient levels and prediction-related information. The quantized coefficient levels are then processed through an Inverse Quantization 204 and an Inverse Transform 206 to obtain a reconstructed prediction residual. A block predictor mechanism, implemented in an Intra/inter Mode Selector 212, is configured to perform either an Intra Prediction 208, or a Motion Compensation 210, based on decoded prediction information. A set of unfiltered reconstructed pixels are obtained by summing up the reconstructed prediction residual from the Inverse Transform 206 and a predictive output generated by the block predictor mechanism, using a summer 214.

The reconstructed block may further go through an In-Loop Filter 209 before it is stored in a Picture Buffer 213 which functions as a reference picture store. The reconstructed video in the Picture Buffer 213 may be sent to drive a display device, as well as used to predict future video blocks. In situations where the In-Loop Filter 209 is turned on, a filtering operation is performed on these reconstructed pixels to derive a final reconstructed Video Output 222.

Figure 1C:
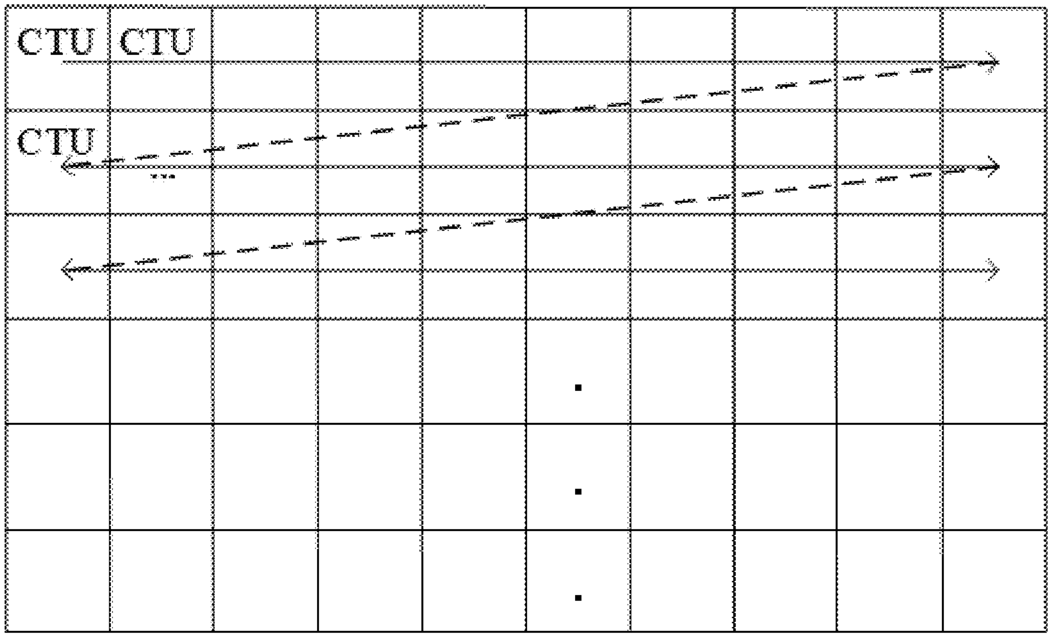
FIGS. 1C-1F are block diagrams illustrating how a frame is recursively partitioned into multiple video blocks of different sizes and shapes in accordance with some examples of the present disclosure.
Figure 1D:
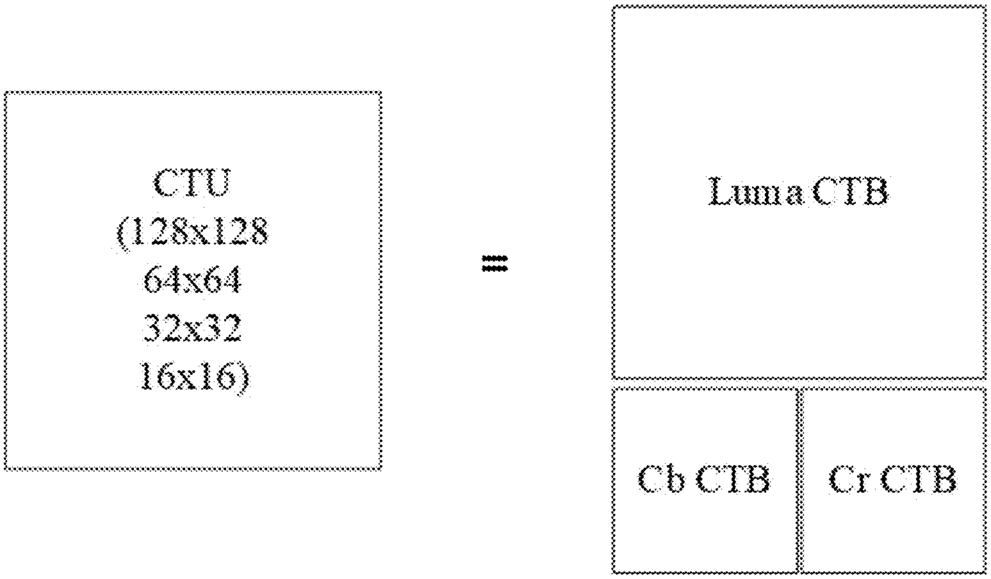
Figure 1E:
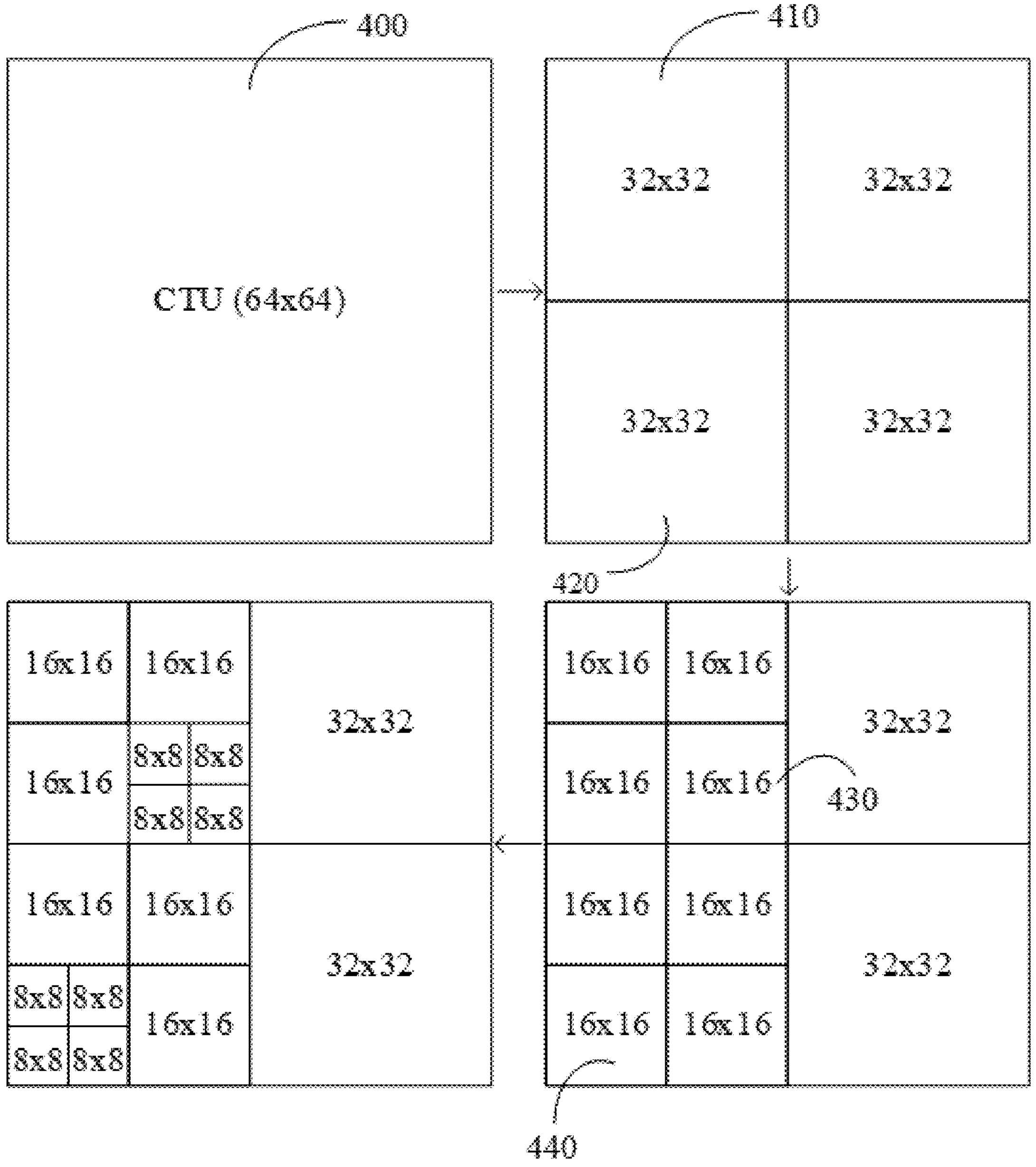
Figure 1F:
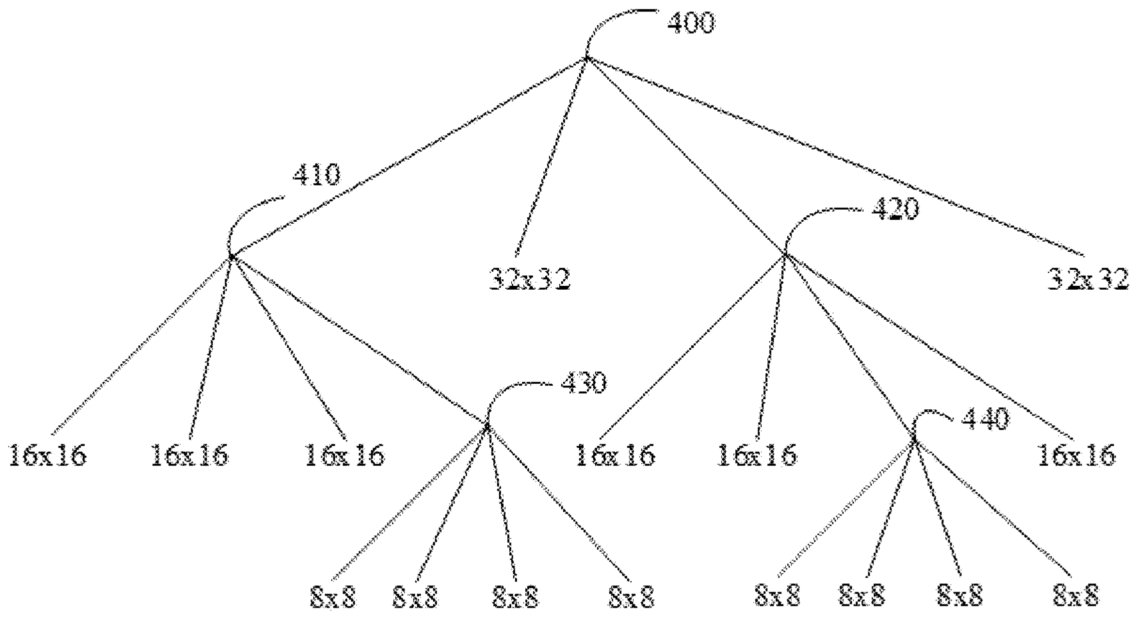
Figure 1G:
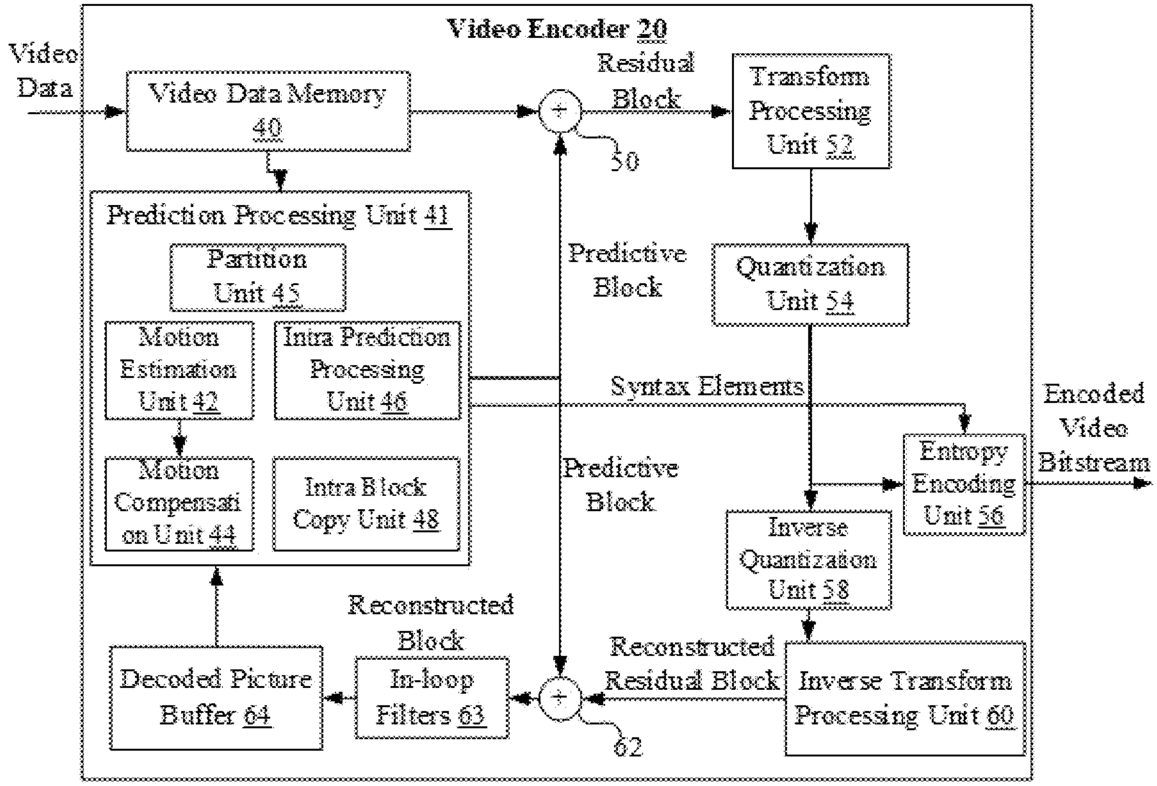
FIG. 1G is a block diagram illustrating an exemplary video encoder in accordance with some examples of the present disclosure

FIG. 1G is a block diagram illustrating another exemplary video encoder 20 in accordance with some implementations described in the present application. The video encoder 20 may perform intra and inter predictive coding of video blocks within video frames. Intra predictive coding relies on spatial prediction to reduce or remove spatial redundancy in video data within a given video frame or picture. Inter predictive coding relies on temporal prediction to reduce or remove temporal redundancy in video data within adjacent video frames or pictures of a video sequence. It should be noted that the term "frame" may be used as synonyms for the term "image" or "picture" in the field of video coding.

As shown in FIG. 1G, the video encoder 20 includes a video data memory 40, a prediction processing unit 41, a Decoded Picture Buffer (DPB) 64, a summer 50, a transform processing unit 52, a quantization unit 54, and an entropy encoding unit 56. The prediction processing unit 41 further includes a motion estimation unit 42, a motion compensation unit 44, a partition unit 45, an intra prediction processing unit 46, and an intra Block Copy (BC) unit 48. In some implementations, the video encoder 20 also includes an inverse quantization unit 58, an inverse transform processing unit 60, and a summer 62 for video block reconstruction. An in-loop filter 63, such as a deblocking filter, may be positioned between the summer 62 and the DPB 64 to filter block boundaries to remove blockiness artifacts from reconstructed video. Another in-loop filter, such as Sample Adaptive Offset (SAO) filter, Cross Component Sample Adaptive Offset (CCSAO) filter and/or Adaptive in-Loop Filter (ALF), may also be used in addition to the deblocking filter to filter an output of the summer 62. It should be illustrated that for the CCSAO technique, the present application is not limited to the embodiments described herein, and instead, the application may be applied to a situation where an offset is selected for any of a luma component, a Cb chroma component and a Cr chroma component according to any other of the luma component, the Cb chroma component and the Cr chroma component to modify said any component based on the selected offset. Further, it should also be illustrated that a first component mentioned herein may be any of the luma component, the Cb chroma component and the Cr chroma component, a second component mentioned herein may be any other of the luma component, the Cb chroma component and the Cr chroma component, and a third component mentioned herein may be a remaining one of the luma component, the Cb chroma component and the Cr chroma component. In some examples, the in-loop filters may be omitted, and the decoded video block may be directly provided by the summer 62 to the DPB 64. The video encoder 20 may take the form of a fixed or programmable hardware unit or may be divided among one or more of the illustrated fixed or programmable hardware units.

The video data memory 40 may store video data to be encoded by the components of the video encoder 20. The video data in the video data memory 40 may be obtained, for example, from the video source 18 as shown in FIG. 1A. The DPB 64 is a buffer that stores reference video data (for example, reference frames or pictures) for use in encoding video data by the video encoder 20 (e.g., in intra or inter predictive coding modes). The video data memory 40 and the DPB 64 may be formed by any of a variety of memory devices. In various examples, the video data memory 40 may be on-chip with other components of the video encoder 20, or off-chip relative to those components.

As shown in FIG. 1G, after receiving the video data, the partition unit 45 within the prediction processing unit 41 partitions the video data into video blocks. This partitioning may also include partitioning a video frame into slices, tiles (for example, sets of video blocks), or other larger Coding Units (CUs) according to predefined splitting structures such as a Quad-Tree (QT) structure associated with the video data. The video frame is or may be regarded as a two-dimensional array or matrix of samples with sample values. A sample in the array may also be referred to as a pixel or a pel. A number of samples in horizontal and vertical directions (or axes) of the array or picture define a size and/or a resolution of the video frame. The video frame may be divided into multiple video blocks by, for example, using QT partitioning. The video block again is or may be regarded as a two-dimensional array or matrix of samples with sample values, although of smaller dimension than the video frame. A number of samples in horizontal and vertical directions (or axes) of the video block define a size of the video block. The video block may further be partitioned into one or more block partitions or sub-blocks (which may form again blocks) by, for example, iteratively using QT partitioning, Binary-Tree (BT) partitioning or Triple-Tree (TT) partitioning or any combination thereof. It should be noted that the term "block" or "video block" as used herein may be a portion, in particular a rectangular (square or non-square) portion, of a frame or a picture. With reference, for example, to HEVC and VVC, the block or video block may be or correspond to a Coding Tree Unit (CTU), a CU, a Prediction Unit (PU) or a Transform Unit (TU) and/or may be or correspond to a corresponding block, e.g., a Coding Tree Block (CTB), a Coding Block (CB), a Prediction Block (PB) or a Transform Block (TB) and/or to a sub-block.

The prediction processing unit 41 may select one of a plurality of possible predictive coding modes, such as one of a plurality of intra predictive coding modes or one of a plurality of inter predictive coding modes, for the current video block based on error results (e.g., coding rate and the level of distortion). The prediction processing unit 41 may provide the resulting intra or inter prediction coded block to the summer 50 to generate a residual block and to the summer 62 to reconstruct the encoded block for use as part of a reference frame subsequently. The prediction processing unit 41 also provides syntax elements, such as motion vectors, intra-mode indicators, partition information, and other such syntax information, to the entropy encoding unit 56.

In order to select an appropriate intra predictive coding mode for the current video block, the intra prediction processing unit 46 within the prediction processing unit 41 may perform intra predictive coding of the current video block relative to one or more neighbor blocks in the same frame as the current block to be coded to provide spatial prediction. The motion estimation unit 42 and the motion compensation unit 44 within the prediction processing unit 41 perform inter predictive coding of the current video block relative to one or more predictive blocks in one or more reference frames to provide temporal prediction. The video encoder 20 may perform multiple coding passes, e.g., to select an appropriate coding mode for each block of video data.

In some implementations, the motion estimation unit 42 determines the inter prediction mode for a current video frame by generating a motion vector, which indicates the displacement of a video block within the current video frame relative to a predictive block within a reference video frame, according to a predetermined pattern within a sequence of video frames. Motion estimation, performed by the motion estimation unit 42, is the process of generating motion vectors, which estimate motion for video blocks. A motion vector, for example, may indicate the displacement of a video block within a current video frame or picture relative to a predictive block within a reference frame relative to the current block being coded within the current frame. The predetermined pattern may designate video frames in the sequence as P frames or B frames. The intra BC unit 48 may determine vectors, e.g., block vectors, for intra BC coding in a manner similar to the determination of motion vectors by the motion estimation unit 42 for inter prediction, or may utilize the motion estimation unit 42 to determine the block vector.

A predictive block for the video block may be or may correspond to a block or a reference block of a reference frame that is deemed as closely matching the video block to be coded in terms of pixel difference, which may be determined by Sum of Absolute Difference (SAD), Sum of Square Difference (SSD), or other difference metrics. In some implementations, the video encoder 20 may calculate values for sub-integer pixel positions of reference frames stored in the DPB 64. For example, the video encoder 20 may interpolate values of one-quarter pixel positions, one-eighth pixel positions, or other fractional pixel positions of the reference frame. Therefore, the motion estimation unit 42 may perform a motion search relative to the full pixel positions and fractional pixel positions and output a motion vector with fractional pixel precision.

The motion estimation unit 42 calculates a motion vector for a video block in an inter prediction coded frame by comparing the position of the video block to the position of a predictive block of a reference frame selected from a first reference frame list (List 0) or a second reference frame list (List 1), each of which identifies one or more reference frames stored in the DPB 64. The motion estimation unit 42 sends the calculated motion vector to the motion compensation unit 44 and then to the entropy encoding unit 56.

Motion compensation, performed by the motion compensation unit 44, may involve fetching or generating the predictive block based on the motion vector determined by the motion estimation unit 42. Upon receiving the motion vector for the current video block, the motion compensation unit 44 may locate a predictive block to which the motion vector points in one of the reference frame lists, retrieve the predictive block from the DPB 64, and forward the predictive block to the summer 50. The summer 50 then forms a residual video block of pixel difference values by subtracting pixel values of the predictive block provided by the motion compensation unit 44 from the pixel values of the current video block being coded. The pixel difference values forming the residual video block may include luma or chroma component differences or both. The motion compensation unit 44 may also generate syntax elements associated with the video blocks of a video frame for use by the video decoder 30 in decoding the video blocks of the video frame. The syntax elements may include, for example, syntax elements defining the motion vector used to identify the predictive block, any flags indicating the prediction mode, or any other syntax information described herein. Note that the motion estimation unit 42 and the motion compensation unit 44 may be highly integrated, but are illustrated separately for conceptual purposes.

In some implementations, the intra BC unit 48 may generate vectors and fetch predictive blocks in a manner similar to that described above in connection with the motion estimation unit 42 and the motion compensation unit 44, but with the predictive blocks being in the same frame as the current block being coded and with the vectors being referred to as block vectors as opposed to motion vectors. In particular, the intra BC unit 48 may determine an intra-prediction mode to use to encode a current block. In some examples, the intra BC unit 48 may encode a current block using various intra-prediction modes, e.g., during separate encoding passes, and test their performance through rate-distortion analysis. Next, the intra BC unit 48 may select, among the various tested intra-prediction modes, an appropriate intra-prediction mode to use and generate an intra-mode indicator accordingly. For example, the intra BC unit 48 may calculate rate-distortion values using a rate-distortion analysis for the various tested intra-prediction modes, and select the intra-prediction mode having the best rate-distortion characteristics among the tested modes as the appropriate intra-prediction mode to use. Rate-distortion analysis generally determines an amount of distortion (or error) between an encoded block and an original, unencoded block that was encoded to produce the encoded block, as well as a bitrate (i.e., a number of bits) used to produce the encoded block. Intra BC unit 48 may calculate ratios from the distortions and rates for the various encoded blocks to determine which intra-prediction mode exhibits the best rate-distortion value for the block.

In other examples, the intra BC unit 48 may use the motion estimation unit 42 and the motion compensation unit 44, in whole or in part, to perform such functions for Intra BC prediction according to the implementations described herein. In either case, for Intra block copy, a predictive block may be a block that is deemed as closely matching the block to be coded, in terms of pixel difference, which may be determined by SAD, SSD, or other difference metrics, and identification of the predictive block may include calculation of values for sub-integer pixel positions.

Whether the predictive block is from the same frame according to intra prediction, or a different frame according to inter prediction, the video encoder 20 may form a residual video block by subtracting pixel values of the predictive block from the pixel values of the current video block being coded, forming pixel difference values. The pixel difference values forming the residual video block may include both luma and chroma component differences.

The intra prediction processing unit 46 may intra-predict a current video block, as an alternative to the inter-prediction performed by the motion estimation unit 42 and the motion compensation unit 44, or the intra block copy prediction performed by the intra BC unit 48, as described above. In particular, the intra prediction processing unit 46 may determine an intra prediction mode to use to encode a current block. To do so, the intra prediction processing unit 46 may encode a current block using various intra prediction modes, e.g., during separate encoding passes, and the intra prediction processing unit 46 (or a mode selection unit, in some examples) may select an appropriate intra prediction mode to use from the tested intra prediction modes. The intra prediction processing unit 46 may provide information indicative of the selected intra-prediction mode for the block to the entropy encoding unit 56. The entropy encoding unit 56 may encode the information indicating the selected intra-prediction mode in the bitstream.

After the prediction processing unit 41 determines the predictive block for the current video block via either inter prediction or intra prediction, the summer 50 forms a residual video block by subtracting the predictive block from the current video block. The residual video data in the residual block may be included in one or more TUs and is provided to the transform processing unit 52. The transform processing unit 52 transforms the residual video data into residual transform coefficients using a transform, such as a Discrete Cosine Transform (DCT) or a conceptually similar transform.

The transform processing unit 52 may send the resulting transform coefficients to the quantization unit 54. The quantization unit 54 quantizes the transform coefficients to further reduce the bit rate. The quantization process may also reduce the bit depth associated with some or all of the coefficients. The degree of quantization may be modified by adjusting a quantization parameter. In some examples, the quantization unit 54 may then perform a scan of a matrix including the quantized transform coefficients. Alternatively, the entropy encoding unit 56 may perform the scan.

Following quantization, the entropy encoding unit 56 entropy encodes the quantized transform coefficients into a video bitstream using, e.g., Context Adaptive Variable Length Coding (CAVLC), Context Adaptive Binary Arithmetic Coding (CABAC), Syntax-based context-adaptive Binary Arithmetic Coding (SBAC), Probability Interval Partitioning Entropy (PIPE) coding or another entropy encoding methodology or technique. The encoded bitstream may then be transmitted to the video decoder 30 as shown in FIG. 1A, or archived in the storage device 32 as shown in FIG. 1A for later transmission to or retrieval by the video decoder 30. The entropy encoding unit 56 may also entropy encode the motion vectors and the other syntax elements for the current video frame being coded.

The inverse quantization unit 58 and the inverse transform processing unit 60 apply inverse quantization and inverse transformation, respectively, to reconstruct the residual video block in the pixel domain for generating a reference block for prediction of other video blocks. As noted above, the motion compensation unit 44 may generate a motion compensated predictive block from one or more reference blocks of the frames stored in the DPB 64. The motion compensation unit 44 may also apply one or more interpolation filters to the predictive block to calculate sub-integer pixel values for use in motion estimation.

The summer 62 adds the reconstructed residual block to the motion compensated predictive block produced by the motion compensation unit 44 to produce a reference block for storage in the DPB 64. The reference block may then be used by the intra BC unit 48, the motion estimation unit 42 and the motion compensation unit 44 as a predictive block to inter predict another video block in a subsequent video frame.

Figure 2B:
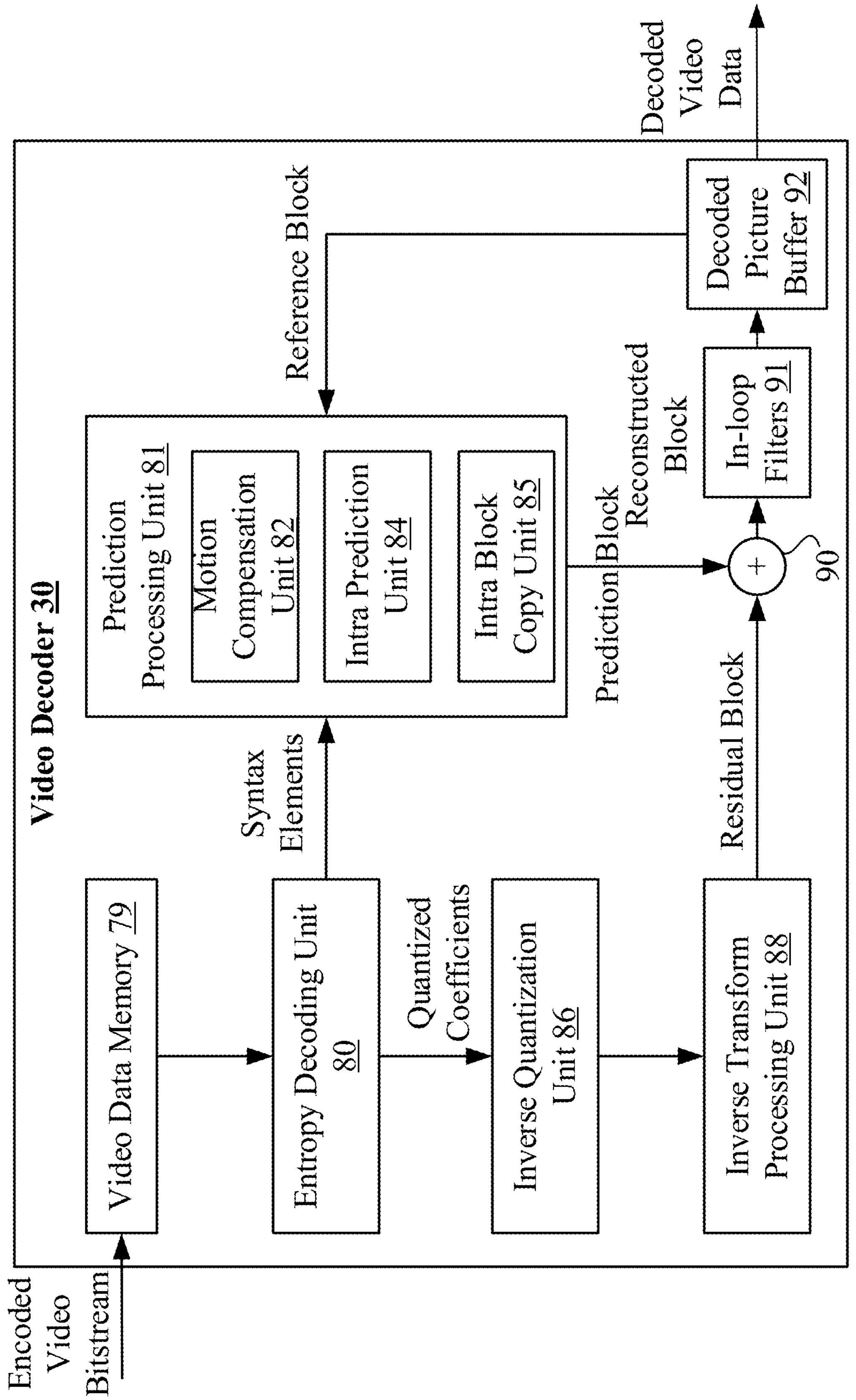
FIG. 2B is a block diagram illustrating an exemplary video decoder in accordance with some examples of the present disclosure.

FIG. 2B is a block diagram illustrating another exemplary video decoder 30 in accordance with some implementations of the present application. The video decoder 30 includes a video data memory 79, an entropy decoding unit 80, a prediction processing unit 81, an inverse quantization unit 86, an inverse transform processing unit 88, a summer 90, and a DPB 92. The prediction processing unit 81 further includes a motion compensation unit 82, an intra prediction unit 84, and an intra BC unit 85. The video decoder 30 may perform a decoding process generally reciprocal to the encoding process described above with respect to the video encoder 20 in connection with FIG. 1G. For example, the motion compensation unit 82 may generate prediction data based on motion vectors received from the entropy decoding unit 80, while the intra-prediction unit 84 may generate prediction data based on intra-prediction mode indicators received from the entropy decoding unit 80.

In some examples, a unit of the video decoder 30 may be tasked to perform the implementations of the present application. Also, in some examples, the implementations of the present disclosure may be divided among one or more of the units of the video decoder 30. For example, the intra BC unit 85 may perform the implementations of the present application, alone, or in combination with other units of the video decoder 30, such as the motion compensation unit 82, the intra prediction unit 84, and the entropy decoding unit 80. In some examples, the video decoder 30 may not include the intra BC unit 85 and the functionality of intra BC unit 85 may be performed by other components of the prediction processing unit 81, such as the motion compensation unit 82.

The video data memory 79 may store video data, such as an encoded video bitstream, to be decoded by the other components of the video decoder 30. The video data stored in the video data memory 79 may be obtained, for example, from the storage device 32, from a local video source, such as a camera, via wired or wireless network communication of video data, or by accessing physical data storage media (e.g., a flash drive or hard disk). The video data memory 79 may include a Coded Picture Buffer (CPB) that stores encoded video data from an encoded video bitstream. The DPB 92 of the video decoder 30 stores reference video data for use in decoding video data by the video decoder 30 (e.g., in intra or inter predictive coding modes). The video data memory 79 and the DPB 92 may be formed by any of a variety of memory devices, such as dynamic random access memory (DRAM), including Synchronous DRAM (SDRAM), Magneto-resistive RAM (MRAM), Resistive RAM (RRAM), or other types of memory devices. For illustrative purpose, the video data memory 79 and the DPB 92 are depicted as two distinct components of the video decoder 30 in FIG. 2B. But it will be apparent to one skilled in the art that the video data memory 79 and the DPB 92 may be provided by the same memory device or separate memory devices. In some examples, the video data memory 79 may be on-chip with other components of the video decoder 30, or off-chip relative to those components.

During the decoding process, the video decoder 30 receives an encoded video bitstream that represents video blocks of an encoded video frame and associated syntax elements. The video decoder 30 may receive the syntax elements at the video frame level and/or the video block level. The entropy decoding unit 80 of the video decoder 30 entropy decodes the bitstream to generate quantized coefficients, motion vectors or intra-prediction mode indicators, and other syntax elements. The entropy decoding unit 80 then forwards the motion vectors or intra-prediction mode indicators and other syntax elements to the prediction processing unit 81.

When the video frame is coded as an intra predictive coded (I) frame or for intra coded predictive blocks in other types of frames, the intra prediction unit 84 of the prediction processing unit 81 may generate prediction data for a video block of the current video frame based on a signaled intra prediction mode and reference data from previously decoded blocks of the current frame.

When the video frame is coded as an inter-predictive coded (i.e., B or P) frame, the motion compensation unit 82 of the prediction processing unit 81 produces one or more predictive blocks for a video block of the current video frame based on the motion vectors and other syntax elements received from the entropy decoding unit 80. Each of the predictive blocks may be produced from a reference frame within one of the reference frame lists. The video decoder 30 may construct the reference frame lists, List 0 and List 1, using default construction techniques based on reference frames stored in the DPB 92.

In some examples, when the video block is coded according to the intra BC mode described herein, the intra BC unit 85 of the prediction processing unit 81 produces predictive blocks for the current video block based on block vectors and other syntax elements received from the entropy decoding unit 80. The predictive blocks may be within a reconstructed region of the same picture as the current video block defined by the video encoder 20.

The motion compensation unit 82 and/or the intra BC unit 85 determines prediction information for a video block of the current video frame by parsing the motion vectors and other syntax elements, and then uses the prediction information to produce the predictive blocks for the current video block being decoded. For example, the motion compensation unit 82 uses some of the received syntax elements to determine a prediction mode (e.g., intra or inter prediction) used to code video blocks of the video frame, an inter prediction frame type (e.g., B or P), construction information for one or more of the reference frame lists for the frame, motion vectors for each inter predictive encoded video block of the frame, inter prediction status for each inter predictive coded video block of the frame, and other information to decode the video blocks in the current video frame.

Similarly, the intra BC unit 85 may use some of the received syntax elements, e.g., a flag, to determine that the current video block was predicted using the intra BC mode, construction information of which video blocks of the frame are within the reconstructed region and should be stored in the DPB 92, block vectors for each intra BC predicted video block of the frame, intra BC prediction status for each intra BC predicted video block of the frame, and other information to decode the video blocks in the current video frame.

The motion compensation unit 82 may also perform interpolation using the interpolation filters as used by the video encoder 20 during encoding of the video blocks to calculate interpolated values for sub-integer pixels of reference blocks. In this case, the motion compensation unit 82 may determine the interpolation filters used by the video encoder 20 from the received syntax elements and use the interpolation filters to produce predictive blocks.

The inverse quantization unit 86 inverse quantizes the quantized transform coefficients provided in the bitstream and entropy decoded by the entropy decoding unit 80 using the same quantization parameter calculated by the video encoder 20 for each video block in the video frame to determine a degree of quantization. The inverse transform processing unit 88 applies an inverse transform, e.g., an inverse DCT, an inverse integer transform, or a conceptually similar inverse transform process, to the transform coefficients in order to reconstruct the residual blocks in the pixel domain.

After the motion compensation unit 82 or the intra BC unit 85 generates the predictive block for the current video block based on the vectors and other syntax elements, the summer 90 reconstructs decoded video block for the current video block by summing the residual block from the inverse transform processing unit 88 and a corresponding predictive block generated by the motion compensation unit 82 and the intra BC unit 85. An in-loop filter 91 such as deblocking filter, SAO filter, CCSAO filter and/or ALF may be positioned between the summer 90 and the DPB 92 to further process the decoded video block. In some examples, the in-loop filter 91 may be omitted, and the decoded video block may be directly provided by the summer 90 to the DPB 92. The decoded video blocks in a given frame are then stored in the DPB 92, which stores reference frames used for subsequent motion compensation of next video blocks. The DPB 92, or a memory device separate from the DPB 92, may also store decoded video for later presentation on a display device, such as the display device 34 of FIG. 1A.

In the current VVC and AVS3 standards, motion information of the current coding block is either copied from spatial or temporal neighboring blocks specified by a merge candidate index or obtained by explicit signaling of motion estimation. The focus of the present disclosure is to improve the accuracy of the motion vectors for affine merge mode by improving the derivation methods of affine merge candidates. To facilitate the description of the present disclosure, the existing affine merge mode design in the VVC standard is used as an example to illustrate the proposed ideas. Please note that though the existing affine mode design in the VVC standard is used as the example throughout the present disclosure, to a person skilled in the art of modern video coding technologies, the proposed technologies can also be applied to a different design of affine motion prediction mode or other coding tools with the same or similar design spirit.

In a typical video coding process, a video sequence typically includes an ordered set of frames or pictures. Each frame may include three sample arrays, denoted SL, SCb, and SCr. SL is a two-dimensional array of luma samples. SCb is a two-dimensional array of Cb chroma samples. SCr is a two-dimensional array of Cr chroma samples. In other instances, a frame may be monochrome and therefore includes only one two-dimensional array of luma samples.

As shown in FIG. 1C, the video encoder 20 (or more specifically a partition unit in a prediction processing unit of the video encoder 20) generates an encoded representation of a frame by first partitioning the frame into a set of CTUs. A video frame may include an integer number of CTUs ordered consecutively in a raster scan order from left to right and from top to bottom. Each CTU is a largest logical coding unit and the width and height of the CTU are signaled by the video encoder 20 in a sequence parameter set, such that all the CTUs in a video sequence have the same size being one of 128×128, 64×64, 32×32, and 16×16. But it should be noted that the present application is not necessarily limited to a particular size. As shown in FIG. 1D, each CTU may include one CTB of luma samples, two corresponding coding tree blocks of chroma samples, and syntax elements used to code the samples of the coding tree blocks. The syntax elements describe properties of different types of units of a coded block of pixels and how the video sequence can be reconstructed at the video decoder 30, including inter or intra prediction, intra prediction mode, motion vectors, and other parameters. In monochrome pictures or pictures having three separate color planes, a CTU may include a single coding tree block and syntax elements used to code the samples of the coding tree block. A coding tree block may be an N×N block of samples.

To achieve a better performance, the video encoder 20 may recursively perform tree partitioning such as binary-tree partitioning, ternary-tree partitioning, quad-tree partitioning or a combination thereof on the coding tree blocks of the CTU and divide the CTU into smaller CUs. As depicted in FIG. 1E, the 64×64 CTU 400 is first divided into four smaller CUs, each having a block size of 32×32. Among the four smaller CUs, CU 410 and CU 420 are each divided into four CUs of 16×16 by block size. The two 16×16 CUs 430 and 440 are each further divided into four CUs of 8×8 by block size. FIG. 1F depicts a quad-tree data structure illustrating the end result of the partition process of the CTU 400 as depicted in FIG. 1E, each leaf node of the quad-tree corresponding to one CU of a respective size ranging from 32×32 to 8×8. Like the CTU depicted in FIG. 1D, each CU may include a CB of luma samples and two corresponding coding blocks of chroma samples of a frame of the same size, and syntax elements used to code the samples of the coding blocks. In monochrome pictures or pictures having three separate color planes, a CU may include a single coding block and syntax structures used to code the samples of the coding block. It should be noted that the quad-tree partitioning depicted in FIGS. 1E-IF is only for illustrative purposes and one CTU can be split into CUs to adapt to varying local characteristics based on quad/ternary/binary-tree partitions. In the multi-type tree structure, one CTU is partitioned by a quad-tree structure and each quad-tree leaf CU can be further partitioned by a binary and ternary tree structure. As shown in FIGS. 3A-3E, there are five possible partitioning types of a coding block having a width W and a height H, i.e., quaternary partitioning, horizontal binary partitioning, vertical binary partitioning, horizontal ternary partitioning, and vertical ternary partitioning.

In some implementations, the video encoder 20 may further partition a coding block of a CU into one or more M×N PBs. A PB is a rectangular (square or non-square) block of samples on which the same prediction, inter or intra, is applied. A PU of a CU may include a PB of luma samples, two corresponding PBs of chroma samples, and syntax elements used to predict the PBs. In monochrome pictures or pictures having three separate color planes, a PU may include a single PB and syntax structures used to predict the PB. The video encoder 20 may generate predictive luma, Cb, and Cr blocks for luma, Cb, and Cr PBs of each PU of the CU.

The video encoder 20 may use intra prediction or inter prediction to generate the predictive blocks for a PU. If the video encoder 20 uses intra prediction to generate the predictive blocks of a PU, the video encoder 20 may generate the predictive blocks of the PU based on decoded samples of the frame associated with the PU. If the video encoder 20 uses inter prediction to generate the predictive blocks of a PU, the video encoder 20 may generate the predictive blocks of the PU based on decoded samples of one or more frames other than the frame associated with the PU.

After the video encoder 20 generates predictive luma, Cb, and Cr blocks for one or more PUs of a CU, the video encoder 20 may generate a luma residual block for the CU by subtracting the CU's predictive luma blocks from its original luma coding block such that each sample in the CU's luma residual block indicates a difference between a luma sample in one of the CU's predictive luma blocks and a corresponding sample in the CU's original luma coding block. Similarly, the video encoder 20 may generate a Cb residual block and a Cr residual block for the CU, respectively, such that each sample in the CU's Cb residual block indicates a difference between a Cb sample in one of the CU's predictive Cb blocks and a corresponding sample in the CU's original Cb coding block and each sample in the CU's Cr residual block may indicate a difference between a Cr sample in one of the CU's predictive Cr blocks and a corresponding sample in the CU's original Cr coding block.

Furthermore, as illustrated in FIG. 1E, the video encoder 20 may use quad-tree partitioning to decompose the luma, Cb, and Cr residual blocks of a CU into one or more luma, Cb, and Cr transform blocks respectively. A transform block is a rectangular (square or non-square) block of samples on which the same transform is applied. A TU of a CU may include a transform block of luma samples, two corresponding transform blocks of chroma samples, and syntax elements used to transform the transform block samples. Thus, each TU of a CU may be associated with a luma transform block, a Cb transform block, and a Cr transform block. In some examples, the luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may include a single transform block and syntax structures used to transform the samples of the transform block.

The video encoder 20 may apply one or more transforms to a luma transform block of a TU to generate a luma coefficient block for the TU. A coefficient block may be a two-dimensional array of transform coefficients. A transform coefficient may be a scalar quantity. The video encoder 20 may apply one or more transforms to a Cb transform block of a TU to generate a Cb coefficient block for the TU. The video encoder 20 may apply one or more transforms to a Cr transform block of a TU to generate a Cr coefficient block for the TU.

After generating a coefficient block (e.g., a luma coefficient block, a Cb coefficient block or a Cr coefficient block), the video encoder 20 may quantize the coefficient block. Quantization generally refers to a process in which transform coefficients are quantized to possibly reduce the amount of data used to represent the transform coefficients, providing further compression. After the video encoder 20 quantizes a coefficient block, the video encoder 20 may entropy encode syntax elements indicating the quantized transform coefficients. For example, the video encoder 20 may perform CABAC on the syntax elements indicating the quantized transform coefficients. Finally, the video encoder 20 may output a bitstream that includes a sequence of bits that forms a representation of coded frames and associated data, which is either saved in the storage device 32 or transmitted to the destination device 14.

After receiving a bitstream generated by the video encoder 20, the video decoder 30 may parse the bitstream to obtain syntax elements from the bitstream. The video decoder 30 may reconstruct the frames of the video data based at least in part on the syntax elements obtained from the bitstream. The process of reconstructing the video data is generally reciprocal to the encoding process performed by the video encoder 20. For example, the video decoder 30 may perform inverse transforms on the coefficient blocks associated with TUs of a current CU to reconstruct residual blocks associated with the TUs of the current CU. The video decoder 30 also reconstructs the coding blocks of the current CU by adding the samples of the predictive blocks for PUs of the current CU to corresponding samples of the transform blocks of the TUs of the current CU. After reconstructing the coding blocks for each CU of a frame, video decoder 30 may reconstruct the frame.

As noted above, video coding achieves video compression using primarily two modes, i.e., intra-frame prediction (or intra-prediction) and inter-frame prediction (or inter-prediction). It is noted that IBC could be regarded as either intra-frame prediction or a third mode. Between the two modes, inter-frame prediction contributes more to the coding efficiency than intra-frame prediction because of the use of motion vectors for predicting a current video block from a reference video block.

But with the ever improving video data capturing technology and more refined video block size for preserving details in the video data, the amount of data required for representing motion vectors for a current frame also increases substantially. One way of overcoming this challenge is to benefit from the fact that not only a group of neighboring CUs in both the spatial and temporal domains have similar video data for predicting purpose but the motion vectors between these neighboring CUs are also similar. Therefore, it is possible to use the motion information of spatially neighboring CUs and/or temporally co-located CUs as an approximation of the motion information (e.g., motion vector) of a current CU by exploring their spatial and temporal correlation, which is also referred to as "Motion Vector Predictor (MVP)" of the current CU.

Instead of encoding, into the video bitstream, an actual motion vector of the current CU determined by the motion estimation unit as described above in connection with FIG. 1B, the motion vector predictor of the current CU is subtracted from the actual motion vector of the current CU to produce a Motion Vector Difference (MVD) for the current CU. By doing so, there is no need to encode the motion vector determined by the motion estimation unit for each CU of a frame into the video bitstream and the amount of data used for representing motion information in the video bitstream can be significantly decreased.

Like the process of choosing a predictive block in a reference frame during inter-frame prediction of a code block, a set of rules need to be adopted by both the video encoder 20 and the video decoder 30 for constructing a motion vector candidate list (also known as a "merge list") for a current CU using those potential candidate motion vectors associated with spatially neighboring CUs and/or temporally co-located CUs of the current CU and then selecting one member from the motion vector candidate list as a motion vector predictor for the current CU. By doing so, there is no need to transmit the motion vector candidate list itself from the video encoder 20 to the video decoder 30 and an index of the selected motion vector predictor within the motion vector candidate list is sufficient for the video encoder 20 and the video decoder 30 to use the same motion vector predictor within the motion vector candidate list for encoding and decoding the current CU.

Some embodiments of this disclosure are to further enhance the inter coding efficiency by applying adaptive enhancement filters on the motion compensated prediction signals of bi-predicted blocks. Some embodiments of the present disclosure are to further enhance the chroma coding efficiency of the motion compensation module that is applied in the ECM. In the following, some related coding tools that are applied in the transform and entropy coding process in the ECM are briefly reviewed. After that, some deficiencies in the existing design of motion compensation are discussed. Finally, the solutions are provided to improve the existing design.

Motion Compensated Prediction (MCP)

Figure 4:
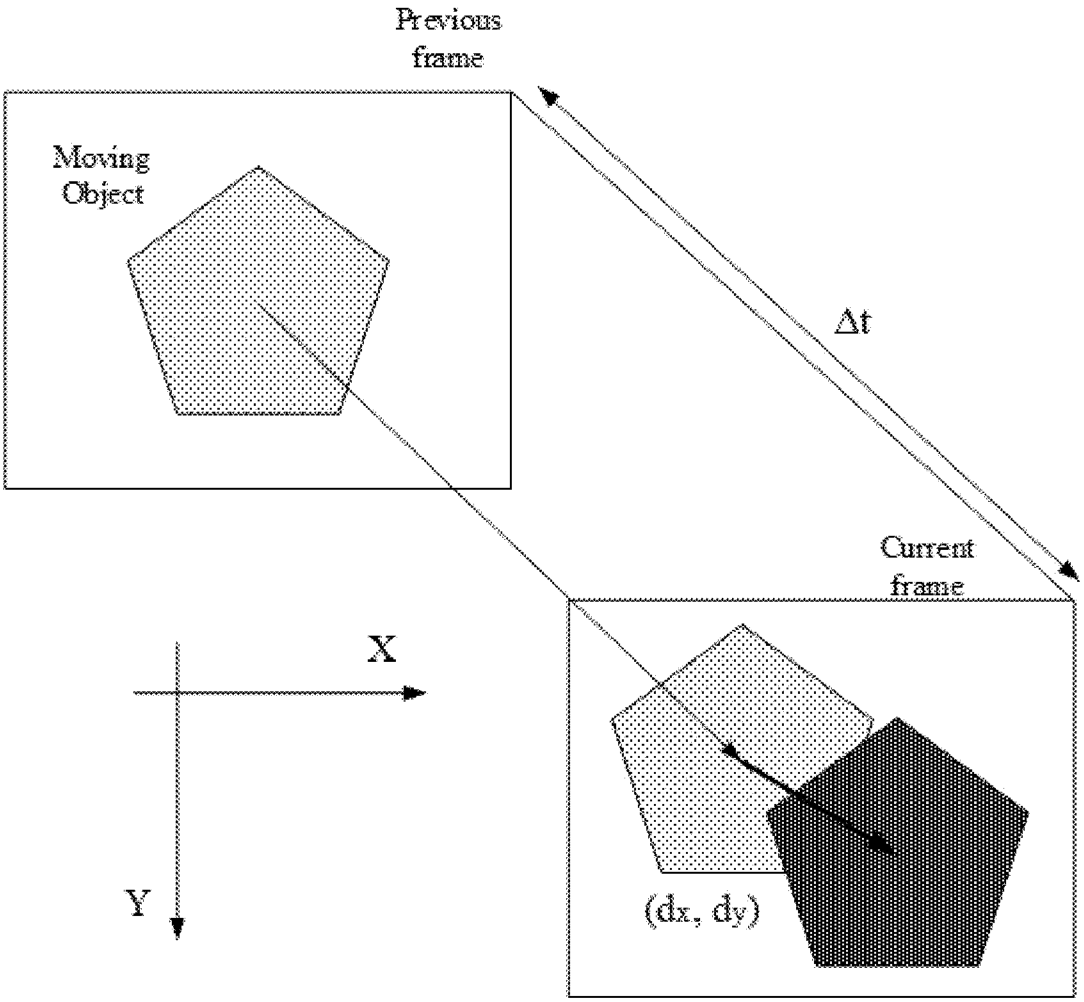
FIG. 4 shows one example where $d_x$ and $d_y$ are the horizontal and vertical values of the MV in accordance with some examples of the present disclosure.
Figure 5:
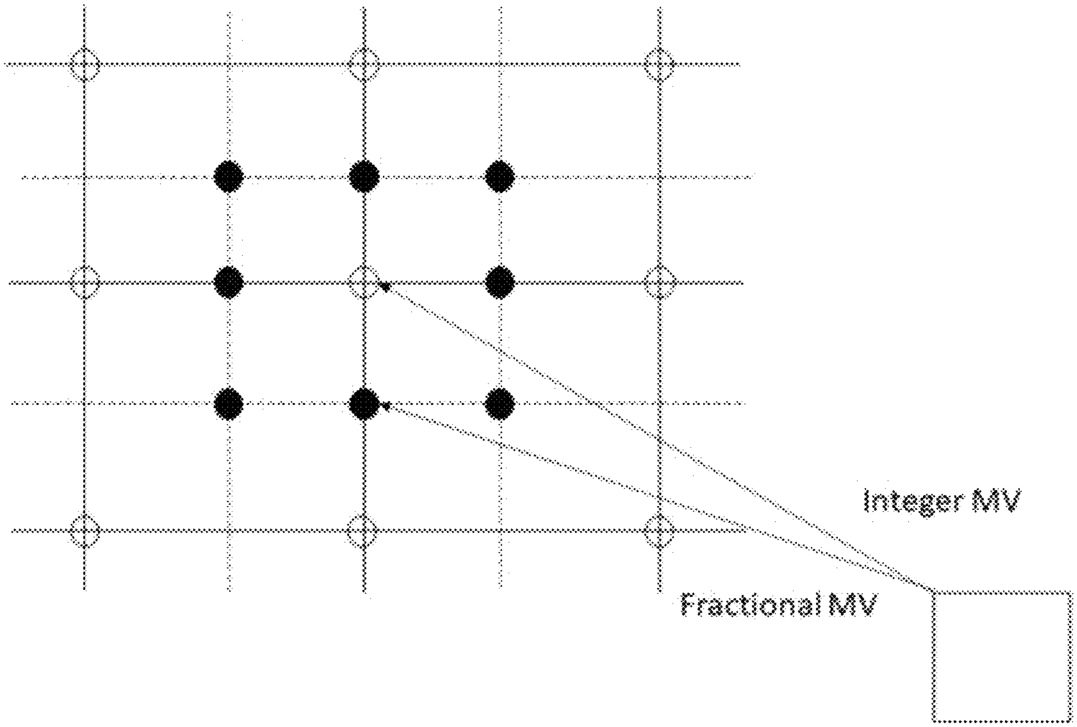
FIG. 5 shows an example where one MV has one fractional value and interpolation filters are applied to generate the corresponding prediction samples at fractional sample positions in accordance with some examples of the present disclosure.

Motion compensated prediction (MCP), which is also known as motion compensation in short, is one of the most widely used video coding techniques in the development of the modern video coding standards. In the MCP, one video frame is partitioned into multiple blocks (which are called prediction unit (PU)). Each PU is predicted from a block in the equal size from one temporal reference picture such that the overhead that is needed to signal the block is significantly reduced. In all the existing video coding standards, each inter PU is associated with a set of motion parameters which consist of one or two MVs and reference picture indices. The inter PUs in a P slice only have one reference picture list while the PUs in a B slice may use up to two reference picture lists. In the MCP, the corresponding inter prediction samples are generated from its corresponding region in the reference picture as identified by the MV and the reference picture index. The MV specifies the horizontal and vertical displacement between the current block and its reference block in the reference picture. FIG. 4 shows one example where $d_x$ and $d_y$ are the horizontal and vertical values of the MV. In practice, the value of one MV may be in fractional precisions. When one MV has one fractional value, interpolation filters are applied to generate the corresponding prediction samples at fractional sample positions, as illustrated in FIG. 5. In the VVC, it supports MVs with the unit of 1/16 of the distance between two neighboring luma samples for the luma MC and 1/32 of the distance of two neighboring chroma samples for the chroma MC.

Adaptive Loop Filtering

In the VVC and ECM, adaptive loop filtering (ALF) where one among 25 filters is selected for each 4×4 block based on the direction and activity of local gradients.

Figure 6A:
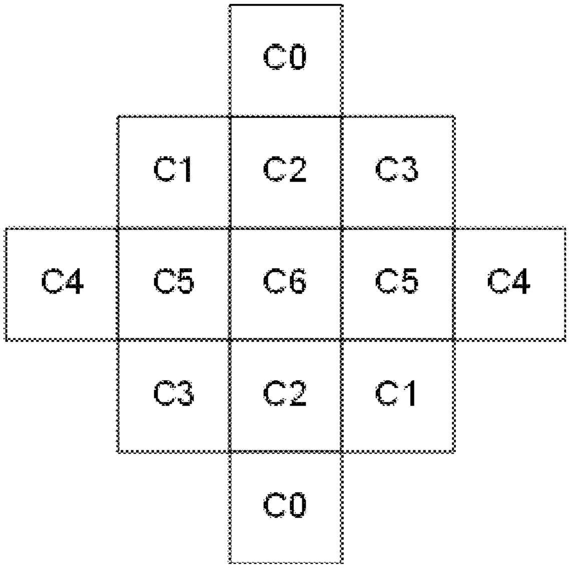
FIG. 6 shows examples of two diamond filter shapes in accordance with some examples of the present disclosure.
Figure 6B:
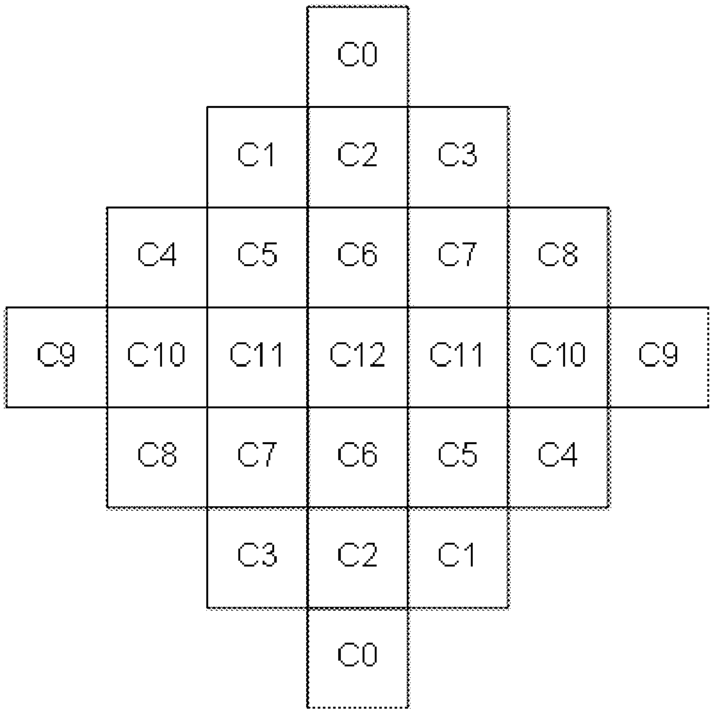

Filter shape: Two diamond filter shapes (as shown in FIG. 6A-6B) are used. The 7×7 diamond shape is applied for luma component and the 5×5 diamond shape is applied for chroma components.

Block classification: For luma component, each 4×4 block is categorized into one out of 25 classes. The classification index C is derived based on its directionality D and a quantized value of activity Â, as follows:

$$C = 5D + \hat{A} \tag{1}$$

Figure 7:
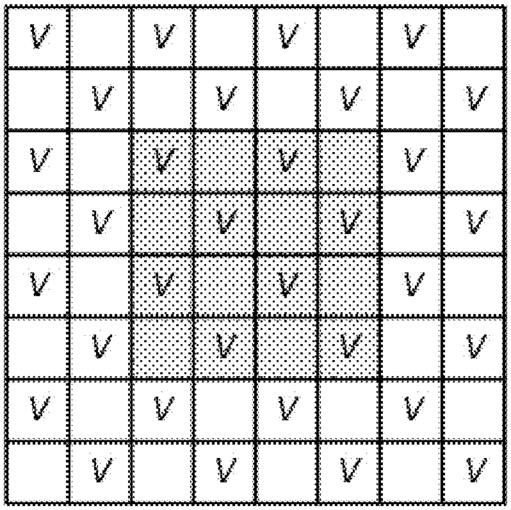
FIG. 7 shows a subsampled 1-D Laplacian calculation applied for gradient calculations in all the directions in accordance with some examples of the present disclosure.

To calculate D and Â, gradients of the horizontal, vertical and two diagonal directions are first calculated using 1-D Laplacian:

$$g_v = \sum_{k=i-2}^{i+3}\sum_{l=j-2}^{j+3} V_{k,l},\ V_{k,l} = |2R(k,l) - R(k,l-1) - R(k,l+1)| \tag{2}$$

$$g_h = \sum_{k=i-2}^{i+3}\sum_{l=j-2}^{j+3} H_{k,l},\ H_{k,l} = |2R(k,l) - R(k-1,l) - R(k+1,l)|$$

$$g_{d1} = \sum_{k=i-2}^{i+3}\sum_{l=j-3}^{j+3} D1_{k,l},\ D1_{k,l} = |2R(k,l) - R(k-1,l-1) - R(k+1,l+1)|$$

$$g_{d2} = \sum_{k=i-2}^{i+3}\sum_{j=j-2}^{j+3} D2_{k,l},\ D2_{k,l} = |2R(k,l) - R(k-1,l+1) - R(k+1,l-1)|$$

where indices i and j refer to the coordinates of the upper left sample within the 4×4 block and R(i, j) indicates a reconstructed sample at coordinate (i, j). To reduce the complexity of block classification, shown in FIG. 7, the subsampled 1-D Laplacian calculation is applied for the gradient calculations in all the directions.

Then, D maximum and minimum values of the gradients of horizontal and vertical directions are set as:

$$g_{h,v}^{max} = \max(g_h, g_v),\ g_{h,v}^{min} = \min(g_h, g_v)) \tag{3}$$

The maximum and minimum values of the gradient of two diagonal directions are set as:

$$g_{d0,d1}^{max} = \max(g_{d0}, g_{d1}),\ g_{d0,d1}^{min} = \min(g_{d0}, g_{d1})) \tag{4}$$

To derive the value of the directionality D, these values are compared against each other and with two thresholds $t_1$ and $t_2$:

Step 1. If both $$g_{h,v}^{max} \le t_1 \cdot g_{h,v}^{min} \text{ and } g_{d0,d1}^{max} \le t_1 \cdot g_{d0,d1}^{min}$$

are true, D is set to 0.

Step 2. If $$g_{h,v}^{max}/g_{h,v}^{min} > g_{d0,d1}^{max}/g_{d0,d1}^{min},$$

continue from Step 3; otherwise continue from Step 4.

Step 3. If $$g_{h,v}^{max} > t_2 \cdot g_{h,v}^{min},$$

D is set to 2; otherwise D is set to 1.

Step 4. If $$g_{d0,d1}^{max} > t_2 \cdot g_{d0,d1}^{min},$$

D is set to 4; otherwise D is set to 3.

The activity value A is calculated as:

$$A = \sum_{k=i-2}^{i+3} \sum_{l=j-2}^{j+3} (V_{k,l} + H_{k,l}) \tag{5}$$

A is further quantized to the range of 0 to 4, inclusively, and the quantized value is denoted as Â. For chroma components in a picture, no classification method is applied.

Geometric Transformations of Filter Coefficients and Clipping Values

Before filtering each 4×4 luma block, geometric transformations such as rotation or diagonal and vertical flipping are applied to the filter coefficients f(k, l) and to the corresponding filter clipping values c(k, l) depending on gradient values calculated for the block. This is equivalent to applying these transformations to the samples in the filter support region. The idea is to make different blocks to which ALF is applied more similar by aligning their directionality.

Three geometric transformations, including diagonal, vertical flip and rotation are provided:

$$\text{Diagonal: } f_D(k, l) = f(l, k),\ c_D(k, l) = c(l, k), \tag{6}$$

$$\text{Vertical flip: } f_V(k, l) = f(k, K-l-1),\ c_V(k, l) = c(k, K-l-1)$$

$$\text{Rotation: } f_R(k, l) = f(K-l-1, k),\ c_R(k, l) = c(K-l-1, k)$$

where K is the size of the filter and 0≤k, l≤K−1 are coefficients coordinates, such that location (0,0) is at the upper left corner and location (K−1, K−1) is at the lower right corner. The transformations are applied to the filter coefficients f(k, 1) and to the clipping values c(k, l) depending on gradient values calculated for that block. The relationship between the transformation and the four gradients of the four directions are summarized in the following Table 1.

TABLE 1

| Gradient values | Transformation |
|---|---|
| gd2 < gd1 and gh < gv | No transformation |
| gd2 < gd1 and gv < gh | Diagonal |
| gd1 < gd2 and gh < gv | Vertical flip |
| gd1 < gd2 and gv < gh | Rotation |

Filter Process

When ALF is enabled for a CTB, each sample R(i, j) within the CU is filtered, resulting in sample value R'(i, j) as shown below, $$R'(i, j) = R(i, j) + \left(\left(\sum_{k\neq 0}\sum_{l\neq 0} f(k, l) \times Clip3(R(i+k, j+l) - R(i, j), c(k, l)) + 64\right) \gg 7\right) \tag{7}$$

where f(k, l) denotes the decoded filter coefficients, K(x, y) is the clipping function and c(k, l) denotes the decoded clipping parameters. The variable k and l are between $$-\frac{L}{2} \text{ and } \frac{L}{2}$$

where L denotes the filter length. Clip3 (−y, y, x) is the clipping function which clips the input value of x to the range [−y, y]. The clipping operation introduces non-linearity to make ALF more efficient by reducing the impact of neighbor sample values that are too different with the current sample value.

Local Illumination Compensation

Figure 8:
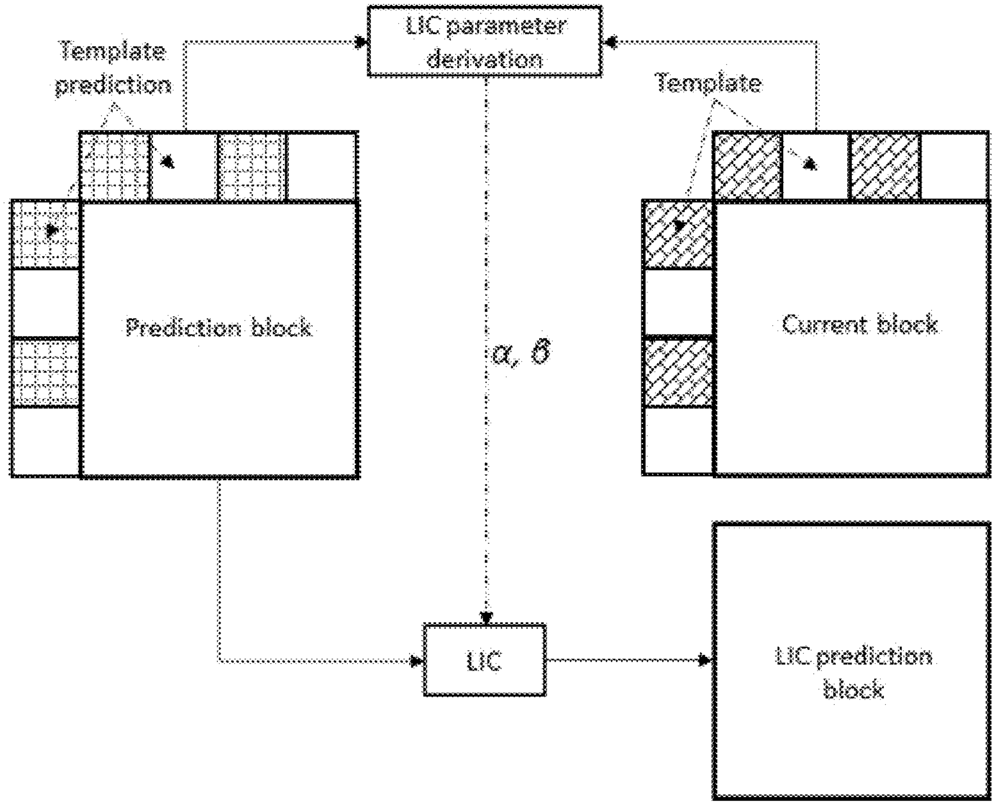
FIG. 8 is a diagram illustrating local illumination compensation (LIC) for uni-prediction in accordance with some examples of the present disclosure.

Local illumination compensation (LIC) is a coding tool which was studied during the VVC development, which targets at resolving the local illumination changes that exist temporal neighboring pictures. The LIC is based on a linear model where a scaling factor and an offset are derived for enhancing the prediction samples of a current block. Specifically, the LIC can be mathematically modeled by the following equation:

$$P(x, y) = \alpha \cdot P_r(x + v_x, y + v_y) + \beta \tag{8}$$

where P(x, y) is the prediction signal of the current block at the coordinate (x, y); $P_r(x+v_x, y+v_y)$ is the prediction block generated based on the motion vector $(v_x, v_y)$; α and β are the corresponding scaling factor and offset. FIG. 8 illustrates the LIC process. As shown in FIG. 8, when the LIC is applied for a video block, one linear model (i.e., scaling factor α and the offset B) are derived by minimizing the difference between the neighboring samples of the current block (i.e., the template in FIG. 8) and their corresponding prediction samples (i.e, the template prediction in FIG. 8).

Figure 9A:
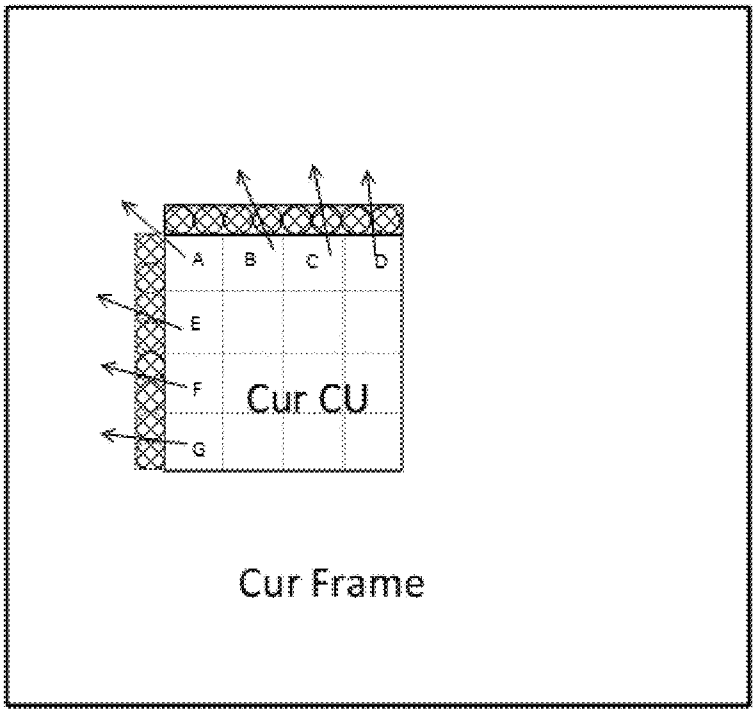
FIGS. 9A and 9B are diagrams illustrating the generation of the LIC template prediction samples for affine mode in accordance with some examples of the present disclosure.
Figure 9B:
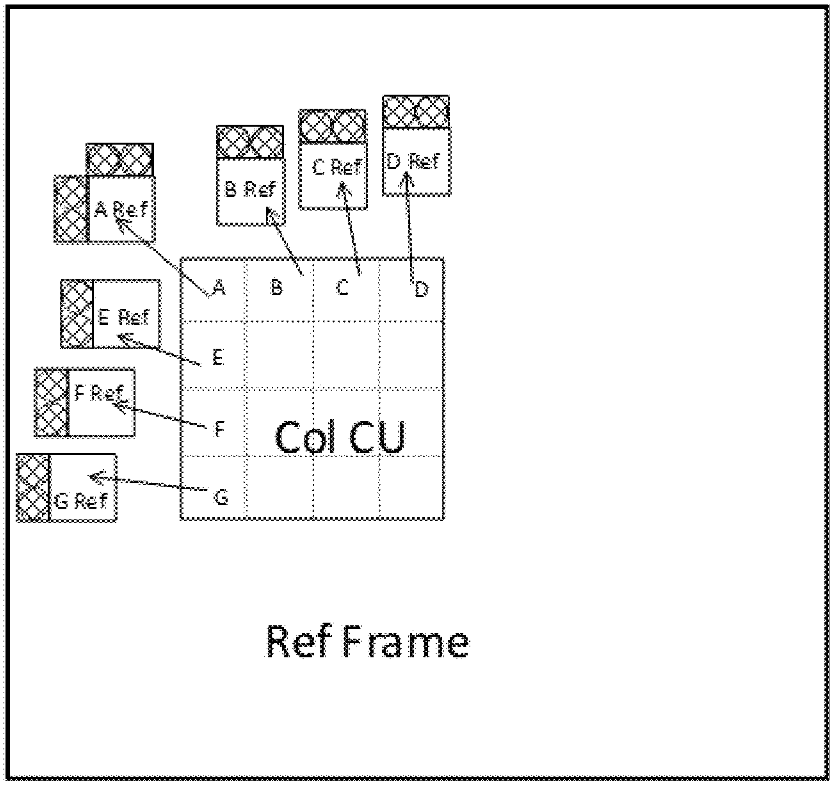

Because the scaling factor and the offset are derived based on the current block and template and its corresponding prediction signal, no signaling overhead of the LIC parameters is required. Additionally, one LIC flag is signaled for one no-merge inter block to indicate whether the LIC mode is enabled for the block or not. For merge inter blocks, the LIC flag is treated as a part of motion information. Specifically, when merge list is built up, the LIC flag is inherited from that of its corresponding neighboring block besides the MVs and the reference indices. Meanwhile, the LIC mode is also applied to affine inter blocks. When the affine mode is applied, one inter block is divided into multiple subblocks and one specific MV is derived for each subblock based on the affine model. Given such design, when the LIC is applied to one affine block, the corresponding LIC parameters are derived based on the motion information of the subblocks on the top and left boundaries of the block; then, the derived LIC model is applied to the prediction samples of the whole block, as shown in FIG. 9. Due to the fact that the MVs of each boundary subblock may be different, the prediction signal of the template is also generated on the subblock basis and the prediction samples of each template subblock are generated by using the MV of the corresponding subblock on the boundary of the coding block.

At last, it is mentioned that in the current LIC design, the LIC is only applicable to the uni-predicted inter blocks.

Bi-Prediction with CU-Level Weight

In HEVC, the bi-prediction signal is generated by averaging two prediction signals obtained from two different reference pictures and/or using two different motion vectors. In the VVC, the bi-prediction mode is extended beyond simple averaging to allow weighted averaging of the two prediction signals, i.e., $$P_{bi-pred} = ((8 - w) * P_0 + w * P_1 + 4) \gg 3 \tag{9}$$

Five weights are allowed in the weighted averaging bi-prediction, $w \in \{-2, 3, 4, 5, 10\}$. For each bi-predicted CU, the weight w is determined in one of two ways: 1) for a non-merge CU, the weight index is signaled; 2) for a merge CU, the weight index is inherited from one of neighboring blocks based on the merge candidate index. Additionally, in the VVC, for low-delay pictures (i.e., all the reference pictures are prior to the current picture in display order), all 5 weights are used. Otherwise, for non-low-delay pictures (there is at least one reference which is after the current picture in display order), only 3 weights ($w \in \{3, 4, 5\}$) are used.

The main focus of this disclosure is to further enhance the inter coding efficiency by applying adaptive enhancement filters on the motion compensated prediction signals of bi-predicted blocks. In the following, some related coding tools that are applied in the transform and entropy coding process in the ECM are briefly reviewed. After that, some deficiencies in the existing design of motion compensation are discussed. Finally, the solutions are provided to improve the existing design.

Overlapped Block Motion Compensation

Figure 15:
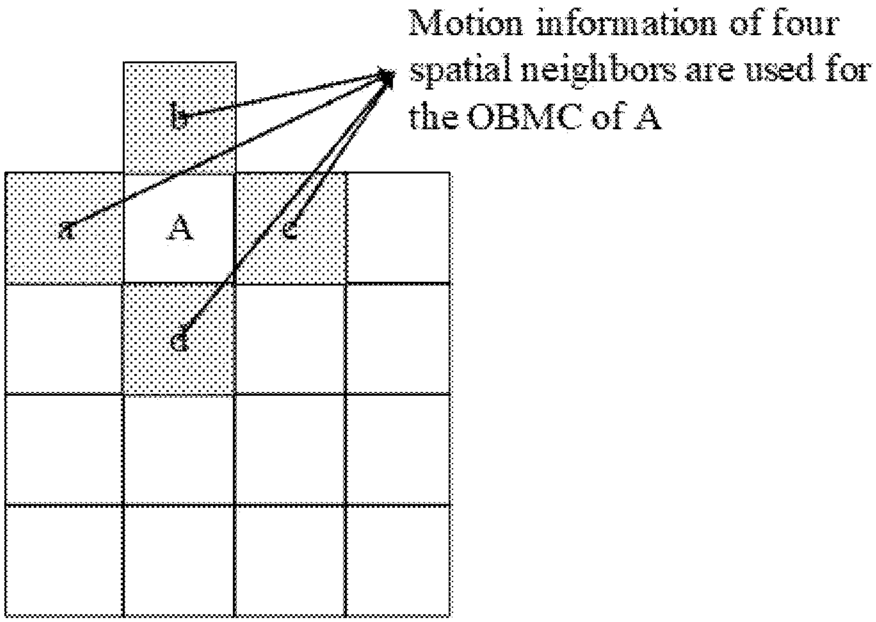
FIG. 15 is a diagram illustrating of the OBMC process for the CUs that are coded by sub-block modes in accordance with some examples of the present disclosure.

The OBMC is a coding technique to remove the blocking artifact at the MC stage. The basic idea of the OBMC is to use the MVs from the neighbor blocks to perform the motion compensation on the current block and combine the multiple prediction signals using the neighboring MVs to generate the final prediction signal of the CU. For each inter CU, the OBMC is performed for the top and left boundaries of the block. Additionally, when one video block is coded in one sub-block mode (e.g., affine, ATMVP or DMVR), the OBMC is also performed on all the inner boundaries (i.e., top, left, bottom, and right boundaries) of each sub-block. FIG. 15 illustrates the OBMC process that is applied to the CUS without sub-block-level motion compensation. When the OBMC is applied to one sub-block (e.g., the sub-block A in FIG. 15), in addition to the left and top neighbors of one sub-block, the MVs of the neighboring sub-blocks that are to the right and bottom of the current sub-block are also used to derive the prediction signals; then, the four prediction blocks are averaged to generate the final prediction signal of the current sub-block.

In the current ECM software, one template-based OBMC scheme is applied. Specifically, instead of using fixed weights for the combination of multiple motion-compensated hypotheses, the prediction value of CU boundary samples derivation approach is determined according to the template matching costs, including using current block's motion information only, or using neighboring block's motion information as well with one of the blending modes.

Figure 16:
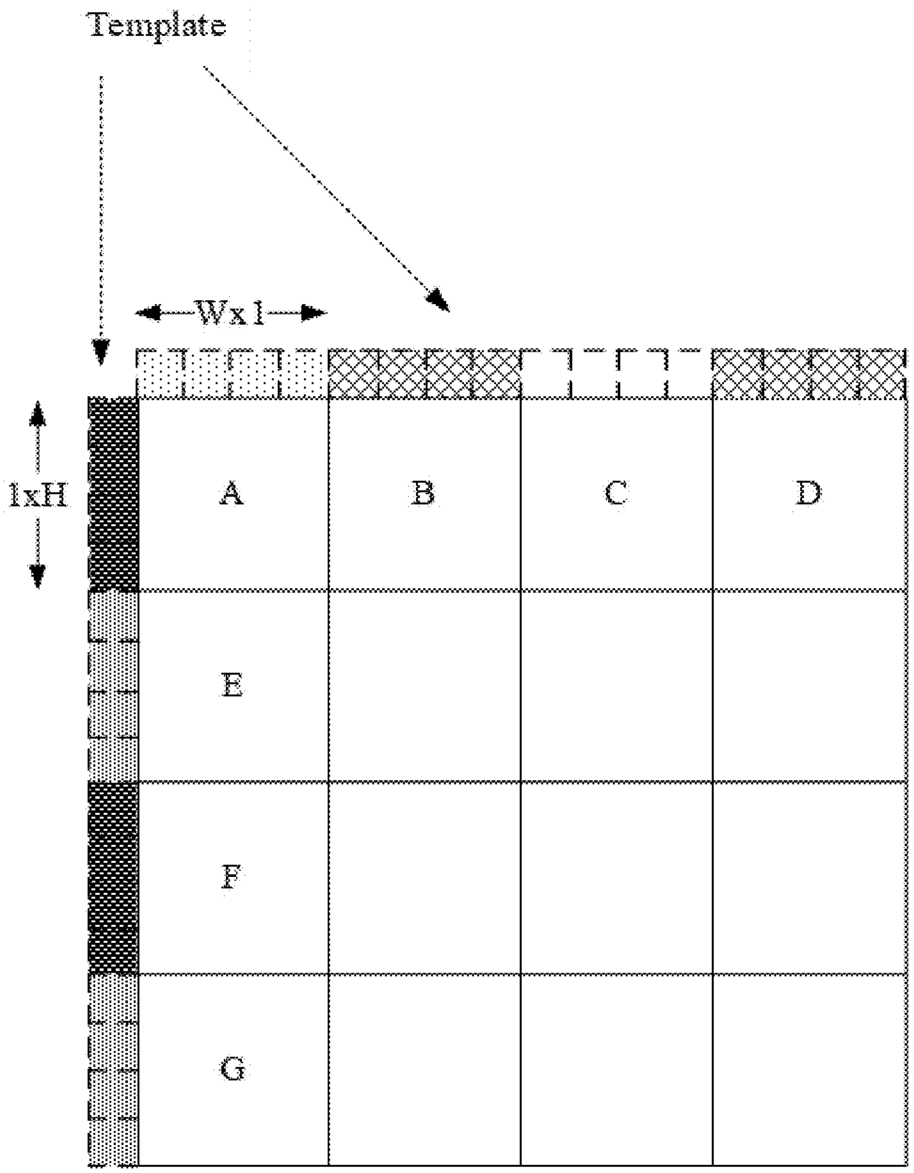
FIG. 16 is a diagram illustrating of the template-based OBMC in accordance with some examples of the present disclosure.

In this scheme for each block with a size of 4×4 at the top CU boundary, the above template size equals to 4×1. If N adjacent blocks have the same motion information, then the above template size is enlarged to 4 N×1 since the MC operation can be processed at one time. For each left block with a size of 4×4 at the left CU boundary, the left template size equals to 1×4 or 1×4 N (as shown in FIG. 16).

For each 4×4 top block (or N 4×4 blocks group), the prediction value of boundary samples is derived following the steps below.

Take block A as the current block and its above neighboring block AboveNeighbor_A for example. The operation for left blocks is conducted in the same manner.

First, three template matching costs (Cost1, Cost2, Cost3) are measured by SAD between the reconstructed samples of a template and its corresponding reference samples derived by MC process according to the following three types of motion information:

Cost1 is calculated according to A's motion information.

Cost2 is calculated according to AboveNeighbor_A's motion information.

Cost3 is calculated according to weighted prediction of A's and AboveNeighbor_A's motion information with weighting factors as 3/4 and 1/4 respectively.

Second, choose one approach to calculate the final prediction results of boundary samples by comparing Cost1, Cost2, and Cost 3.

The original MC result using current block's motion information is denoted as Pixel1, and the MC result using neighboring block's motion information is denoted as Pixel2. The final prediction result is denoted as NewPixel.

If Cost1 is minimum, then NewPixel(i, j)=Pixel1(i, j).

If (Cost2+ (Cost2>>2)+ (Cost2>>3))<=Cost1, then blending mode 1 is used.

For luma blocks, the number of blending pixel rows is 4.

$$NewPixel(i, 0) = (26 \times Pixel1(i, 0) + 6 \times Pixel2(i, 0) + 16) \gg 5$$

$$NewPixel(i, 1) = (7 \times Pixel1(i, 1) + Pixel2(i, 1) + 4) \gg 3$$

$$NewPixel(i, 2) = (15 \times Pixel1(i, 2) + Pixel2(i, 2) + 8) \gg 4$$

$$NewPixel(i, 3) = (31 \times Pixel1(i, 3) + Pixel2(i, 3) + 16) \gg 5$$

For chroma blocks, the number of blending pixel rows is 1.

$$NewPixel(i, 0) = (26 \times Pixel1(i, 0) + 6 \times Pixel2(i, 0) + 16) \gg 5$$

If Cost1<=Cost2, then blending mode 2 is used.

For luma blocks, the number of blending pixel rows is 2.

$$NewPixel(i, 0) = (15 \times Pixel1(i, 0) + Pixel2(i, 0) + 8) \gg 4$$

$$NewPixel(i, 1) = (31 \times Pixel1(i, 1) + Pixel2(i, 1) + 16) \gg 5$$

For chroma blocks, the number of blending pixel rows/columns is 1.

$$NewPixel(i, 0) = (15 \times \mathrm{Pixel1}(i, 0) + \mathrm{Pixel2}(i, 0) + 8) \gg 4$$

Otherwise, blending mode 3 is used.

For luma blocks, the number of blending pixel rows is 4.

$$NewPixel(i, 1) = (7 \times Pixel1(i, 1) + Pixel2(i, 1) + 4) \gg 3$$

$$NewPixel(i, 2) = (15 \times Pixel1(i, 2) + Pixel2(i, 2) + 8) \gg 4$$

$$NewPixel(i, 3) = (31 \times Pixel1(i, 3) + Pixel2(i, 3) + 16) \gg 5$$

For chroma blocks, the number of blending pixel rows is 1.

$$NewPixel(i, 0) = (7 \times Pixel1(i, 0) + Pixel2(i, 0) + 4) \gg 3$$

The MCP plays the key role to ensure the efficiency of inter coding in all the existing video coding standards. With the MCP, the video signal to be coded is predicted from temporally neighboring signal and only the prediction error, the MVs and the reference picture indices are transmitted. As analyzed before, the ALF can effectively increase the quality of reconstructed video, thus improving the performance of inter coding by providing high-quality reference pictures. The LIC can be considered as one enhancement of the regular motion-compensated prediction. Though both two tools can enhance the inter coding efficiency, the quality of temporal prediction still may not be good enough, due to the following reasons Video signal may be coded with coarse quantization, i.e., high quantization parameter (QP) values. When coarse quantization is applied, the reconstructed picture may contain severe coding artifacts such as blocking artifacts, ringing artifacts, etc. Given that the reconstructed signal of the current picture will be used as reference for temporal prediction, such distortion could reduce the effective of MCP and therefore inter coding efficiency for subsequent pictures.

Though the LIC can efficiently compensate the illumination changes between different pictures, it can only be applied to uni-predicted blocks. It is well known that the combination of multiple prediction blocks can efficiently suppress the coding noise (which is caused by the quantization/dequantization process) that exists in motion compensated signals. Therefore, bi-prediction is generally more compression efficient than uni-prediction, i.e., there are more bi-predicted blocks than uni-predicted blocks. This means that the unidirectional LIC cannot fully exploit the coding gain that the LIC tool can potentially achieve.

According to the existing OBMC design in ECM, the OBMC is always disabled for the inter CUs that are coded with the LIC. Such design is suboptimal in terms of the coding efficiency given that there are also blocking artifacts that exists in-between inter blocks that are coded with and without the LIC being applied. Furthermore, even for the case where the LIC is applied to both of two neighboring blocks, there could be potentially blocking artifacts along the block boundaries of two blocks because the LIC parameters that are applied to the two blocks could be different.

In this disclosure, methods and devices are proposed to improve the efficiency of motion compensation and therefore enhance the quality of temporal prediction. Specifically, it is proposed to apply adaptive filtering at the prediction samples of bi-predicted blocks. To reduce the signaling overhead, the filter coefficients are derived from the neighboring reconstructed samples (i.e., template) of the current block and its corresponding prediction samples. By such way, the energy of prediction residuals is alleviated, thus reducing the overhead of residual signaling.

Figure 10:
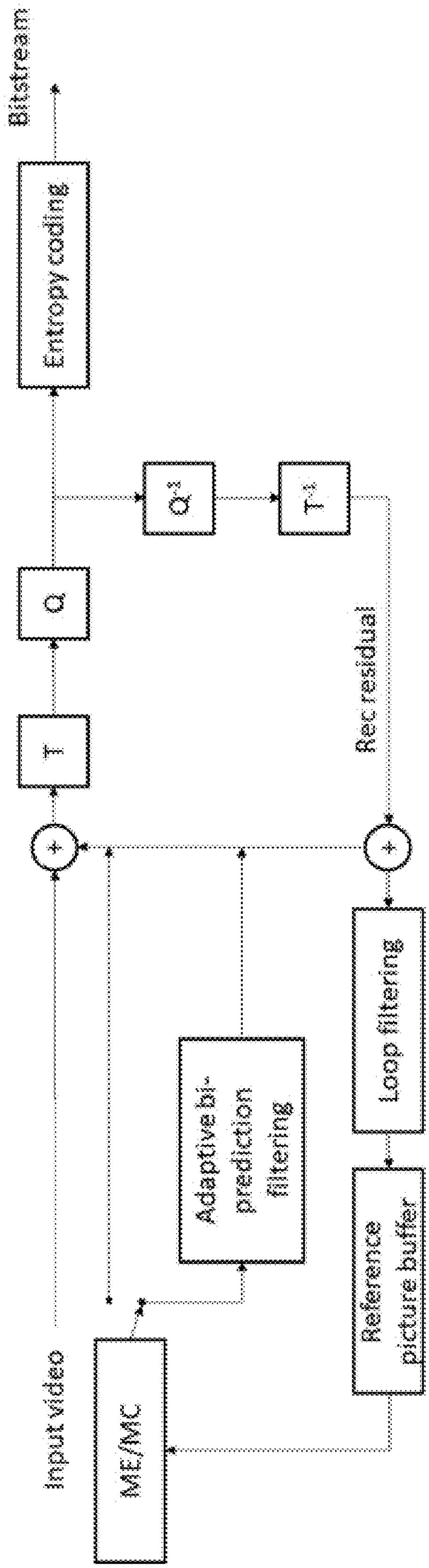
FIG. 10 is a block diagram of video encoding with the adaptive filtering for bi-prediction in accordance with some examples of the present disclosure.

FIG. 10 gives the block diagram of the video encoder when the proposed adaptive bi-prediction filtering is applied. Firstly, similar to the conventional video encoder, the motion estimation and compensation module generates the motion compensated signals by matching the current block to one block (uni-prediction) or two blocks (bi-prediction) in the reference pictures using the optimal MVs. Then, for bi-predicted blocks, the motion compensated samples (both luma and chroma) are provided to the proposed adaptive filters to generate the filtered motion compensated prediction samples of the current block. After that, the original signal is subtracted from the prediction signal to remove temporal redundancy and produce the corresponding residual signal. The transform and quantization are applied to the residual signal which are then entropy-coded and output to bit-stream. To obtain the reconstructed signal, the residual signal is reconstructed by inverse quantization and inverse transform. Then, the reconstructed residual is added to the motion compensated prediction. Further, in-loop filtering processes, e.g., de-blocking, ALF and SAO, are applied to the reconstructed video signal for output. As will be discussed later, the filter coefficients of the proposed adaptive bi-prediction filter are directly derived from the neighboring reconstructed luma and chroma samples at decoder. Additionally, in order to maximize the coding gain of the proposed method, additional syntax may be signaled at a given block level (e.g., CTU, CU, or PU level) to indicate whether the proposed filtering is applied to the current block for motion compensation or not.

Figure 11:
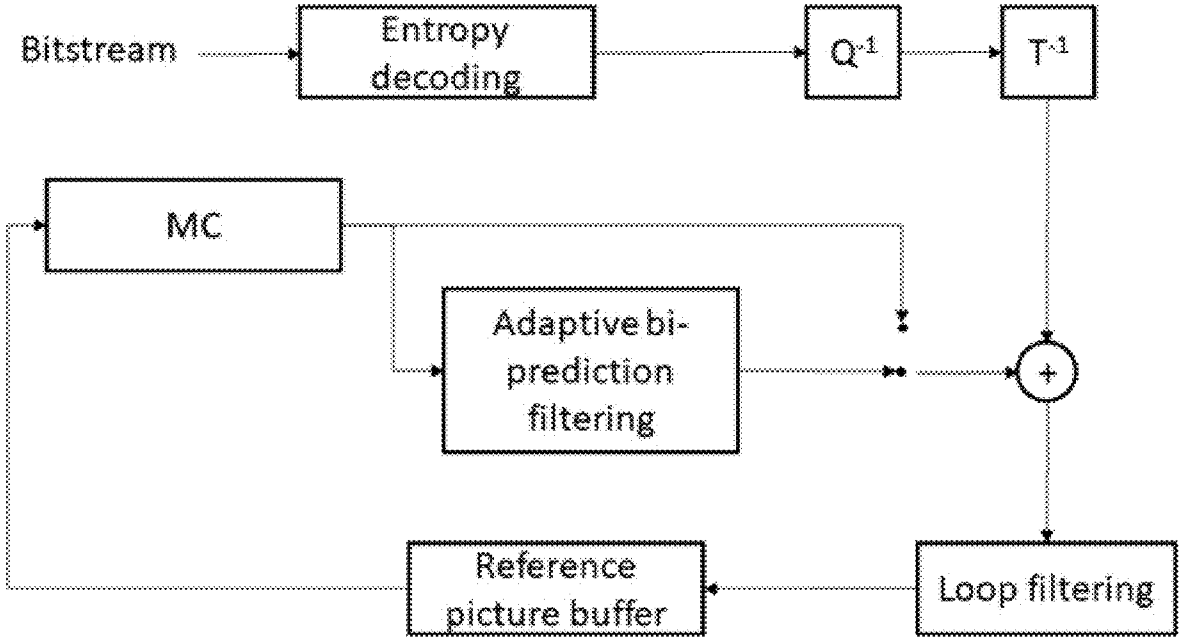
FIG. 11 is a block diagram of video decoding with the adaptive filtering for bi-prediction in accordance with some examples of the present disclosure.

FIG. 11 shows a block diagram of the proposed decoder that receives the bit-stream produced by the encoder in FIG. 10. At the decoder, the bit-stream is first parsed by the entropy decoder. The residual coefficients are then inverse quantized and inverse transformed to obtain the reconstructed residual. For temporal prediction, prediction signal is firstly generated by obtaining the motion compensated block using the signaled prediction information (i.e., MV and reference index). Then, for bi-predicted blocks, it is parsed from the bitstream to determine whether the adaptive filtering is enabled for the block or not. If the adaptive filtering is enabled, the motion compensated luma and chroma signals are further processed by the proposed adaptive filtering; otherwise, the motion compensated chroma signal is not filtered. Then, the motion compensated signal (either filtered or un-filtered) and the reconstructed residual are added together to get the reconstructed video. The reconstructed video may additionally go through loop filtering before being stored in the reference picture store to be displayed and/or to be used to decode future video signal.

Adaptive Bi-Prediction Filtering Based on Template Bi-Prediction Samples

Figure 12:
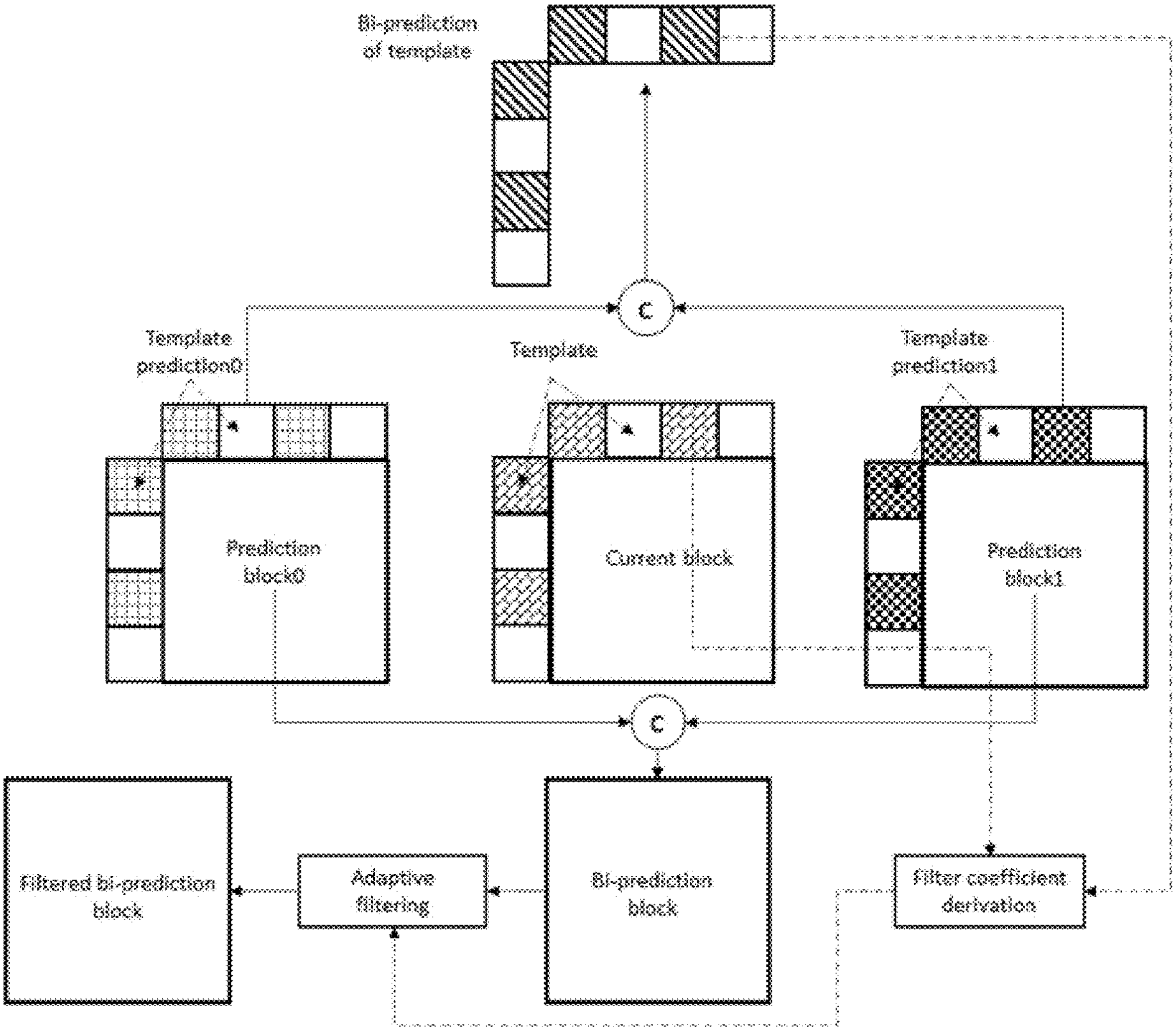
FIG. 12 is a diagram illustrating the adaptive motion compensated filtering based on the bi-prediction samples of template in accordance with some examples of the present disclosure.

In this section, one adaptive filtering scheme is proposed for bi-prediction where the filter coefficients are derived based on the bi-prediction samples of the template for one bi-predicted block. Specifically, in the proposed scheme, the bi-prediction samples of the template samples are firstly generated according to the motion vectors of the current block; then, least square mean error (LMSE) algorithm is applied to derive the filter parameters by minimizing the difference between the template prediction samples and the template samples. FIG. 12 illustrates the proposed adaptive filtering method based on the bi-prediction samples of the template. As illustrated in FIG. 12, T indicates the template of the current bi-predicted block; $T_0$ and $T_1$ are the L0 and L1 prediction samples of the template, which are generated by using the bi-directional motion vectors $$(v_x^0, v_y^0)$$

and $$(v_x^1, v_y^1)$$

of the current block. Based on the notations, in the proposed scheme, the bi-prediction prediction samples of the template are firstly generated by averaging two uni-directional predictions of the template in L0 and L1, i.e., $$T_{bi} = w_0 * T_0 + w_1 * T_1 \tag{10}$$

where $w_0$ and $w_1$ are the weights applied to the L0 and L1 directions when generating the bi-prediction samples of the current block, which are equal to 0.5 if the BCW is not applied and may be equal to −0.125, 0.375, 0.625 and 1.125 when the BCW is applied. Based on the resulting bi-prediction samples of the template, the LMSE derivation is used to calculate the values of the coefficients of the adaptive filter by minimizing the difference between the template samples and their bi-prediction samples, i.e., $$f^* = \operatorname{argmin} \sum_x \sum_y |T(x, y) - T_{bi}(x, y)|^2 = \operatorname{argmin} \sum_x \sum_y \left[ \left( \sum_{i=-\frac{(H-1)}{2}}^{\frac{(H-1)}{2}} \sum_{j=-\frac{(L-1)}{2}}^{\frac{(L-1)}{2}} (f(i, j) \times T_{bi}(x-i, y-j)) - T(x, y) \right) \right]^2 \tag{11}$$

where f* indicates the coefficients of the filter that is applied to the corresponding H×L neighboring region of one template prediction sample $T_{bi}(x, y)$, where $$-\frac{H-1}{2} \le i \le \frac{H-1}{2}, \quad -\frac{L-1}{2} \le j \le \frac{L-1}{2}.$$

In practice, various filters with different sizes and shapes may be applied which can provide different trade-offs between coding performance and complexity. A larger filter can make the template prediction samples better approach to the template samples but at the expense of increased computational complexity. Finally, the derived filter coefficients are applied to modify the original bi-prediction signal of the current block as $$P'_{bi}(x, y) = \sum_{i=-\frac{(H-1)}{2}}^{\frac{(H-1)}{2}} \sum_{j=-\frac{(L-1)}{2}}^{\frac{(L-1)}{2}} f(i, j) \times P_{bi}(x-i, y-j) \tag{12}$$

where $P_{bi}(x, y)$ and $P'_{bi}(x, y)$ are the bi-prediction samples before and after the proposed adaptive filtering is applied. Additionally, to further improve the coding gain, one offset and certain non-linear terms may be introduced when deriving the filter coefficients in the proposed method, which can further reduce the distortion between the template samples and its prediction samples. Specifically, with such modification, the filter coefficient derivation in (11) becomes $$f^* = \operatorname{argmin} \sum_x \sum_y |T(x, y) - T_{bi}(x, y)|^2 = \operatorname{argmin} \sum_x \sum_y \left[ \left( \sum_{i=-\frac{(H-1)}{2}}^{\frac{(H-1)}{2}} \sum_{j=-\frac{(L-1)}{2}}^{\frac{(L-1)}{2}} f(i, j) \times T_{bi}(x-i, y-j) \right) + o + \sum_{k=2}^{K-1} nl^k \times T_{bi}(x, y)^k - T(x, y) \right]^2 \tag{13}$$

And, and the filter application in (12) is as $$P'(x, y) = \sum_{i=-\frac{(H-1)}{2}}^{\frac{(H-1)}{2}} \sum_{j=-\frac{(L-1)}{2}}^{\frac{(L-1)}{2}} f(i, j) \times P(x-i, y-j) + o + \sum_{k=2}^{K-1} nl^k \times T_{bi}(x, y)^k \tag{14}$$

where o is the offset and $nl^k$'s are the non-linear terms which is represented as the summation of a series of powers (i.e., k=2, . . . , K−1) of one template prediction sample $T_{bi}(2x, 2y)$.

In one or more examples, it is proposed to use the linear model (i.e., scaling factor and offset) to derive one two-tap filter to enhance the prediction samples of one bi-predicted block. Specifically, one bi-predictive LIC is proposed which is operated as follows: 1) generating the bi-prediction prediction samples of the template as shown in (10); 2) deriving the scaling factor and the offset using the template samples and their corresponding bi-prediction samples as $$\alpha = \frac{N \cdot \sum_{i=1}^{N} (T(x_i, y_i) \cdot T_{bi}(x_i, y_i)) - \sum_{i=1}^{N} T(x_i, y_i) \cdot \sum_{i=1}^{N} T_{bi}(x_i, y_i)}{N \cdot \sum_{i=1}^{N} (T(x_i, y_i) \cdot T_{bi}(x_i, y_i)) - (\sum_{i=1}^{N} T_{bi}(x_i, y_i))^2} \tag{15}$$

-continued $$\beta = \frac{\sum_{i=1}^{N} T(x_i, y_i) - \alpha \cdot \sum_{i=1}^{N} T_{bi}(x_i, y_i)}{N}$$

where α and β are the scaling factor and the offset of the LIC linear model; N is the number of template samples involved in the derivation. After that, the final bi-prediction of the current block is generated as $$P'_{bi}(x, y) = \alpha \cdot P_{bi}(x, y) + \beta \tag{16}$$

Adaptive Bi-Prediction Filtering Based on Template Uni-Directional Samples

Figure 13:
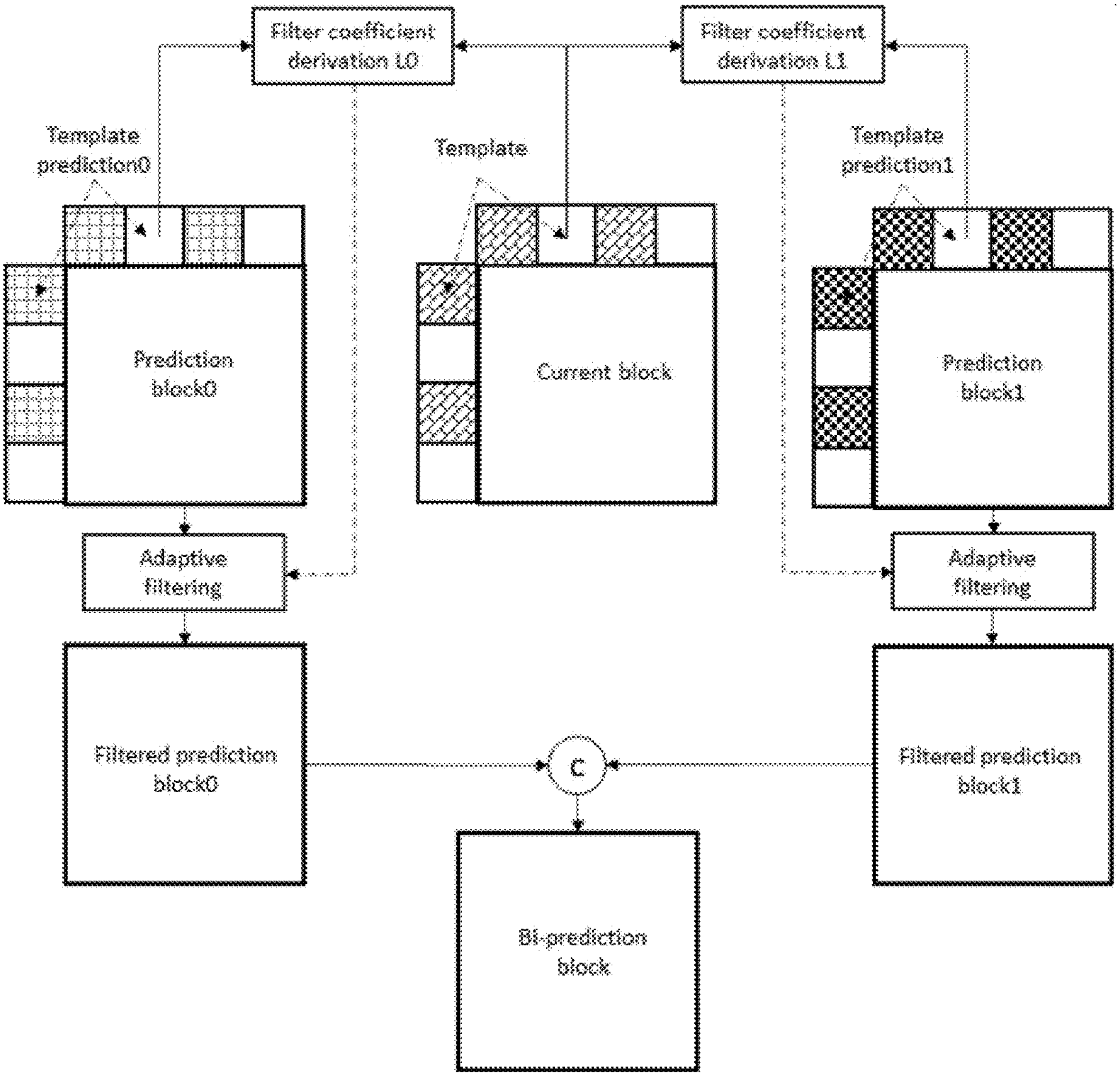
FIG. 13 is a diagram illustrating the adaptive motion compensated filtering based on the uni-prediction samples of template in accordance with some examples of the present disclosure.
Figure 14:
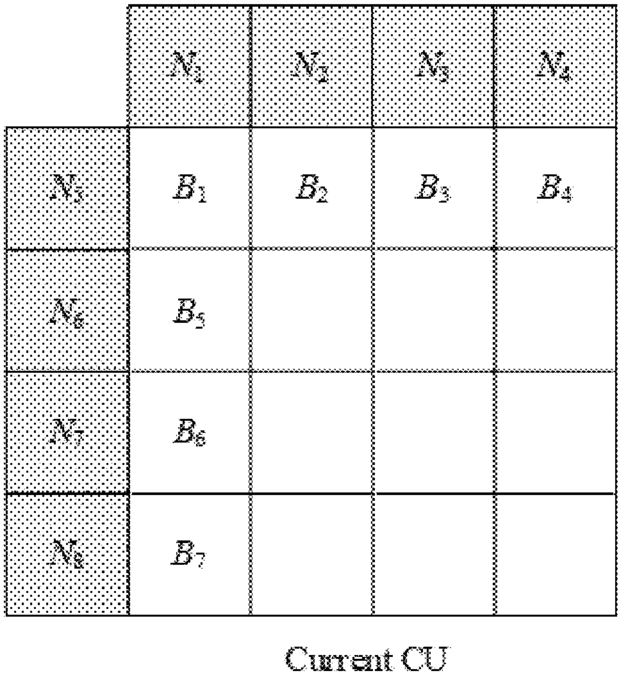
FIG. 14 is a diagram illustrating of the OBMC process for the CUs that are coded without sub-block motion compensation in accordance with some examples of the present disclosure.

In this section, one adaptive bi-prediction filtering scheme is proposed using the uni-prediction samples of the template for one bi-predicted block. For example, in this method, two adaptive filter operations are applied to the prediction samples of the template in one unilateral manner: two sets of filter coefficients are separately derived and applied to prediction samples in L0 and L1; then, the weighted average of the two filtered uni-prediction samples is formed as the final prediction samples of the current block. FIG. 13 illustrates the proposed scheme. As shown in FIG. 13, based on the L0 and L1 MVs, two uni-predictions $T_0$ and $T_1$ of the template are generated. Then, based on the separate minimization of the distortions between $T_0$ and T, and $T_1$ and T, two sets of filter parameters $f_0$ and $f_1$ can be derived for L0 and L1 directions separately, as described as:

$$f_{0/1}^* = \operatorname{argmin} \sum_x \sum_y \left| T(x, y) - T_{uni}^{0/1}(x, y) \right|^2 = \operatorname{argmin} \sum_x \sum_y \left[ \left( \sum_{i=-\frac{(H-1)}{2}}^{\frac{(H-1)}{2}} \sum_{j=-\frac{(L-1)}{2}}^{\frac{(L-1)}{2}} f_{0/1}(i, j) \times T_{uni}^{0/1}(x-i, y-j) \right) - T(x, y) \right]^2 \tag{17}$$

where N represents the number of template samples that are involved; T is the template sample of the current block;

$$T_{uni}^{0/1}$$

represents the uni-predictions of the template sample based on the MV (either L0 or L1) of the current block. After that, the two filters are applied to two uni-predictions of the current block separately, which are then combined to generate the final bi-prediction of the current blocks as $$P'_{bi}(x, y) = w_0 * P'_0(x, y) + w_1 * P'_1(x, y) \tag{18}$$

where $$P'_0(x, y) = \sum_{i=-\frac{(H-1)}{2}}^{\frac{(H-1)}{2}} \sum_{j=-\frac{(L-1)}{2}}^{\frac{(L-1)}{2}} f_0(i, j) \times P_0(x-i, y-j) \tag{19}$$

$$P'_1(x, y) = \sum_{i=-\frac{(H-1)}{2}}^{\frac{(H-1)}{2}} \sum_{j=-\frac{(L-1)}{2}}^{\frac{(L-1)}{2}} f_1(i, j) \times P_1(x-i, y-j)$$

where $P_0(x, y)$ and $P_1(x, y)$ are the two uni-prediction samples of the current block before the proposed adaptive filtering is applied. Similar to (13) and (14), Additionally, to further improve the coding gain, offset and non-linear terms can be introduced when deriving the filter coefficients. With such modification, the filter coefficients are derived as $$f_{0/1}^* = \operatorname{argmin} \sum_x \sum_y \left| T(x, y) - T_{uni}^{0/1}(x, y) \right|^2 = \operatorname{argmin} \sum_x \sum_y \left[ \left( \sum_{i=-\frac{(H-1)}{2}}^{\frac{(H-1)}{2}} \sum_{j=-\frac{(L-1)}{2}}^{\frac{(L-1)}{2}} f_{0/1}(i, j) \times T_{uni}^{0/1}(x-i, y-j) \right) + o_{0/1} + \sum_{k=2}^{K-1} nl^k \times T_{uni}^{0/1}(x, y)^k - T(x, y) \right]^2 \tag{20}$$

And, and the filtered uni-prediction samples of the current block are calculated as $$P'_0(x, y) = \sum_{i=-\frac{(H-1)}{2}}^{\frac{(H-1)}{2}} \sum_{j=-\frac{(L-1)}{2}}^{\frac{(L-1)}{2}} f_0(i, j) \times P_0(x-i, y-j) + o_0 + \sum_{k=2}^{K-1} nl^k \times P_0(x, y)^k \tag{21}$$

$$P'_1(x, y) = \sum_{i=-\frac{(H-1)}{2}}^{\frac{(H-1)}{2}} \sum_{j=-\frac{(L-1)}{2}}^{\frac{(L-1)}{2}} f_1(i, j) \times P_1(x-i, y-j) + o_1 + \sum_{k=2}^{K-1} nl^k \times P_1(x, y)^k$$

In one or more examples, it is proposed to use the linear model (i.e., scaling factor and offset) to derive one two-tap filter to enhance the two uni-predictions of one bi-predicted block. Specifically, one bi-predictive LIC is proposed which is operated as follows: 1) generating the two uni-predictions of the template; 2) deriving the two sets of scaling factors and the offsets using the template samples and their corresponding uni-prediction samples as $$\alpha_{0/1} = \frac{N \cdot \sum_{i=1}^{N} (T(x_i, y_i) \cdot T_{0/1}(x_i, y_i)) - \sum_{i=1}^{N} T(x_i, y_i) \cdot \sum_{i=1}^{N} T_{0/1}(x_i, y_i)}{N \cdot \sum_{i=1}^{N} (T(x_i, y_i) \cdot T_{0/1}(x_i, y_i)) - \left( \sum_{i=1}^{N} T_{0/1}(x_i, y_i) \right)^2} \tag{22}$$

-continued $$\beta_{0/1} = \frac{\sum_{i=1}^{N} T(x_i, y_i) - \alpha \cdot \sum_{i=1}^{N} T_{0/1}(x_i, y_i)}{N}$$

where $\alpha_0$ and $\beta_0$ are the scaling factor and the offset of the LIC linear model for L0 uni-prediction, and $\alpha_1$ and $\beta_1$ are the scaling factor and the offset of the LIC linear model for L1 uni-prediction; N is the number of template samples involved in the derivation. After that, the final bi-prediction of the current block is generated as $$P'_{bi}(x, y) = w_0 * (\alpha_0 \cdot P_0(x, y) + \beta_0) + w_1 * (\alpha_1 \cdot P_0(x, y) + \beta_1) \quad (23)$$

where $w_0$ and $w_1$ are the BCW weight applied to the current block.

Adaptive Bi-Prediction Filtering Based Recursive Uni-Directional Filtering

In FIG. 13, because the filter coefficients that are applied to the two uni-prediction signals of the template are separately derived, the resulting bi-prediction signal of the template may not be optimal (i.e., the weighted combination of the two filtered uni-prediction signals) when considering the minimization of the distortion between the template samples and their corresponding prediction samples. To resolve such issue, one iterative scheme is proposed to derive the optimal filter coefficients applied to the two uni-prediction signals of the template for one bi-predicted block. The proposed scheme is conducted in one iterative manner which alternatively optimize the prediction filter for one prediction direction while keeping the one in the other prediction direction fixed. Specifically, the derivation procedure of the two uni-prediction filter coefficients is summarized as follows:

Step 1: Given the starting prediction direction $L^{(0)}$, derive the initial filter coefficients $$f_{L^{(0)}}^{(0)}$$

for the starting prediction direction by minimizing the distortion between its uni-prediction $T_{L^{(0)}}$ and the template T, i.e., $$f_{L^{(0)}}^{(0)} = \operatorname{argmin} \sum_x \sum_y \left| T(x, y) - T_{L^{(0)}}(x, y) \right|^2 = \operatorname{argmin} \sum_x \sum_y \left[ \left( \sum_{i=-\frac{(H-1)}{2}}^{\frac{(H-1)}{2}} \sum_{j=-\frac{(L-1)}{2}}^{\frac{(L-1)}{2}} f_{L^{(0)}}^{(0)}(i, j) \times T_{L^{(0)}}(x - i, y - j) \right) - T(x, y) \right]^2 \quad (24)$$

Step 2: Based on the filter coefficients $$f_{L^{(0)}}^{(0)},$$

calculate the filtered uni-prediction $$T_{L^{(0)}}^{(0)}$$

And set k=1.

$$T_{L^{(0)}}^{(0)} = \sum_{i=-\frac{(H-1)}{2}}^{\frac{(H-1)}{2}} \sum_{j=-\frac{(L-1)}{2}}^{\frac{(L-1)}{2}} f_{L^{(0)}}^{(0)}(i, j) \times T_{L^{(0)}}(x - i, y - j) \quad (25)$$

Step 3: Select the target prediction direction $L^{(k)}=1-L(k-1)$ and calculate the target template samples of the current block as $$T^{(k)} = \frac{T - w_{L^{(k-1)}} * T_{L^{(k-1)}}^{(k-1)}}{w_{L^{(k)}}} \quad (26)$$

Step 4: Derive the filter coefficients $$f_{L^{(k)}}^{(k)}$$

for the starting prediction direction $L^{(k)}$ by minimizing the distortion between its uni-prediction $T_{L^{(k)}}$ and the template T (k), i.e., $$f_{L^{(k)}}^{(k)} = \operatorname{argmin} \sum_x \sum_y \left| T^{(k)}(x, y) - T_{L(k)}(x, y) \right|^2 = \operatorname{argmin} \sum_x \sum_y \left[ \left( \sum_{i=-\frac{(H-1)}{2}}^{\frac{(H-1)}{2}} \sum_{j=-\frac{(L-1)}{2}}^{\frac{(L-1)}{2}} f_{L^{(k)}}^{(k)}(i, j) \times T_{L(k)}(x - i, y - j) \right) - T^{(k)}(x, y) \right]^2 \quad (27)$$

Step 5: Based on the filter coefficients $$f_{L^{(k)}}^{(k)},$$

calculate the filtered uni-prediction $$T_{L^{(k)}}^{(k)}$$

as $$T_{L^{(k)}}^{(k)} = \sum_{i=-\frac{(H-1)}{2}}^{\frac{(H-1)}{2}} \sum_{j=-\frac{(L-1)}{2}}^{\frac{(L-1)}{2}} f_{L^{(k)}}^{(k)}(i, j) \times T_{L^{(k)}}(x - i, y - j) \quad (28)$$

Step 6: Set k=k+1 and go to Step 3.

The resulting filters are used as the corresponding filters that are applied to two uni-predictions of the current block and the filtered prediction samples are then combined to generate the final bi-prediction of the current blocks as shown in (18) and (19). Similarly, the offset and non-linear items as shown in (20) and (21) can also be applied in the proposed iterative bi-prediction filter derivation scheme. Additionally, in one or more examples, it is proposed to use the linear model (i.e., scaling factor and offset) to derive one two-tap filter by the proposed iterative filter derivation scheme: 1) generating the two uni-predictions of the template; 2) deriving the two sets of scaling factors and the offsets based on the iterative algorithm as shown from Step 1 to Step 6; 3) calculating the final bi-prediction samples of the current block as shown in (23).

In practice, different number of iterations may be applied to the above iterative filter derivation scheme. In general, more iterations will lead to smaller distortion between the template and its prediction signal (i.e., better coding gain) which however comes at the expense of more computational complexity. In the following, different methods are proposed to decide the number of iterations that is applied in the proposed algorithm. In one method, it is proposed to use one fixed number of iterations (i.e., 3) at both encoder and decoder. In the second method, it is proposed to give the encoder the freedom to select the specific number of iterations and signal the corresponding value to decoder. When such method is applied, new syntax element(s) may be added in sequence parameter set (SPS), picture parameter set (PPS), picture header, slice header, or even coding block level to indicate the value of the applied iterations. In the third method, it is proposed to adaptively determine the value of iterations that is applied to one block according to its statistics. e.g., sample variation, motion vector difference and extra. In one or more examples, it is proposed to use the difference between the original L0 and L1 prediction samples of one bi-predicted block as the criterion to select the number of iterations that is applied. For instance, when the difference (i.e., sum absolute difference (SAD), sum squared difference (SSD) and other matrices) between the two prediction samples is larger than one threshold, larger number of iterations is applied to the block; otherwise (i.e. the difference is smaller than the threshold), smaller number of iterations is applied.

At the last but not the least, different initial prediction direction can be applied in the proposed scheme. In one method, it is proposed to always use L0 as the initial prediction direction in the proposed method. In another method, it is proposed to use L1 as the initial prediction direction. In the third method, it is proposed to select the initial prediction direction based on the slice type, prediction structure and QP of the slice that the current block belongs to. For example, it can use L0 as the initial prediction direction for non-low-delay pictures and use L1 as the initial prediction direction for low delay pictures.

Adaptive Motion Compensated Filtering Based on Non-Adjacent Spatial Neighbors

Figure 17A:
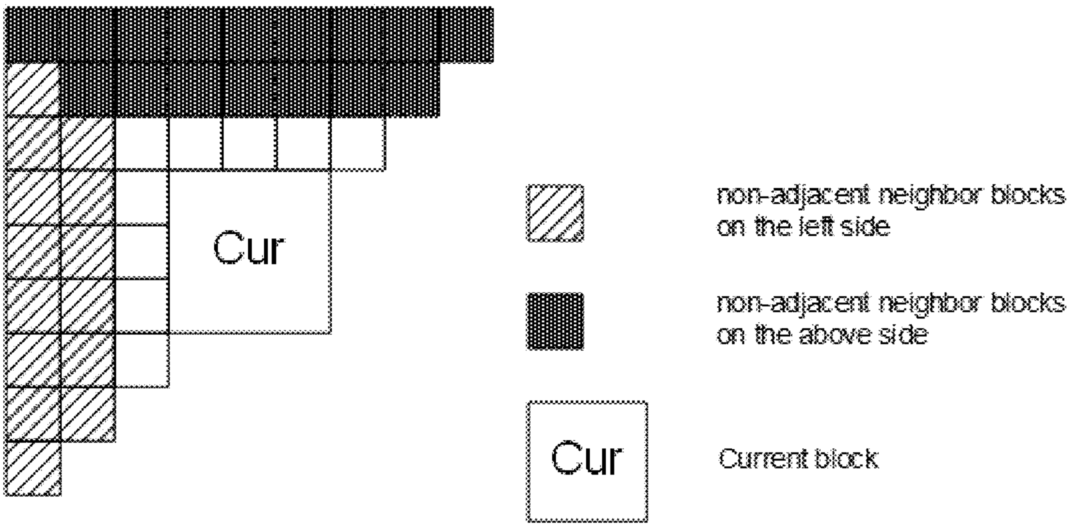
FIGS. 17A and 17B are diagrams illustrating of different sizes of non-adjacent neighbor blocks in accordance with some examples of the present disclosure.
Figure 17B:
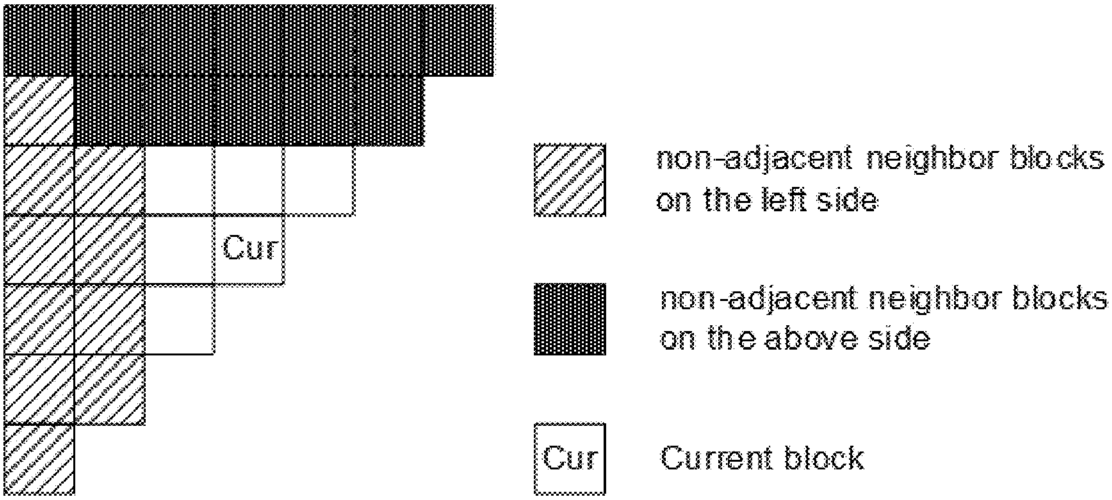

In some embodiments, the blocks around the current block are defined as neighboring blocks to the current block. As shown in FIGS. 17A and 17B, those blank neighboring blocks without shading are adjacent neighboring blocks, and those neighboring blocks having shading are non-adjacent neighboring blocks. In the above methods, the coefficients of the proposed motion compensated filters are always derived from the reconstructed samples that are adjacent to the current coding block (i.e., direct top and left neighbors). Such scheme could be efficient when the current block is highly correlated with its adjacent spatial neighbors. However, in real coding scenarios, due to the existence of coding noises (e.g., the ones caused by the quantization/dequantization and the blocking artifacts introduced at motion compensation stage), the current block may be more correlated with the samples in the reconstructed regions that are not adjacent to the current block. Based on such consideration, in this section, one adaptive motion compensated filtering scheme based on non-adjacent neighbors is proposed. With the scheme, samples in the non-adjacent regions can be utilized to derive the coefficients of the adaptive motion compensated filtering. Different methods may be applied to locate the non-adjacent reconstructed samples for the derivation of the filter coefficients. In one or more embodiments, non-adjacent neighboring blocks may be scanned from left area and above area of the current block. The scanning distance may be defined as the number of at least one scanning block size to the left or on top of the current block.

As shown in FIGS. 17A and 17B, either on top of or left to the current block, multiple rows (columns) of non-adjacent neighboring blocks may be scanned. The distance shown in FIGS. 17A and 17B represents the number of the at least one scanning block size from each candidate position to the current block, each scanning block size representing a unit of the distance. For example, the area with "distance 2" on the left side of the current block indicates that the candidate neighboring blocks located in this area are 2 scanning block sizes away from the current block. Based on such pattern, different scanning block sizes may be applied:

In one method, as shown in FIG. 17A, the non-adjacent neighboring blocks at each distance may have the same block size as the current block. Note that when such method is applied, the granularity of block scanning is adaptively adjusted according to the partition granularity of the current block, that is, the larger coding block has more chances to utilize the farther non-adjacent reconstructed samples for calculating the coefficients of the adaptive filter.

In another method, the non-adjacent neighboring blocks that may be accessed for the filter coefficient derivation may be defined based on a fixed block, e.g., 4×4, 8×8.

In the third method, one combined method may be applied to define the scan pattern. For instance, for small blocks, one fixed scanning block (Ws×Hs) size may be applied, where Ws and Hs are the width and height of the fixed scanning block size; otherwise, for big blocks, the scanning block size is defined as the current block size. Specifically, let xStep and yStep indicate the width and height of the scanning block size, their corresponding values are xStep=max (Ws, width) and yStep=max (Hs, height), where width and height are the width and height of the current block.

To indicate the usage of non-adjacent neighbors for filter derivation, a spatial candidate list may be formed by including both the adjacent neighbor (i.e., direct top and left spatial neighboring reconstruction samples) and non-adjacent neighboring blocks. In some embodiments, one index may be signaled from an encoder to a decoder to specify which spatial candidate is selected for deriving the filter coefficients.

Additionally or alternatively, in some examples, it is proposed to apply the proposed non-adjacent spatial neighbors to the existing LIC design, where the proposed adaptive motion compensated filtering degenerates to 2-tap filter (i.e., one scaling and one offset). Specifically, based on the motion information of the current block (either uni-prediction or bi-prediction), the method uses the motion information to generate the corresponding prediction signals of the selected non-adjacent block, which are then used to derive the corresponding LIC parameters by minimizing the difference between the reconstructed samples of the non-adjacent block and its corresponding prediction.

Adaptive Motion Compensated Filtering Based on History Filter Coefficients

In the above non-adjacent neighbor-based scheme, the filter coefficients are derived from the reconstructed regions that are far from the current block, which requires additional on-chip memory to store those non-adjacent reconstruction samples. This is relatively costly to practical hardware codec implementations. Therefore, in order to reduce the implementation cost, one history based adaptive motion compensated filtering method is proposed. In the method, the filter coefficients of one previously coded block are stored in one table and can be used for filtering of the motion compensated samples of future blocks. In some embodiments, the table may be a candidate filter list. The table with multiple sets of filter coefficients can be maintained and synchronized at both encoding and decoding process. Whenever one inter block is coded, the set of filter coefficients can be derived based on its reconstruction samples and its prediction samples, which is then added to the last entry of the table as one new candidate. To maintain the table size, one first-in-first-out (FIFO) rule can be used wherein redundancy check can be applied to check whether there is an identical candidate in the table as the new candidate. If it is the case, the identical candidate will be removed from the table and all the other candidates are moved forward and the new candidate is added at the last entry. In the case that the table is full and there is no identical candidate in the table, the first candidate will be removed from the table and the new candidate is added at the last. Then, the candidate sets of the filter coefficients can be selected for the filtering of the motion compensated samples of future coding blocks. For signaling, when the history-based filter coefficient derivation is selected, one index can be signaled to indicate which candidate set in the table will be used for deriving the filter coefficients of the current block. In another embodiment, to reduce the number of filter coefficient derivation, it is proposed to only include the filter coefficients of the coding blocks where the adaptive motion compensated filtering is selected into the table.

Additionally or alternatively, in some examples, it is proposed to apply the proposed history-based filter derivation scheme to the existing LIC design, where the proposed adaptive motion compensated filtering degenerates to 2-tap filter. Specifically, in the case, each candidate in the table is composed of two parameters, i.e., one scaling and one offset, which can be selected by one inter coding block to adjust its prediction samples.

Combination of the Adaptive Motion Compensated Filtering and the OBMC

In this section, methods are provided to apply the proposed adaptive motion compensated filtering method to the OBMC process. Specifically, in some example methods, beside the motion vectors of neighboring blocks, it is proposed to also consider the LIC parameters of each neighboring block to its corresponding motion compensated prediction samples when conducting the OBMC process of the current block. To facilitate the description, in the below, regular inter prediction without sub-block partition is used as the example to illustrate the proposed method. For example, let $P_{obmc}(x, y)$ denotes the blended prediction sample at coordinate (x, y) after combining the prediction signal of the current CU with multiple prediction signal based on the MVs of its spatial neighbors. $P_{cur}(x, y)$ denotes the prediction sample at coordinate (x, y) of the current CU; $P_{top}(x, y)$ and $P_{left}(x, y)$ denote the prediction samples at the same position of the current CU but using the MVs of the left and right neighbors of the CU, respectively. In some embodiments, as shown in equation (29), $P_{obmc}(x, y)$ may be the weighted average of Pour (x, y), $P_{top}(x, y)$ and $P_{left}(x, y)$.

$$P_{obmc}(x, y) = w_{cur} * P_{cur}(x, y) + w_{top} * P_{top}(x, y) + w_{left} * P_{left}(x, y) \quad (29)$$

Additionally, for the purpose of illustration, it is assumed that the adaptive motion compensated filtering is applied to the current block and its spatial top and left neighbors and the applied filters are one tap filter (i.e., one scaling factor and offset) with filter coefficients $\alpha_{cur}$ and $\beta_{cur}$ for the current block, $\alpha_{top}$ and $\beta_{top}$ for the top neighboring block and $\alpha_{left}$ and $\beta_{left}$ for the left neighboring block. The proposed scheme firstly generates the prediction samples of the current block as illustrated as $$P_{cur}(x, y) = \alpha_{cur} \cdot P_{cur}^{org}(x, y) + \beta_{cur} \quad (30)$$

where $P^{org}_{cur}(x, y)$ are the original prediction samples of the current block using its motion vector without the filtering applied. Then, the boundary prediction samples of the current CU will be updated using the MVs of its top and left causal neighbors. Firstly, the top neighboring block of the current block is firstly checked. If the block is one inter block, its MVs and filter coefficients (i.e., $\alpha_{top}$ and $\beta_{top}$) will be assigned to the current block to generate the prediction signal $P_{top}(x, y)$ at collocated position of the current block as.

$$P_{top}(x, y) = \alpha_{top} \cdot P_{top}^{org}(x, y) + \beta_{top} \quad (31)$$

where $P^{org}_{top}(x, y)$ are the original prediction samples of the current block using the motion vector of the top neighboring block without the filtering applied. After that, the same procedure is followed to generate the corresponding prediction samples based on the motion vector and the LIC parameters of the left neighboring blocks as $$P_{left}(x, y) = \alpha_{left} \cdot P_{left}^{org}(x, y) + \beta_{left} \quad (32)$$

where $P^{org}_{left}(x, y)$ are the original prediction samples of the current block using the motion vector of the left neighboring block without the filtering applied. Finally, the three prediction signals are combined according to the template-based OBMC blending process (as illustrated in section "overlapped block motion compensation") to generate the final prediction samples of the current block.

When the current block is coded with one sub-block mode (e.g., affine, ATMVP and DMVR), the proposed motion-compensated filtering based OBMC can also be applied to the internal OBMC of the sub-blocks inside the current CU. Specifically, when such scheme is applied, the same filtering processes as illustrated in equations (29) to (31) can be applied to generate the corresponding prediction samples of each sub-block using its top, left, bottom and right neighboring sub-blocks. However, instead of the LIC parameters of the spatial neighboring blocks, the filter coefficients of the current CU will be always applied for the prediction sample derivation of the internal OBMC process.

In order to achieve different complexity/performance tradeoff, two methods are proposed herein when the proposed motion compensated filtering OBMC is applied. In one method, it is proposed to only apply the filtering based OBMC to the prediction samples on the CU boundaries but not the prediction samples of the sub-blocks inside the CU (i.e., the internal OBMC). In such case, for the internal OBMC, only the neighboring motion vectors of the neighboring blocks of each sub-block are considered to generate its OBMC predication samples. In another method, it is proposed to apply the filtering based OBMC to the prediction samples on the CU boundaries as well as the prediction samples along the sub-block boundaries of the sub-blocks inside the CU.

Figure 18:
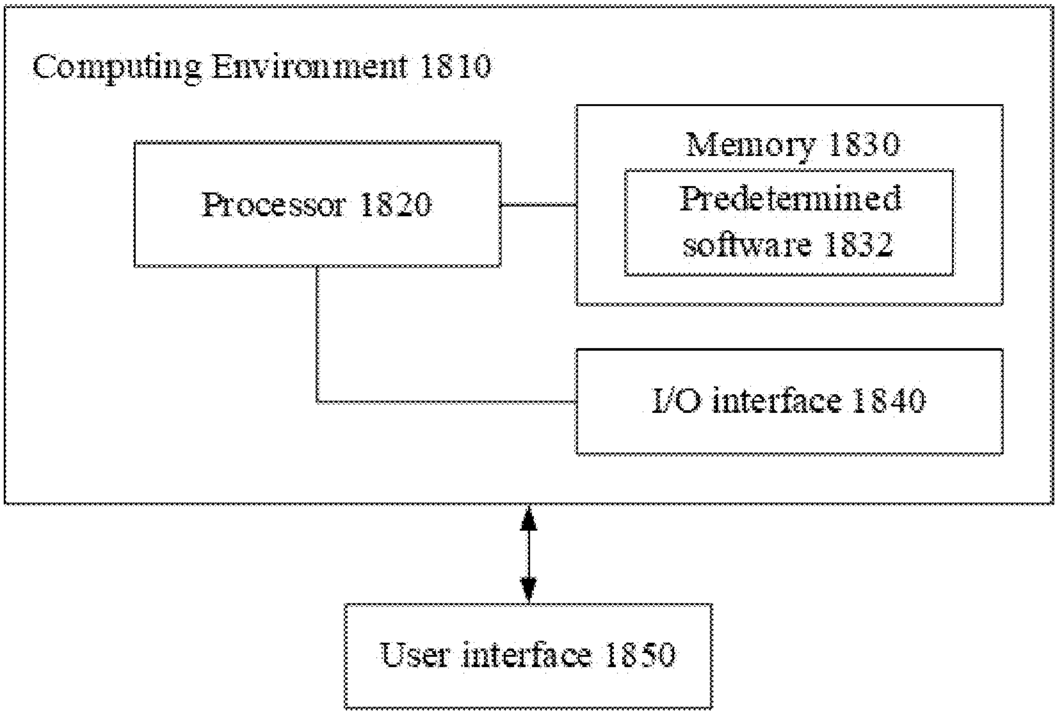
FIG. 18 is a diagram illustrating a computing environment coupled with a user interface in accordance with some examples of the present disclosure.

FIG. 18 shows a computing environment (or a computing device) 1810 coupled with a user interface 1850. The computing environment 1810 can be part of a data processing server. In some embodiments, the computing device 1810 can perform any of various methods or processes (such as encoding/decoding methods or processes) as described hereinbefore in accordance with various examples of the present disclosure. The computing environment 1810 may include a processor 1820, a memory 1830, and an I/O interface 1840.

The processor 1820 typically controls overall operations of the computing environment 1810, such as the operations associated with the display, data acquisition, data communications, and image processing. The processor 1820 may include one or more processors to execute instructions to perform all or some of the steps in the above-described methods. Moreover, the processor 1820 may include one or more modules that facilitate the interaction between the processor 1820 and other components. The processor may be a Central Processing Unit (CPU), a microprocessor, a single chip machine, a GPU, or the like.

The memory 1830 is configured to store various types of data to support the operation of the computing environment 1810. Memory 1830 may include predetermine software 1832. Examples of such data include instructions for any applications or methods operated on the computing environment 1810, video datasets, image data, etc. The memory 1830 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The I/O interface 1840 provides an interface between the processor 1820 and peripheral interface modules, such as a keyboard, a click wheel, buttons, and the like. The buttons may include but are not limited to, a home button, a start scan button, and a stop scan button. The I/O interface 1840 can be coupled with an encoder and decoder.

In some embodiments, there is also provided a non-transitory computer-readable storage medium including a plurality of programs, such as included in the memory 1830, executable by the processor 1820 in the computing environment 1810, for performing the above-described methods and/or storing a bitstream generated by the encoding method described above or a bitstream to be decoded by the decoding method described above. In one example, the plurality of programs may be executed by the processor 1820 in the computing environment 1810 to receive (for example, from the video encoder 20 in FIG. 1G) a bitstream or data stream including encoded video information (for example, video blocks representing encoded video frames, and/or associated one or more syntax elements, etc.), and may also be executed by the processor 1820 in the computing environment 1810 to perform the decoding method described above according to the received bitstream or data stream. In another example, the plurality of programs may be executed by the processor 1820 in the computing environment 1810 to perform the encoding method described above to encode video information (for example, video blocks representing video frames, and/or associated one or more syntax elements, etc.) into a bitstream or data stream, and may also be executed by the processor 1820 in the computing environment 1810 to transmit the bitstream or data stream (for example, to the video decoder 30 in FIG. 2B). Alternatively, the non-transitory computer-readable storage medium may have stored therein a bitstream or a data stream comprising encoded video information (for example, video blocks representing encoded video frames, and/or associated one or more syntax elements etc.) generated by an encoder (for example, the video encoder 20 in FIG. 1G) using, for example, the encoding method described above for use by a decoder (for example, the video decoder 30 in FIG. 2B) in decoding video data. For example, the non-transitory computer-readable storage medium may be a ROM, a RAM, a CD-ROM, a magnetic tape, a floppy disc, an optical data storage device or the like.

In an embodiment, there is provided a bitstream generated by the encoding method described above or a bitstream to be decoded by the decoding method described above. In an embodiment, there is provided a bitstream comprising encoded video information generated by the encoding method described above or encoded video information to be decoded by the decoding method described above.

In an embodiment, there is also provided a computing device comprising one or more processors (for example, the processor 1820); and the non-transitory computer-readable storage medium or the memory 1830 having stored therein a plurality of programs executable by the one or more processors, wherein the one or more processors, upon execution of the plurality of programs, are configured to perform the above-described methods.

In an embodiment, there is also provided a computer program product having instructions for storage or transmission of a bitstream comprising encoded video information generated by the encoding method described above or encoded video information to be decoded by the decoding method described above. In an embodiment, there is also provided a computer program product comprising a plurality of programs, for example, in the memory 1830, executable by the processor 1820 in the computing environment 1810, for performing the above-described methods. For example, the computer program product may include the non-transitory computer-readable storage medium.

In some embodiments, the computing environment 1810 may be implemented with one or more application-specific integrated circuits (ASICs), digital signal processors (DSPs), digital signal processing devices (DSPDs), programmable logic devices (PLDs), field-programmable gate arrays (FPGAs), graphical processing units (GPUs), controllers, micro-controllers, microprocessors, or other electronic components, for performing the above methods.

In an embodiment, there is also provided a method of storing a bitstream, comprising storing the bitstream on a digital storage medium, wherein the bitstream comprises encoded video information generated by the encoding method described above or encoded video information to be decoded by the decoding method described above.

In an embodiment, there is also provided a method for transmitting a bitstream generated by the encoder described above. In an embodiment, there is also provided a method for receiving a bitstream to be decoded by the decoder described above.

Figure 19:
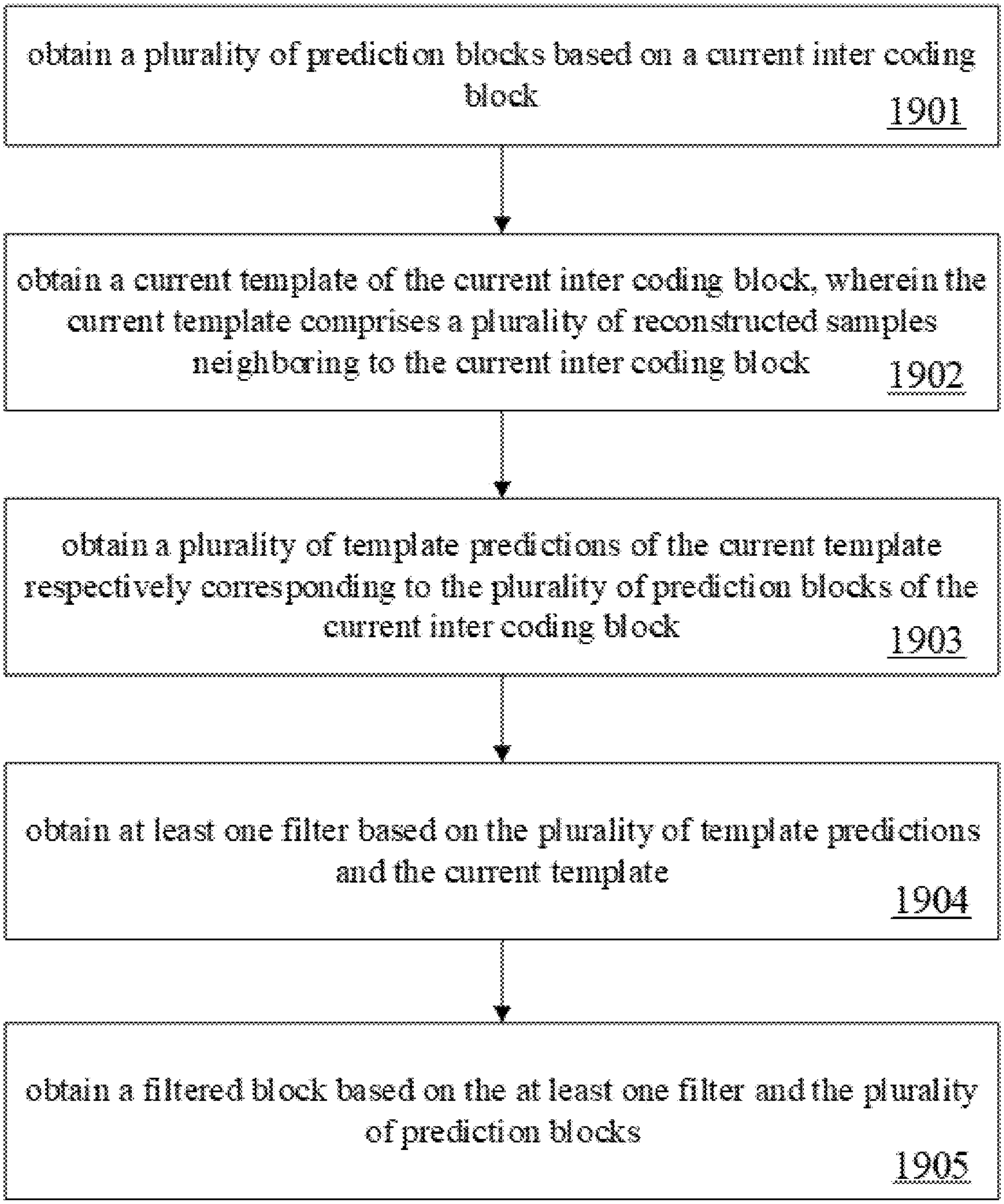
FIG. 19 is a flowchart illustrating a method for video decoding according to an example of the present disclosure.

FIG. 19 is a flowchart illustrating a method for video decoding according to an example of the present disclosure. The method may be implemented for decoding an inter coding block.

In Step 1901, the processor 1820, at the side of a decoder, may obtain a plurality of prediction blocks based on a current inter coding block. For example, as shown in equation (8) and FIG. 12, $P_0$(Prediction block 0) and $P_1$ (Prediction block 1) can be obtained based on the current block based on the motion vector ($v_x$, $v_y$). Both of $P_0$ and $P_1$ will be further used to obtain combined prediction block $P_{bi\text{-}pred}$ in equation (9) or $P_{bi}$ in equation (12). In some embodiments, more than two prediction blocks may be obtained to implement this method. The number of the prediction blocks is not limited to two in some embodiments of the present disclosure.

In Step 1902, the processor 1820 may obtain a current template of the current inter coding block, wherein the current template includes a plurality of reconstructed samples neighboring to the current inter coding block, as shown in FIG. 12.

In Step 1903, the processor 1820 may obtain a plurality of template predictions of the current template respectively corresponding to the plurality of prediction blocks of the current inter coding block. For example, as shown in equation (11) and FIG. 12, template predictions $T_0$ (Template prediction 0) and $T_1$ (Template prediction 1) are obtained as the L0 and L1 prediction samples of the template T, respectively. In some embodiments, as shown in FIG. 12, each template prediction may include a plurality of template prediction samples corresponding to the plurality of reconstructed samples of the current template.

In Step 1904, the processor 1820 may obtain at least one filter based on the plurality of template predictions and the current template.

In Step 1905, the processor 1820 may obtain a filtered block based on the at least one filter and the plurality of prediction blocks.

In some examples, the processor 1820 may obtain a combined template prediction based on the plurality of template predictions; and obtain coefficients of one filter by minimizing differences between the combined template prediction and the current template. For example, as shown in equations (10) and (11) and FIG. 12, combined template prediction $T_{bi}$ can be obtained based on template predictions $T_0$ (Template prediction 0) and $T_1$ (Template prediction 1), and then coefficients f* of the filter can be obtained based on $T_{bi}$.

In some examples, the processor 1820 may obtain a combined prediction block based on the plurality of prediction blocks; and obtain a filtered block by applying the one filter to the combined prediction block. For example, as shown in equation (12) and FIG. 12, $P_0$(Prediction block 0) and $P_1$ (Prediction block 1) are further used to obtain combined $P_{bi}$ and then coefficients f* of the filter is applied to combined prediction block $P_{bi}$, so that filtered block $P'_{bi}(x, y)$ can be obtained.

In some examples, the coefficients include at least one of a scaling factor, an offset, and at least one non-linear item. For example, ash shown in equation (13), o is an offset and $nl^k$'s are non-linear terms, and as shown in equation (15), α and β are a scaling factor and an offset.

In some examples, the processor 1820 may obtain a first prediction block and a second prediction block. For example, as shown in FIG. 12, two prediction blocks $P_0$(Prediction block 0) and $P_1$ (Prediction block 1) are obtained. In some embodiments, more than two prediction blocks may be obtained to implement this method. The number of the prediction blocks is not limited to two as shown in some embodiments of the present disclosure.

In some examples, the processor 1820 may obtain first coefficients for a first filter by minimizing differences between a first template prediction and the current template; and obtain second coefficients for a second filter by minimizing differences between a second template prediction and the current template. For example, as shown in equation (17) and FIG. 13, two sets of filter parameters $f_0$ (first coefficients) and $f_1$ (second coefficients) can be derived for L0 and L1 directions separately.

In some examples, the processor 1820 may obtain a first filtered prediction block by applying the first filter to the first prediction block; obtain a second filtered prediction block by applying the second filter to the second prediction block; and obtain the filtered block by combining the first filtered prediction block and the second filtered prediction block. For example, as shown in equation (19) and FIG. 13, $f_0$ (first coefficients) and $f_1$ (second coefficients) are respectively applied to $P_0$(Prediction block 0) and $P_1$ (Prediction block 1) to obtain $P'_0$ (Filtered prediction block 0) and $P'_1$ (Filtered prediction block 1), and as shown in equation (18), the filtered block $P'_{bi}$ is obtained by combining $P'_0$ and $P'_1$.

In some examples, the first coefficients or the second coefficients include at least one of a scaling factor, an offset, and at least one non-linear item. For example, ash shown in equation (20), o is an offset and $nl^k$'s are non-linear terms, and as shown in equation (22), α and β are a scaling factor and an offset.

In some examples, the processor 1820 may calculate a target template based on the current template and a previously filtered template prediction; obtain coefficients for a current filter by minimizing differences between a current template prediction and the target template; and calculate a current filtered template prediction by applying the current filter to the current template prediction. For example, as shown in equation (26), target template $T^{(k)}$ is calculated based on the current template T and a previously filtered template prediction $T^{(k-1)}$, and then as shown in equation (27), coefficients $$f_{L^{(k)}}^{(k)}$$

for a current filter can be obtained by minimizing differences between a current template prediction $T_{L^{(k)}}$ and the target template $T^{(k)}$. At last, as shown in equation (28), based on the filter coefficients $$f_{L^{(k)}}^{(k)},$$

the current filtered template prediction $$T_{L^{(k)}}^{(k)}$$

is calculated. In some embodiments, the processor 1820 may repeat the above steps shown in equations (26)-(28) to update filter parameters $f_0$ (first coefficients) and $f_1$ (second coefficients) alternatively and recursively.

In some examples, the processor 1820 may obtain coefficients for a first filter by minimizing differences between a first template prediction and the current template; and calculate the previously filtered template prediction by applying the first filter to the first template prediction. For example, as shown in equation (24), initial filter coefficients $$f_{L^{(0)}}^{(0)}$$

is obtained by minimizing the distortion between its uni-prediction $T_{L^{(0)}}$ and the template T, and then as shown in equation (25), the filtered uni-prediction $$T_{L^{(0)}}^{(0)}$$

is calculated based on initial filter coefficients $$f_{L^{(0)}}^{(0)}$$

and used as the previously filtered template prediction $T^{(k-1)}$ in equation (26).

In some examples, the processor 1820 may obtain a first filtered prediction block by applying a first filter to the first prediction block; obtain a second filtered prediction block by applying a second filter to the second prediction block; and obtain the filtered block by combining the first filtered prediction block and the second filtered prediction block. For example, as shown in equations (18) and (19), two filters are applied to two uni-predictions $P_0$ and $P_1$ of the current block separately to obtain $P'_0$ and $P'_1$, which are then combined to generate the final bi-prediction $P'_{bi}$ of the current block.

In some examples, the coefficients include at least one of a scaling factor, an offset, and at least one non-linear item.

In some examples, the processor 1820 may, in response to reaching an iteration number, obtain a first filtered prediction block by applying a first filter to the first prediction block, and obtaining a second filtered prediction block by applying a second filter to the second prediction block; and obtaining the filtered block by combining the first filtered prediction block and the second filtered prediction block.

In some examples, the iteration number is preset or determined according to differences between the previously filtered template prediction and the current template prediction.

Figure 20:
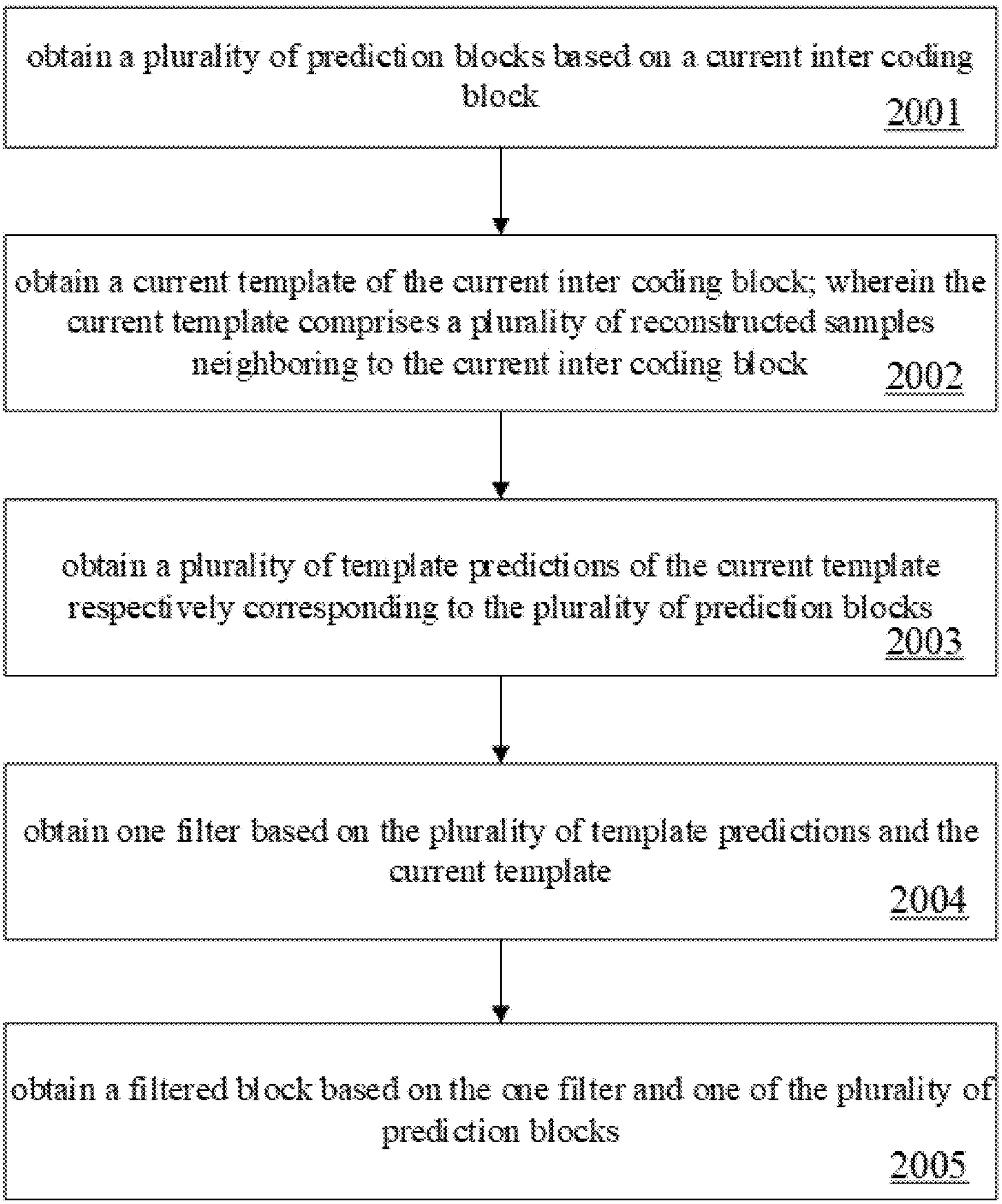
FIG. 20 is a flowchart illustrating a method for video decoding according to an example of the present disclosure.

FIG. 20 is a flowchart illustrating a method for video decoding according to an example of the present disclosure. The method may be implemented for decoding an inter coding block.

In Step 2001, the processor 1820, at the side of a decoder, may obtain a plurality of prediction blocks based on a current inter coding block. For example, as shown in equation (8), prediction blocks can be obtained based on the current block based on the motion vector ($v_x$, $v_y$).

In Step 2002, the processor 1820 may obtain a current template of the current inter coding block; wherein the current template includes a plurality of reconstructed samples neighboring to the current inter coding block.

In Step 2003, the processor 1820 may obtain a plurality of template predictions of the current template respectively corresponding to the plurality of prediction blocks. In some embodiments, each template prediction may include a plurality of template prediction samples corresponding to the plurality of reconstructed samples of the current template.

In Step 2004, the processor 1820 may obtain one filter based on the plurality of template predictions and the current template. Specifically, the processor 1820 may calculate a target template based on the current template and a previously filtered template prediction; obtain coefficients for a current filter by minimizing differences between a current template prediction and the target template; and calculate a current filtered template prediction by applying the current filter to the current template prediction. For example, as shown in equation (26), target template $T^{(k)}$ based on the current template T and a previously filtered template prediction $T^{(k-1)}$, and then as shown in equation (27), coefficients $$f_{L^{(k)}}^{(k)}$$

for a current filter can be obtained by minimizing differences between a current template prediction $T_{L^{(k)}}$ and the target template $T^{(k)}$. At last, as shown in equation (28), based on the filter coefficients $$f_{L^{(k)}}^{(k)},$$

the current filtered template prediction $$T_{L^{(k)}}^{(k)}$$

is calculated. In some embodiments, the processor 1820 repeats the above steps shown in equations (26)-(28) to update filter parameters $f_0$ (first coefficients) and $f_1$ (second coefficients) alternatively and recursively, but only one of the updated filter parameters $f_0$ (first coefficients) and $f_1$ (second coefficients) is used to obtain the filtered block.

In Step 2005, the processor 1820 may obtain a filtered block based on the one filter and one of the plurality of prediction blocks.

In some examples, the processor 1820 may obtain coefficients for a first filter by minimizing differences between a first template prediction and the current template; and calculate the previously filtered template prediction by applying the first filter to the first template prediction. In some examples, the coefficients include at least one of a scaling factor, an offset, and at least one non-linear item. For example, as shown in equation (24), initial filter coefficients $$f_{L^{(0)}}^{(0)}$$

is obtained by minimizing the distortion between its uni-prediction $T_{L^{(0)}}$ and the template T, and then as shown in equation (25), the filtered uni-prediction $$T_{L^{(0)}}^{(0)}$$

is calculated based on initial filter coefficients $$f_{L^{(0)}}^{(0)}$$

and used as the previously filtered template prediction $T^{(k-1)}$ in equation (26).

In some examples, the processor 1820 may obtain the filtered block based on the current filter and the one of the plurality of prediction blocks corresponding to the current template prediction. In some embodiments, the processor 1820 repeats the steps shown in equations (26)-(28) to update filter parameters $f_0$ (first coefficients) and $f_1$ (second coefficients) alternatively and recursively, but only one of the filter parameters $f_0$ (first coefficients) and $f_1$ (second coefficients) is used as the filter parameter of the current filter, then the filtered block is obtained based on the current filter and the one of the plurality of prediction blocks corresponding to the current template prediction.

In some examples, the processor 1820 may, in response to reaching an iteration number, obtain the filtered block based on the current filter and the one of the plurality of prediction blocks corresponding to the current template prediction.

In some examples, the iteration number is preset or determined according to differences between the previously filtered template prediction and the current template prediction.

Figure 21:
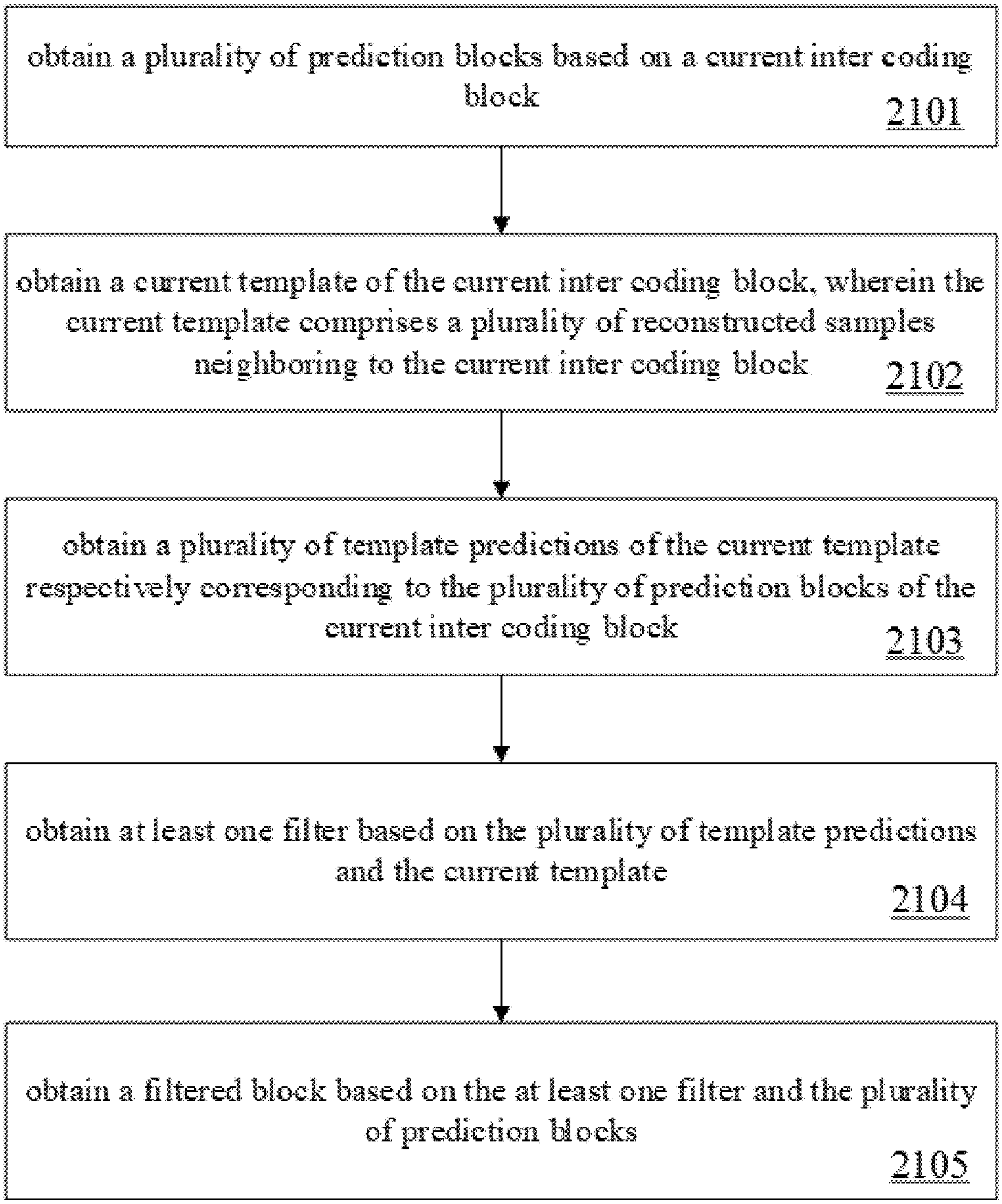
FIG. 21 is a flowchart illustrating a method for video encoding according to an example of the present disclosure.

FIG. 21 is a flowchart illustrating a method for video encoding according to an example of the present disclosure. The method may be implemented for encoding an inter coding block.

In Step 2101, the processor 1820, at the side of an encoder, may obtain a plurality of prediction blocks based on a current inter coding block. For example, as shown in equation (8) and FIG. 12, $P_0$(Prediction block 0) and $P_1$ (Prediction block 1) can be obtained based on the current block based on the motion vector ($v_x$, $v_y$). Both of $P_0$ and $P_1$ will be further used to obtain combined prediction block $P_{bi}$-pred in equation (9) or Phi in equation (12). In some embodiments, more than two prediction blocks may be obtained to implement this method. The number of the prediction blocks is not limited to two in some embodiments of the present disclosure.

In Step 2102, the processor 1820 may obtain a current template of the current inter coding block, wherein the current template includes a plurality of reconstructed samples neighboring to the current inter coding block, as shown in FIG. 12.

In Step 2103, the processor 1820 may obtain a plurality of template predictions of the current template respectively corresponding to the plurality of prediction blocks of the current inter coding block. For example, as shown in equation (11) and FIG. 12, template predictions $T_0$ (Template prediction 0) and $T_1$ (Template prediction 1) are obtained as the L0 and L1 prediction samples of the template T, respectively. In some embodiments, as shown in FIG. 12, each template prediction may include a plurality of template prediction samples corresponding to the plurality of reconstructed samples of the current template.

In Step 2104, the processor 1820 may obtain at least one filter based on the plurality of template predictions and the current template.

In Step 2105, the processor 1820 may obtain a filtered block based on the at least one filter and the plurality of prediction blocks.

In some examples, the processor 1820 may obtain a combined template prediction based on the plurality of template predictions; and obtain coefficients of one filter by minimizing differences between the combined template prediction and the current template. For example, as shown in equations (10) and (11) and FIG. 12, combined template prediction $T_{bi}$ can be obtained based on template predictions $T_0$ (Template prediction 0) and $T_1$ (Template prediction 1), and then coefficients f* of the filter can be obtained based on $T_{bi}$.

In some examples, the processor 1820 may obtain a combined prediction block based on the plurality of prediction blocks; and obtain a filtered block by applying the one filter to the combined prediction block. For example, as shown in equation (12) and FIG. 12, $P_0$(Prediction block 0) and $P_1$ (Prediction block 1) are further used to obtain combined $P_{bi}$ and then coefficients f* of the filter is applied to combined prediction block $P_{bi}$, so that filtered block $P'_{bi}(x, y)$ can be obtained.

In some examples, the coefficients include at least one of a scaling factor, an offset, and at least one non-linear item. For example, ash shown in equation (13), o is an offset and $nl^k$'s are non-linear terms, and as shown in equation (17), α and β are a scaling factor and an offset.

In some examples, the processor 1820 may obtain a first prediction block and a second prediction block. For example, as shown in FIG. 12, two prediction blocks $P_0$(Prediction block 0) and $P_1$(Prediction block 1) are obtained. In some embodiments, more than two prediction blocks may be obtained to implement this method. The number of the prediction blocks is not limited to two as shown in some embodiments of the present disclosure.

In some examples, the processor 1820 may obtain first coefficients for a first filter by minimizing differences between a first template prediction and the current template; and obtain second coefficients for a second filter by minimizing differences between a second template prediction and the current template. For example, as shown in equation (17) and FIG. 13, two sets of filter parameters $f_0$ (first coefficients) and $f_1$ (second coefficients) can be derived for L0 and L1 directions separately.

In some examples, the processor 1820 may obtain a first filtered prediction block by applying the first filter to the first prediction block; obtain a second filtered prediction block by applying the second filter to the second prediction block; and obtain the filtered block by combining the first filtered prediction block and the second filtered prediction block. For example, as shown in equation (19) and FIG. 13, $f_0$ (first coefficients) and $f_1$ (second coefficients) are respectively applied to $P_0$(Prediction block 0) and $P_1$(Prediction block 1) to obtain $P'_0$ (Filtered prediction block 0) and $P'_1$ (Filtered prediction block 1), and as shown in equation (18), the filtered block $P'_{bi}$ is obtained by combining $P'_0$ and $P'_1$.

In some examples, the first coefficients or the second coefficients include at least one of a scaling factor, an offset, and at least one non-linear item. For example, ash shown in equation (20), o is an offset and $nl^k$'s are non-linear terms, and as shown in equation (22), α and β are a scaling factor and an offset.

In some examples, the processor 1820 may calculate a target template based on the current template and a previously filtered template prediction; obtain coefficients for a current filter by minimizing differences between a current template prediction and the target template; and calculate a current filtered template prediction by applying the current filter to the current template prediction. For example, as shown in equation (26), target template $T^{(k)}$ is calculated based on the current template T and a previously filtered template prediction $T^{(k-1)}$, and then as shown in equation (27), coefficients $$f_{L^{(k)}}^{(k)}$$

for a current filter can be obtained by minimizing differences between a current template prediction $T_{L^{(k)}}$ and the target template $T^{(k)}$. At last, as shown in equation (28), based on the filter coefficients $$f_{L^{(k)}}^{(k)},$$

the current filtered template prediction $$T_{L^{(k)}}^{(k)}$$

is calculated. In some embodiments, the processor 1820 may repeat the above steps shown in equations (26)-(28) to update filter parameters $f_0$ (first coefficients) and $f_1$ (second coefficients) alternatively and recursively.

In some examples, the processor 1820 may obtain coefficients for a first filter by minimizing differences between a first template prediction and the current template; and calculate the previously filtered template prediction by applying the first filter to the first template prediction. For example, as shown in equation (24), initial filter coefficients $$f_{L^{(0)}}^{(0)}$$

is obtained by minimizing the distortion between its uni-prediction $T_{L^{(0)}}$ and the template T, and then as shown in equation (25), the filtered uni-prediction $$T_{L^{(0)}}^{(0)}$$

is calculated based on initial filter coefficients $$f_{L^{(0)}}^{(0)}$$

and used as the previously filtered template prediction $T^{(k-1)}$ in equation (26).

In some examples, the processor 1820 may obtain a first filtered prediction block by applying a first filter to the first prediction block; obtain a second filtered prediction block by applying a second filter to the second prediction block; and obtain the filtered block by combining the first filtered prediction block and the second filtered prediction block. For example, as shown in equations (18) and (19), two filters are applied to two uni-predictions $P_0$ and $P_1$ of the current block separately to obtain $P'_0$ and $P'_1$, which are then combined to generate the final bi-prediction $P'_{bi}$ of the current block.

In some examples, the coefficients include at least one of a scaling factor, an offset, and at least one non-linear item.

In some examples, the processor 1820 may, in response to reaching an iteration number, obtain a first filtered prediction block by applying a first filter to the first prediction block, and obtaining a second filtered prediction block by applying a second filter to the second prediction block; and obtaining the filtered block by combining the first filtered prediction block and the second filtered prediction block.

In some examples, the iteration number is preset or determined according to differences between the previously filtered template prediction and the current template prediction.

Figure 22:
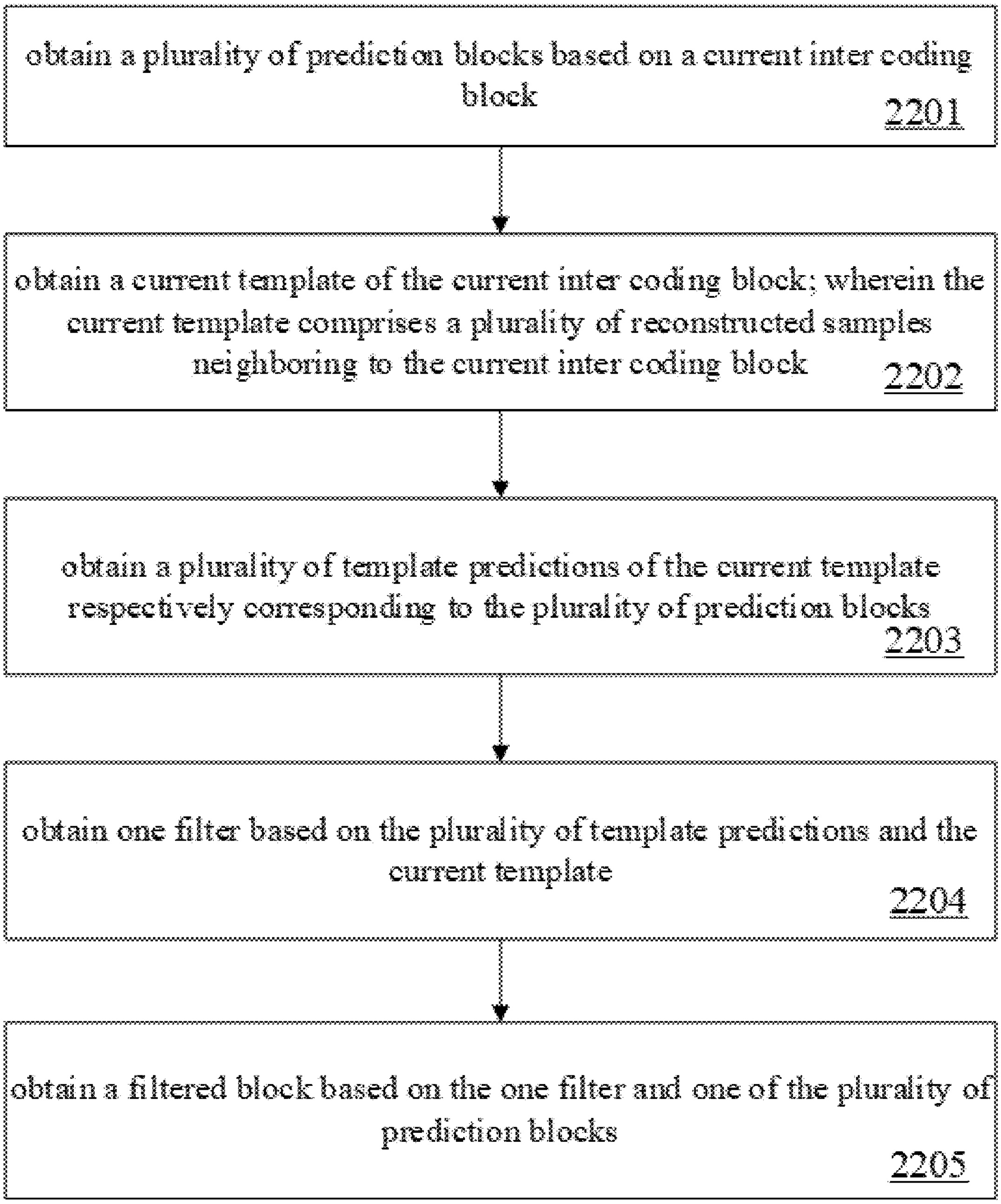
FIG. 22 is a flowchart illustrating a method for video encoding according to an example of the present disclosure.

FIG. 22 is a flowchart illustrating a method for video encoding according to an example of the present disclosure. The method may be implemented for encoding an inter coding block.

In Step 2201, the processor 1820, at the side of an encoder, may obtain a plurality of prediction blocks based on a current inter coding block. For example, as shown in equation (8), prediction blocks can be obtained based on the current block based on the motion vector ($v_x$, $v_y$).

In Step 2202, the processor 1820 may obtain a current template of the current inter coding block; wherein the current template includes a plurality of reconstructed samples neighboring to the current inter coding block.

In Step 2203, the processor 1820 may obtain a plurality of template predictions of the current template respectively corresponding to the plurality of prediction blocks. In some embodiments, each template prediction may include a plurality of template prediction samples corresponding to the plurality of reconstructed samples of the current template.

In Step 2204, the processor 1820 may obtain one filter based on the plurality of template predictions and the current template. Specifically, the processor 1820 may calculate a target template based on the current template and a previously filtered template prediction; obtain coefficients for a current filter by minimizing differences between a current template prediction and the target template; and calculate a current filtered template prediction by applying the current filter to the current template prediction. For example, as shown in equation (26), target template $T^{(k)}$ based on the current template T and a previously filtered template prediction $T^{(k-1)}$, and then as shown in equation (27), coefficients $$f_{L^{(k)}}^{(k)}$$

for a current filter can be obtained by minimizing differences between a current template prediction $T_{L^{(k)}}$ and the target template $T^{(k)}$. At last, as shown in equation (28), based on the filter coefficients $$f_{L^{(k)}}^{(k)},$$

the current filtered template prediction $$T_{L^{(k)}}^{(k)}$$

is calculated. In some embodiments, the processor 1820 repeats the above steps shown in equations (26)-(28) to update filter parameters $f_0$ (first coefficients) and $f_1$ (second coefficients) alternatively and recursively, but only one of the updated filter parameters $f_0$ (first coefficients) and $f_1$ (second coefficients) is used to obtain the filtered block.

In Step 2205, the processor 1820 may obtain a filtered block based on the one filter and one of the plurality of prediction blocks.

In some examples, the processor 1820 may obtain coefficients for a first filter by minimizing differences between a first template prediction and the current template; and calculate the previously filtered template prediction by applying the first filter to the first template prediction. In some examples, the coefficients include at least one of a scaling factor, an offset, and at least one non-linear item. For example, as shown in equation (24), initial filter coefficients $$f_{L^{(0)}}^{(0)}$$

is obtained by minimizing the distortion between its uni-prediction $T_{L^{(0)}}$ and the template T, and then as shown in equation (25), the filtered uni-prediction $$T_{L^{(0)}}^{(0)}$$

is calculated based on initial filter coefficients $$f_{L^{(0)}}^{(0)}$$

and used as the previously filtered template prediction $T^{(k-1)}$ in equation (26).

In some examples, the processor 1820 may obtain the filtered block based on the current filter and the one of the plurality of prediction blocks corresponding to the current template prediction. In some embodiments, the processor 1820 repeats the steps shown in equations (26)-(28) to update filter parameters $f_0$ (first coefficients) and $f_1$ (second coefficients) alternatively and recursively, but only one of the filter parameters $f_0$ (first coefficients) and $f_1$ (second coefficients) is used as the filter parameter of the current filter, then the filtered block is obtained based on the current filter and the one of the plurality of prediction blocks corresponding to the current template prediction.

In some examples, the processor 1820 may, in response to reaching an iteration number, obtain the filtered block based on the current filter and the one of the plurality of prediction blocks corresponding to the current template prediction.

In some examples, the iteration number is preset or determined according to differences between the previously filtered template prediction and the current template prediction.

Figure 23:
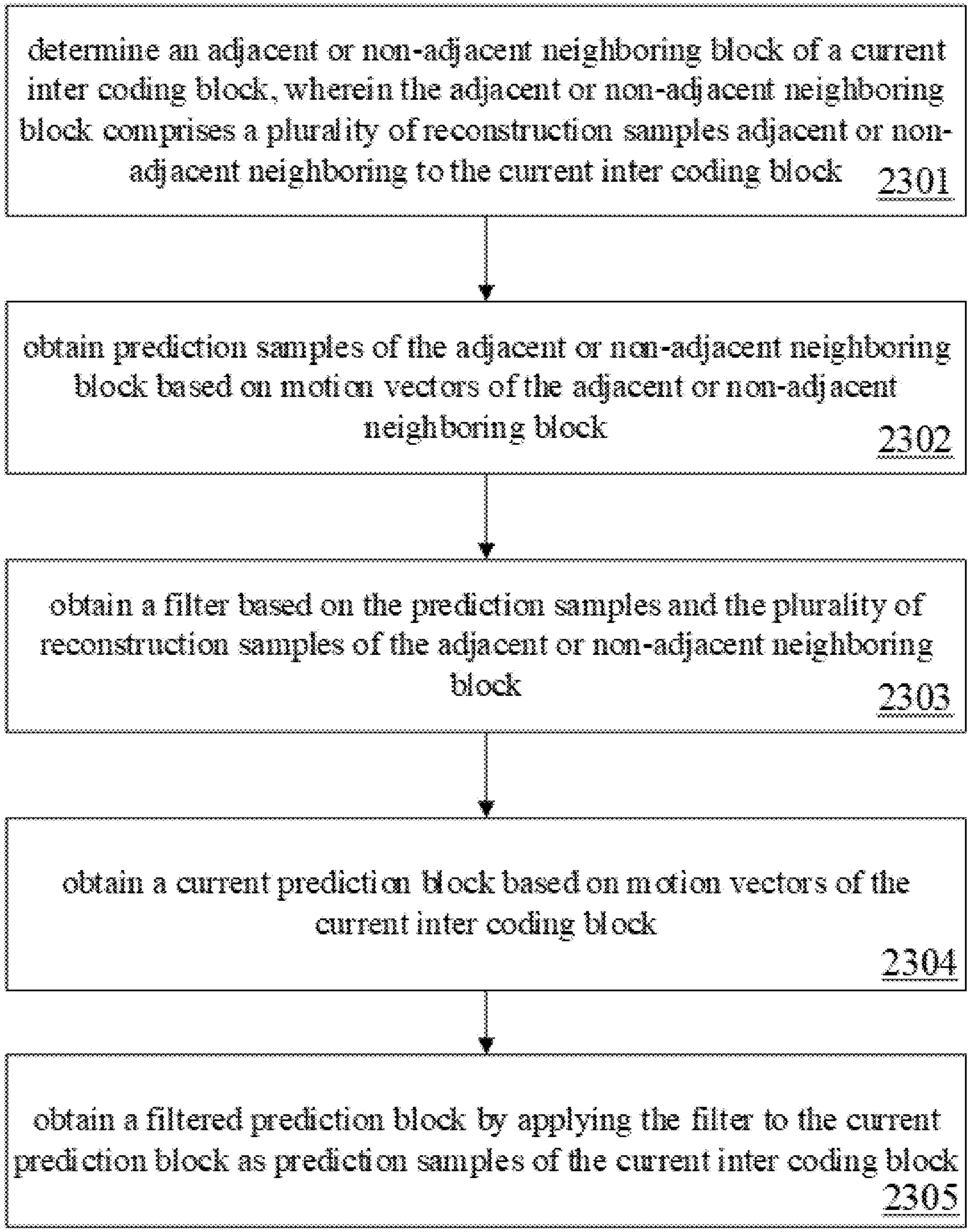
FIG. 23 is a flowchart illustrating a method for video decoding in accordance with some examples of the present disclosure.

FIG. 23 is a flowchart illustrating a method for video decoding according to an example of the present disclosure. The method may be implemented for decoding an inter coding block. In Step 2301, the processor 1820, at the side of a decoder, may determine an adjacent or non-adjacent neighboring block of a current inter coding block, wherein the adjacent or non-adjacent neighboring block includes a plurality of reconstruction samples adjacent or non-adjacent neighboring to the current inter coding block. In Step 2302, the processor 1820 may obtain prediction samples of the adjacent or non-adjacent neighboring block based on motion vectors of the adjacent or non-adjacent neighboring block. In Step 2303, the processor 1820 may obtain a filter based on the prediction samples and the plurality of reconstruction samples of the adjacent or non-adjacent neighboring block. In Step 2304, the processor 1820 may obtain a current prediction block based on motion vectors of the current inter coding block. In Step 2305, the processor 1820 may obtain a filtered prediction block by applying the filter to the current prediction block as prediction samples of the current inter coding block.

In some examples, determining the adjacent or non-adjacent neighboring block of the current inter coding block includes: determining scanning parameters according to a partition granularity of the current inter coding block, wherein the scanning parameters include a scanning distance or a scanning block size; or determining a scanning block size as a fixed size.

In some examples, determining the scanning parameters according to the partition granularity of the current inter coding block includes: determining the scanning block size according to a size of the current inter coding block.

In some examples, determining the scanning block size according to the size of the current inter coding block includes: in response to that the size of the current inter coding block is smaller than a predefined size, determining the scanning block size as a fixed size; or, in response to that the size of the current inter coding block is larger than a predefined size, determining the scanning block size as the size of the current inter coding block.

In some examples, determining the scanning block size according to the size of the current inter coding block includes: in response to that a first horizontal value of the size of the current inter coding block is smaller than a second horizontal value of the predefined size, determining a third horizontal value of the scanning block size as the second horizontal value; in response to that a first vertical value of the size of the current inter coding block is smaller than a second vertical value of the predefined size, determining a third vertical value of the scanning block size as the second vertical value; in response to that a first horizontal value of the size of the current inter coding block is larger than a second horizontal value of the predefined size, determining a third horizontal value of the scanning block size as the first horizontal value; or in response to that a first vertical value of the size of the current inter coding block is larger than a second vertical value of the predefined size, determining a third vertical value of the scanning block size as the first vertical value.

In some examples, the fixed size includes any one of 4×4 or 8×8.

In some examples, the method further includes receiving, by the decoder from an encoder, an index indicating that the adjacent or non-adjacent neighboring block is used for obtaining the filter.

In some examples, determining the adjacent or non-adjacent neighboring block of the current inter coding block includes: determining the adjacent or non-adjacent neighboring block as one block, wherein prediction samples of the one block have been filtered.

In some examples, obtaining the filter based on the prediction samples and the reconstruction samples of the adjacent or non-adjacent neighboring block includes: obtaining coefficients of the filter by minimizing differences between the prediction samples and the reconstruction samples of the adjacent or non-adjacent neighboring block.

In some examples, obtaining the filter based on the prediction samples and the reconstruction samples of the adjacent or non-adjacent neighboring block includes: in response to that the prediction samples of the adjacent or non-adjacent neighboring block have been filtered, determining coefficients of the filter as being identical to coefficients of a filter applied to the prediction samples of the adjacent or non-adjacent neighboring block.

In some examples, the non-adjacent neighboring block is in a top area or a left area of the current inter coding block.

In some examples, the filter includes coefficients of a scaling factor and an offset.

In some examples, obtaining, by the decoder, the current prediction block based on the motion vectors of the current inter coding block includes: determining the motion vectors of the current inter coding block as being identical to the motion vectors of the adjacent or non-adjacent neighboring block.

Figure 24:
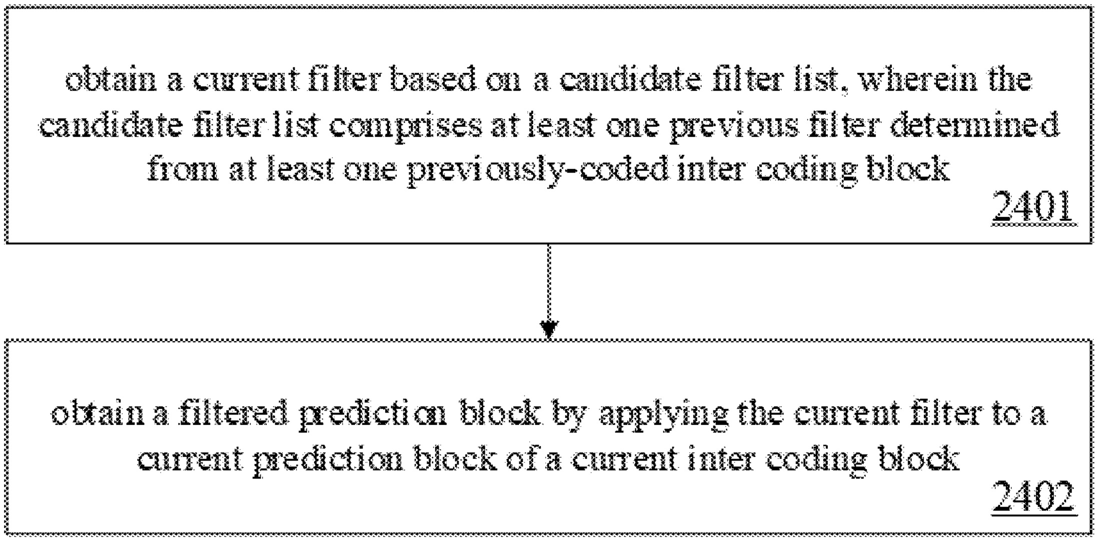
FIG. 24 is a flowchart illustrating a method for video decoding in accordance with some examples of the present disclosure.

FIG. 24 is a flowchart illustrating a method for video decoding according to an example of the present disclosure. The method may be implemented for decoding an inter coding block. In Step 2401, the processor 1820, at the side of a decoder, may obtain a current filter based on a candidate filter list, wherein the candidate filter list includes at least one previous filter determined from at least one previously-coded inter coding block. In Step 2402, the processor 1820 may obtain a filtered prediction block by applying the current filter to a current prediction block of a current inter coding block.

In some examples, a previous filter of the candidate filter list is obtained by following steps: obtaining, by the the processor 1820 of the decoder, the previous filter based on prediction samples and reconstruction samples of an adjacent or non-adjacent neighboring block of the previously-coded inter coding block.

In some examples, obtaining the previous filter based on prediction samples and reconstruction samples of the adjacent or non-adjacent neighboring block of the previously-coded inter coding block includes: in response to that prediction samples of the adjacent or non-adjacent neighboring block have been filtered, determining, by the decoder, the previous filter as being identical to a filter applied to the prediction samples of the adjacent or non-adjacent neighboring block.

In some examples, the adjacent or non-adjacent neighboring block of the previously-coded inter coding block is identified by: determining scanning parameters according to a partition granularity of the previously-coded inter coding block, wherein the scanning parameters include a scanning distance or a scanning block size.

In some examples, determining the scanning parameters according to the partition granularity of the previously-coded inter coding block includes: determining the scanning block size according to a size of the previously-coded inter coding block; or determining the scanning block size as a fixed size.

In some examples, determining the scanning block size according to the size of the current inter coding block includes: in response to that the size of the previously-coded inter coding block is smaller than a predefined size, determining the scanning block size as a fixed size; or in response to that the size of the previously-coded inter coding block is larger than a predefined size, determining the scanning block size as the size of the previously-coded inter coding block.

In some examples, determining the scanning block size according to the size of the previously-coded inter coding block includes: in response to that a first horizontal value of the size of the previously-coded inter coding block is smaller than a second horizontal value of the predefined size, determining a third horizontal value of the scanning block size as the second horizontal value; in response to that a first vertical value of the size of the previously-coded inter coding block is smaller than a second vertical value of the predefined size, determining a third vertical value of the scanning block size as the second vertical value; in response to that a first horizontal value of the size of the previously-coded inter coding block is larger than a second horizontal value of the predefined size, determining a third horizontal value of the scanning block size as the first horizontal value; or in response to that a first vertical value of the size of the previously-coded inter coding block is larger than a second vertical value of the predefined size, determining a third vertical value of the scanning block size as the first vertical value.

In some examples, the method further includes maintaining the candidate filter list to include a predefined number of previous filters.

In some examples, obtaining the current filter based on the candidate filter list includes: scanning previous filters in the candidate filter list, in an order of previously-coded inter coding blocks corresponding to the previous filters being from near to far to the current inter coding block.

In some examples, maintaining the candidate filter list to include the predefined number of previous filters includes: in response to that a number of previous filters included in the candidate filter list reaches the predefined number, removing a first previous filter which is firstly added to the candidate filter table from the candidate filter list, and adding a new previous filter to the candidate filter table as a last entry.

In some examples, maintaining the candidate filter list to include the predefined number of previous filters includes: in response to that a new previous filter is identical with a previous filter included in the candidate filter list, removing the previous filter identical with the new previous filter from the candidate filter list, and adding the new previous filter to the candidate filter table as a last entry.

In some examples, obtaining the current filter based on a candidate filter list, includes: receiving, from an encoder, an index indicating a target filter in the candidate filter table; and determining the current filter as the target filter.

Figure 25:
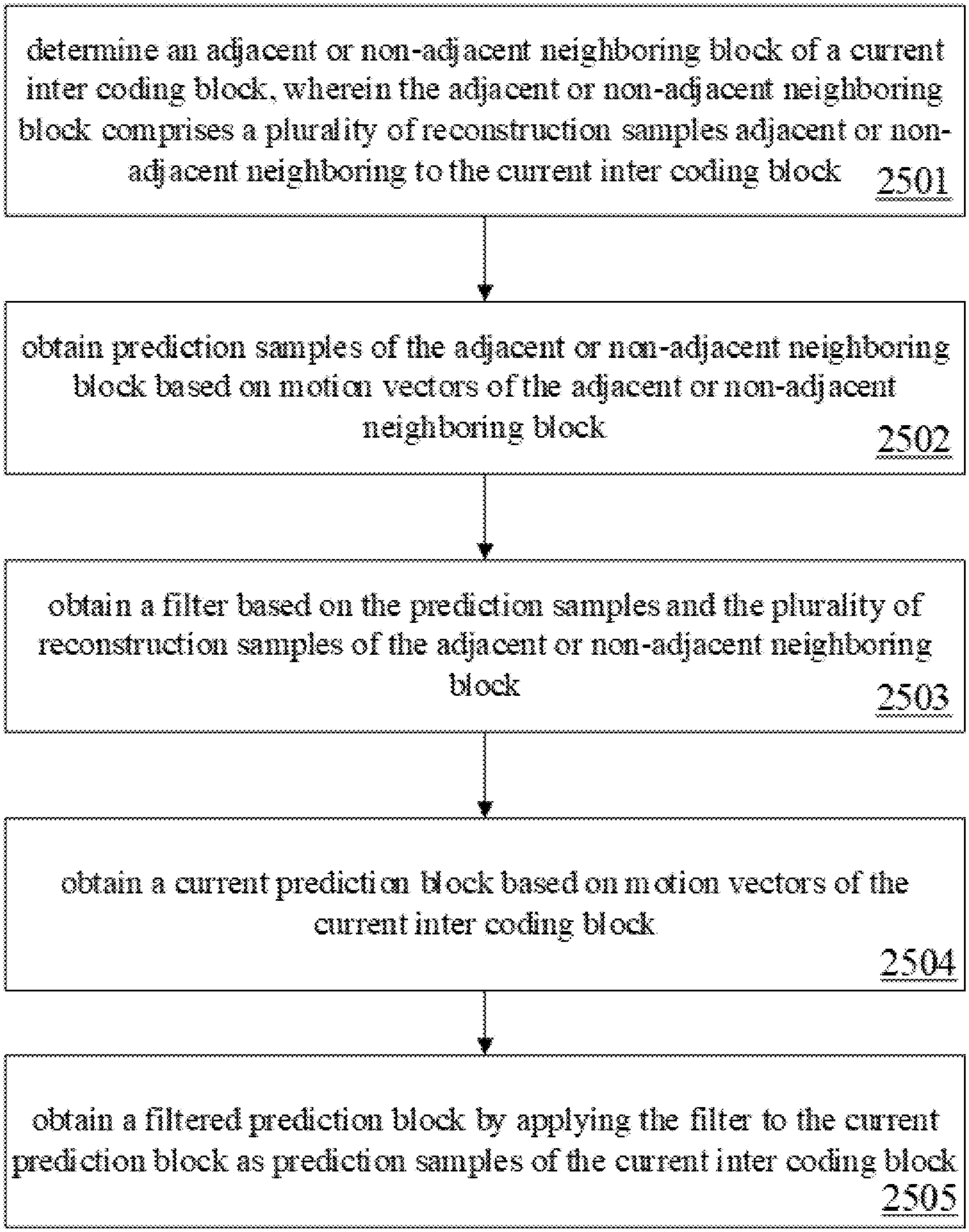
FIG. 25 is a flowchart illustrating a method for video encoding in accordance with some examples of the present disclosure.

FIG. 25 is a flowchart illustrating a method for video encoding according to an example of the present disclosure. The method may be implemented for encoding an inter coding block. In Step 2501, the processor 1820, at the side of an encoder, may determine an adjacent or non-adjacent neighboring block of a current inter coding block, wherein the adjacent or non-adjacent neighboring block comprises a plurality of reconstruction samples adjacent or non-adjacent neighboring to the current inter coding block. In Step 2502, the processor 1820 may obtain prediction samples of the adjacent or non-adjacent neighboring block based on motion vectors of the adjacent or non-adjacent neighboring block. In Step 2503, the processor 1820 may obtain a filter based on the prediction samples and the plurality of reconstruction samples of the adjacent or non-adjacent neighboring block. In Step 2504, the processor 1820 may obtain a current prediction block based on motion vectors of the current inter coding block. In Step 2505, the processor 1820 may obtain a filtered prediction block by applying the filter to the current prediction block as prediction samples of the current inter coding block.

In some examples, determining the adjacent or non-adjacent neighboring block of the current inter coding block includes: determining scanning parameters according to a partition granularity of the current inter coding block, wherein the scanning parameters include a scanning distance or a scanning block size; or determining a scanning block size as a fixed size In some examples, determining the scanning parameters according to the partition granularity of the current inter coding block includes: determining the scanning block size according to a size of the current inter coding block.

In some examples, determining the scanning block size according to the size of the current inter coding block includes: in response to that the size of the current inter coding block is smaller than a predefined size, determining the scanning block size as a fixed size; or, in response to that the size of the current inter coding block is larger than a predefined size, determining the scanning block size as the size of the current inter coding block.

In some examples, determining the scanning block size according to the size of the current inter coding block includes: in response to that a first horizontal value of the size of the current inter coding block is smaller than a second horizontal value of the predefined size, determining a third horizontal value of the scanning block size as the second horizontal value; in response to that a first vertical value of the size of the current inter coding block is smaller than a second vertical value of the predefined size, determining a third vertical value of the scanning block size as the second vertical value; in response to that a first horizontal value of the size of the current inter coding block is larger than a second horizontal value of the predefined size, determining a third horizontal value of the scanning block size as the first horizontal value; or in response to that a first vertical value of the size of the current inter coding block is larger than a second vertical value of the predefined size, determining a third vertical value of the scanning block size as the first vertical value.

In some examples, the fixed size includes any one of 4×4 or 8×8.

In some examples, the method further includes sending, by the encoder to a decoder, an index indicating that the adjacent or non-adjacent neighboring block is used for obtaining the filter.

In some examples, determining the adjacent or non-adjacent neighboring block of the current inter coding block includes: determining the adjacent or non-adjacent neighboring block as one block, wherein prediction samples of the one block have been filtered.

In some examples, obtaining the filter based on the prediction samples and the reconstruction samples of the adjacent or non-adjacent neighboring block includes: obtaining coefficients of the filter by minimizing differences between the prediction samples and the reconstruction samples of the adjacent or non-adjacent neighboring block.

In some examples, obtaining the filter based on the prediction samples and the reconstruction samples of the adjacent or non-adjacent neighboring block includes: in response to that the prediction samples of the adjacent or non-adjacent neighboring block have been filtered, determining coefficients of the filter as being identical to coefficients of a filter applied to the prediction samples of the adjacent or non-adjacent neighboring block.

In some examples, the non-adjacent neighboring block is in a top area or a left area of the current inter coding block.

In some examples, the filter includes coefficients of a scaling factor and an offset.

In some examples, obtaining, by the encoder, the current prediction block based on the motion vectors of the current inter coding block includes: determining the motion vectors of the current inter coding block as being identical to the motion vectors of the adjacent or non-adjacent neighboring block.

Figure 26:
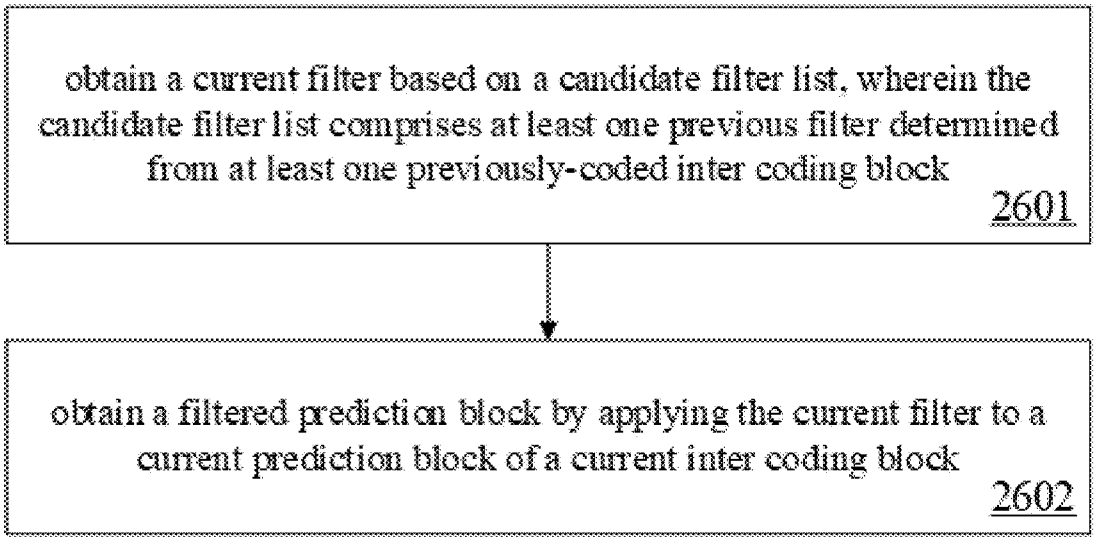
FIG. 26 is a flowchart illustrating a method for video encoding in accordance with some examples of the present disclosure.

FIG. 26 is a flowchart illustrating a method for video encoding according to an example of the present disclosure. The method may be implemented for encoding an inter coding block. In Step 2601, the processor 1820, at the side of an encoder, may obtain a current filter based on a candidate filter list, wherein the candidate filter list includes at least one previous filter determined from at least one previously-coded inter coding block. In Step 2602, the processor 1820 may obtain a filtered prediction block by applying the current filter to a current prediction block of a current inter coding block.

In some examples, a previous filter of the candidate filter list is obtained by following steps: obtaining, by the the processor 1820 of the encoder, the previous filter based on prediction samples and reconstruction samples of an adjacent or non-adjacent neighboring block of the previously-coded inter coding block.

In some examples, obtaining the previous filter based on prediction samples and reconstruction samples of the adjacent or non-adjacent neighboring block of the previously-coded inter coding block includes: in response to that prediction samples of the adjacent or non-adjacent neighboring block have been filtered, determining, by the encoder, the previous filter as being identical to a filter applied to the prediction samples of the adjacent or non-adjacent neighboring block.

In some examples, the adjacent or non-adjacent neighboring block of the previously-coded inter coding block is identified by: determining scanning parameters according to a partition granularity of the previously-coded inter coding block, wherein the scanning parameters include a scanning distance or a scanning block size.

In some examples, determining the scanning parameters according to the partition granularity of the previously-coded inter coding block includes: determining the scanning block size according to a size of the previously-coded inter coding block; or determining the scanning block size as a fixed size.

In some examples, determining the scanning block size according to the size of the current inter coding block includes: in response to that the size of the previously-coded inter coding block is smaller than a predefined size, determining the scanning block size as a fixed size; or in response to that the size of the previously-coded inter coding block is larger than a predefined size, determining the scanning block size as the size of the previously-coded inter coding block.

In some examples, determining the scanning block size according to the size of the previously-coded inter coding block includes: in response to that a first horizontal value of the size of the previously-coded inter coding block is smaller than a second horizontal value of the predefined size, determining a third horizontal value of the scanning block size as the second horizontal value; in response to that a first vertical value of the size of the previously-coded inter coding block is smaller than a second vertical value of the predefined size, determining a third vertical value of the scanning block size as the second vertical value; in response to that a first horizontal value of the size of the previously-coded inter coding block is larger than a second horizontal value of the predefined size, determining a third horizontal value of the scanning block size as the first horizontal value; or in response to that a first vertical value of the size of the previously-coded inter coding block is larger than a second vertical value of the predefined size, determining a third vertical value of the scanning block size as the first vertical value.

In some examples, the method further includes maintaining the candidate filter list to include a predefined number of previous filters.

In some examples, obtaining the current filter based on the candidate filter list includes: scanning previous filters in the candidate filter list, in an order of previously-coded inter coding blocks corresponding to the previous filters being from near to far to the current inter coding block.

In some examples, maintaining the candidate filter list to include the predefined number of previous filters includes: in response to that a number of previous filters included in the candidate filter list reaches the predefined number, removing a first previous filter which is firstly added to the candidate filter table from the candidate filter list, and adding a new previous filter to the candidate filter table as a last entry.

In some examples, maintaining the candidate filter list to include the predefined number of previous filters includes: in response to that a new previous filter is identical with a previous filter included in the candidate filter list, removing the previous filter identical with the new previous filter from the candidate filter list, and adding the new previous filter to the candidate filter table as a last entry.

In some examples, obtaining the current filter based on a candidate filter list, comprises: sending, to a decoder, an index indicating a target filter in the candidate filter table.

In some examples, there is provided an apparatus for video coding. The apparatus includes a processor 1820 and a memory 1830 configured to store instructions executable by the processor; where the processor, upon execution of the instructions, is configured to perform any method as illustrated in FIGS. 19-26.

In some other examples, there is provided a non-transitory computer readable storage medium, having instructions stored therein. When the instructions are executed by a processor 1820, the instructions cause the processor to perform any method as illustrated in FIGS. 19-26. In one example, the plurality of programs may be executed by the processor 1820 in the computing environment 1810 to receive (for example, from the video encoder 20 in FIG. 1G) a bitstream or data stream including encoded video information (for example, video blocks representing encoded video frames, and/or associated one or more syntax elements, etc.), and may also be executed by the processor 1820 in the computing environment 1810 to perform the decoding method described above according to the received bitstream or data stream. In another example, the plurality of programs may be executed by the processor 1820 in the computing environment 1810 to perform the encoding method described above to encode video information (for example, video blocks representing video frames, and/or associated one or more syntax elements, etc.) into a bitstream or data stream, and may also be executed by the processor 1820 in the computing environment 1810 to transmit the bitstream or data stream (for example, to the video decoder 30 in FIG. 2B). Alternatively, the non-transitory computer-readable storage medium may have stored therein a bitstream or a data stream including encoded video information (for example, video blocks representing encoded video frames, and/or associated one or more syntax elements etc.) generated by an encoder (for example, the video encoder 20 in FIG. 1G) using, for example, the encoding method described above for use by a decoder (for example, the video decoder 30 in FIG. 2B) in decoding video data. The non-transitory computer-readable storage medium may be, for example, a ROM, a Random Access Memory (RAM), a CD-ROM, a magnetic tape, a floppy disc, an optical data storage device or the like.

The description of the present disclosure has been presented for purposes of illustration and is not intended to be exhaustive or limited to the present disclosure. Many modifications, variations, and alternative implementations will be apparent to those of ordinary skill in the art having the benefit of the teachings presented in the foregoing descriptions and the associated drawings.

Unless specifically stated otherwise, an order of steps of the method according to the present disclosure is only intended to be illustrative, and the steps of the method according to the present disclosure are not limited to the order specifically described above, but may be changed according to practical conditions. In addition, at least one of the steps of the method according to the present disclosure may be adjusted, combined or deleted according to practical requirements.

The examples were chosen and described in order to explain the principles of the disclosure and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

The above methods may be implemented using an apparatus that includes one or more circuitries, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The apparatus may use the circuitries in combination with the other hardware or software components for performing the above described methods. Each module, sub-module, unit, or sub-unit disclosed above may be implemented at least partially using the one or more circuitries.

Other examples of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only.

It will be appreciated that the present disclosure is not limited to the exact examples described above and illustrated in the accompanying drawings, and that various modifications and changes can be made without departing from the scope thereof.

What is claimed is:

1. A method for video decoding, comprising:

obtaining, by a decoder, a plurality of prediction blocks based on a current inter coding block;

obtaining, by the decoder, a current template of the current inter coding block, wherein the current template comprises a plurality of reconstructed samples neighboring to the current inter coding block;

obtaining, by the decoder, a plurality of template predictions of the current template respectively corresponding to the plurality of prediction blocks of the current inter coding block;

obtaining, by the decoder, at least one filter based on the plurality of template predictions and the current template; and obtaining, by the decoder, a filtered block based on the at least one filter and the plurality of prediction blocks;

wherein the plurality of prediction blocks comprise a first prediction block and a second prediction block, wherein obtaining the at least one filter based on the plurality of template predictions and the current template comprises:

calculating a target template based on the current template and a previously filtered template prediction;

obtaining coefficients for a current filter by minimizing differences between a current template prediction and the target template; and calculating a current filtered template prediction by applying the current filter to the current template prediction; and wherein obtaining the filtered block based on the at least one filter and the plurality of prediction blocks comprises:

in response to reaching an iteration number, obtaining a first filtered prediction block by applying a first filter to the first prediction block, and obtaining a second filtered prediction block by applying a second filter to the second prediction block; and obtaining the filtered block by combining the first filtered prediction block and the second filtered prediction block;

wherein the iteration number is preset or determined according to differences between the previously filtered template prediction and the current template prediction.

2. The method of claim 1, wherein obtaining the at least one filter based on the plurality of template predictions and the current template further comprises:

obtaining coefficients for a first filter by minimizing differences between a first template prediction and the current template; and calculating the previously filtered template prediction by applying the first filter to the first template prediction.

3. The method of claim 1, wherein obtaining, by the decoder, a filtered block based on the at least one filter and the plurality of prediction blocks comprises:

in response to reaching the iteration number, obtaining, by the decoder, a filtered block based on the current filter and one of the plurality of prediction blocks corresponding to the current template prediction.

4. The method of claim 1, further comprising:

determining, by the decoder, an adjacent or non-adjacent neighboring block of the current inter coding block, wherein the adjacent or non-adjacent neighboring block comprises the plurality of reconstruction samples adjacent or non-adjacent neighboring to the current inter coding block.

5. The method of claim 4, wherein determining the adjacent or non-adjacent neighboring block of the current inter coding block comprises:

determining scanning parameters according to a partition granularity of the current inter coding block, wherein the scanning parameters comprise a scanning distance or a scanning block size; or determining a scanning block size as a fixed size.

6. The method of claim 5, wherein determining the scanning parameters according to the partition granularity of the current inter coding block comprises:

determining the scanning block size according to a size of the current inter coding block, wherein determining the scanning block size according to the size of the current inter coding block comprises:

in response to that the size of the current inter coding block is smaller than a predefined size, determining the scanning block size as the fixed size; or in response to that the size of the current inter coding block is larger than the predefined size, determining the scanning block size as the size of the current inter coding block.

7. The method of claim 4, further comprising:

receiving, by the decoder, an index indicating that the adjacent or non-adjacent neighboring block is used for obtaining the at least one filter.

8. The method of claim 4, wherein determining the adjacent or non-adjacent neighboring block of the current inter coding block comprises:

determining the adjacent or non-adjacent neighboring block as one block, wherein prediction samples of the one block have been filtered.

9. The method of claim 4, wherein obtaining the plurality of prediction blocks comprises:

obtaining the plurality of prediction blocks based on motion vectors of the current inter coding block, wherein the motion vectors of the current inter coding block are determined as being identical to motion vectors of the adjacent or non-adjacent neighboring block.

10. An apparatus, comprising:

one or more processors; and a memory coupled to the one or more processors and configured to store instructions executable by the one or more processors, wherein the one or more processors, upon execution of the instructions, are configured to perform operations of video decoding, comprising:

obtaining a plurality of prediction blocks based on a current inter coding block;

obtaining a current template of the current inter coding block, wherein the current template comprises a plurality of reconstructed samples neighboring to the current inter coding block;

obtaining a plurality of template predictions of the current template respectively corresponding to the plurality of prediction blocks of the current inter coding block;

obtaining at least one filter based on the plurality of template predictions and the current template; and obtaining a filtered block based on the at least one filter and the plurality of prediction blocks;

wherein the plurality of prediction blocks comprise a first prediction block and a second prediction block, wherein obtaining the at least one filter based on the plurality of template predictions and the current template comprises:

calculating a target template based on the current template and a previously filtered template prediction;

obtaining coefficients for a current filter by minimizing differences between a current template prediction and the target template; and calculating a current filtered template prediction by applying the current filter to the current template prediction; and wherein obtaining the filtered block based on the at least one filter and the plurality of prediction blocks comprises:

in response to reaching an iteration number, obtaining a first filtered prediction block by applying a first filter to the first prediction block, and obtaining a second filtered prediction block by applying a second filter to the second prediction block; and obtaining the filtered block by combining the first filtered prediction block and the second filtered prediction block;

wherein the iteration number is preset or determined according to differences between the previously filtered template prediction and the current template prediction.

11. A non-transitory computer-readable storage medium for storing a bitstream and instructions, which when executed by a computing device having one or more processors, cause the one or more processors to perform an encoding method to generate the bitstream, wherein the bitstream is to be decoded by the method for video decoding according to claim 1;

wherein the encoding method comprises operations including:

obtaining a plurality of prediction blocks based on a current inter coding block;

obtaining a current template of the current inter coding block, wherein the current template comprises a plurality of reconstructed samples neighboring to the current inter coding block;

obtaining a plurality of template predictions of the current template respectively corresponding to the plurality of prediction blocks of the current inter coding block;

obtaining at least one filter based on the plurality of template predictions and the current template; and obtaining a filtered block based on the at least one filter and the plurality of prediction blocks.

12. A method for storing a bitstream, comprising:

generating a bitstream using an encoding method; and storing the bitstream on a non-transitory computer readable storage medium;

wherein the encoding method comprises operations including:

obtaining a plurality of prediction blocks based on a current inter coding block;

obtaining a current template of the current inter coding block, wherein the current template comprises a plurality of reconstructed samples neighboring to the current inter coding block;

obtaining a plurality of template predictions of the current template respectively corresponding to the plurality of prediction blocks of the current inter coding block;

obtaining at least one filter based on the plurality of template predictions and the current template; and obtaining a filtered block based on the at least one filter and the plurality of prediction blocks;

wherein the plurality of prediction blocks comprise a first prediction block and a second prediction block, wherein obtaining the at least one filter based on the plurality of template predictions and the current template comprises:

calculating a target template based on the current template and a previously filtered template prediction;

obtaining coefficients for a current filter by minimizing differences between a current template prediction and the target template; and calculating a current filtered template prediction by applying the current filter to the current template prediction; and wherein obtaining the filtered block based on the at least one filter and the plurality of prediction blocks comprises:

in response to reaching an iteration number, obtaining a first filtered prediction block by applying a first filter to the first prediction block, and obtaining a second filtered prediction block by applying a second filter to the second prediction block; and obtaining the filtered block by combining the first filtered prediction block and the second filtered prediction block;

wherein the iteration number is preset or determined according to differences between the previously filtered template prediction and the current template prediction.

13. The method of claim 1, wherein the coefficients comprise at least one of a scaling factor, an offset, and at least one non-linear item.

14. The apparatus of claim 10, wherein obtaining the at least one filter based on the plurality of template predictions and the current template further comprises:

obtaining coefficients for a first filter by minimizing differences between a first template prediction and the current template; and calculating the previously filtered template prediction by applying the first filter to the first template prediction.

15. The apparatus of claim 10, wherein the coefficients comprise at least one of a scaling factor, an offset, and at least one non-linear item.

16. The apparatus of claim 10, wherein the operations further comprise:

determining an adjacent or non-adjacent neighboring block of the current inter coding block, wherein the adjacent or non-adjacent neighboring block comprises the plurality of reconstruction samples adjacent or non-adjacent neighboring to the current inter coding block.

17. The apparatus of claim 16, wherein determining the adjacent or non-adjacent neighboring block of the current inter coding block comprises:

determining scanning parameters according to a partition granularity of the current inter coding block, wherein the scanning parameters comprise a scanning distance or a scanning block size; or determining a scanning block size as a fixed size.

18. The method of claim 12, wherein obtaining the at least one filter based on the plurality of template predictions and the current template further comprises:

obtaining coefficients for a first filter by minimizing differences between a first template prediction and the current template; and calculating the previously filtered template prediction by applying the first filter to the first template prediction.

19. The method of claim 12, wherein the coefficients comprise at least one of a scaling factor, an offset, and at least one non-linear item.

20. The method of claim 12, wherein the operations further comprise:

determining an adjacent or non-adjacent neighboring block of the current inter coding block, wherein the adjacent or non-adjacent neighboring block comprises the plurality of reconstruction samples adjacent or non-adjacent neighboring to the current inter coding block.

* * * * *